(12) United States Patent
Kiplinger et al.

(10) Patent No.: US 12,209,104 B1
(45) Date of Patent: Jan. 28, 2025

(54) METAL COMPLEXES AND METHODS OF MAKING THE SAME

(71) Applicant: Triad National Security, LLC, Los Alamos, NM (US)

(72) Inventors: Jaqueline Kiplinger, Los Alamos, NM (US); Ross Beattie, Los Alamos, NM (US); Justin Pagano, Los Alamos, NM (US); Karla Erickson, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 0 days.

(21) Appl. No.: 18/209,995

(22) Filed: Jun. 14, 2023

Related U.S. Application Data

(62) Division of application No. 16/509,042, filed on Jul. 11, 2019, now Pat. No. 11,731,989.

(60) Provisional application No. 62/696,706, filed on Jul. 11, 2018, provisional application No. 62/696,744, filed on Jul. 11, 2018.

(51) Int. Cl.
*C07F 3/00* (2006.01)
*C01G 43/08* (2006.01)

(52) U.S. Cl.
CPC .............. *C07F 3/003* (2013.01); *C01G 43/08* (2013.01)

(58) Field of Classification Search
None
See application file for complete search history.

(56) References Cited

FOREIGN PATENT DOCUMENTS

CN        1834121      9/2006
DE    102015109637    12/2016

OTHER PUBLICATIONS

Alberti et al., "Paramagnetic adducts of group IVB radicals with 4-substituted pyridines," *Tetrahedron Letters*, No. 35, pp. 3283-3286, 1978.

Baker et al., "The coordination and organometallic chemistry of $UI_2$ and $U\{N(SiMe_3)_2\}_3$: Synthetic reagents par excellence," *Coordination Chemistry Reviews*, 256(23-24): 2843-2871, Sep. 25, 2012.
Berthet et al., "New Efficient Synthesis of $[UI_4(MeCN)_4]$. X-ray Crystal Structures of $[UI_2(MeCN)_7][UI_6]$, $[UI_4(py)_3]$, and $[U(dmf)_9]I_4$," *Inorg. Chem.*, 44(4): 1142-1146, Jan. 26, 2005.
Chen et al., "Synthesis, Insertion Reactivity, and Transmetalation Reactions of the Lithium Complex $[\{2\text{-}(6\text{-R-Pyr})(Me_3Si)\}CHLi\cdot OEt_2]_2$ (R = H or Me)," *EurJIC*, 2009(23): 3488-3495, Aug. 3, 2009.
Deacon et al., "Synthesis and Structure of 'mer'-Trichlorotetrakis(pyridine)ytterbium(III) Hemipyridine Solvate," 632(12-13): 1945-1946, Sep. 2006.
Evans et al., "Lanthanide Carboxylate Precursors for Diene Polymerization Catalysis: Syntheses, Structures, and Reactivity with $Et_2AlCl$," *Organometallics*, 20(56): 5751-5758, Nov. 29, 2001.
Gallazzi et al., "Butadiene polymerization with lanthanide catalysts: activity and X-ray diffraction study of neodymium and X-ray diffraction study of neodymium bromide complexes with basic ligands," *Polymer*, vol. 29, pp. 1516-1521, Aug. 1988.
Ji et al., "Trivalent Zirconium and Hafnium Metal-Organic Frameworks for Catalytic 1,4-Dearomative Additions of Pyridines and Quinolines," *J. Am. Chem. Soc.*, vol. 139, pp. 15600-15603, Oct. 25, 2017.
Kaim et al., "Korrelation zwischen struktur und elektronentransferverhalten metallorganischer modellverbindungen für flavine mit "butterfly"-konformation," *Journal of Organometallic Chemistry*, No. 456, pp. 167-173, Sep. 1993.
Li et al., "Pyridine Complexes of Rare Earth Element Trichlorides. Syntheses and Crystal Structures of $[YCl_3(py)_4]$ and $[LnCl_3(py)_4]\cdot$ 0.5 py with Ln = La and Er," *Z. Anorg. Allg. Chem.*, 628(1): 45-50, Jan. 2002 (in German with English abstract).
Vasudevan et al., "An Ionic Liquid-Mediated Route to Cerium(III) Bromide Solvates," *Inorg. Chem.*, 50(10): 4627-4631, Apr. 8, 2011.
Wu et al., "A Facile Method for Preparation of Tetrahydrofurfuran Complexes of Lanthanide Trichlorides," *Polyhedron*, 13(18): 2679-2681, Apr. 10, 2001.

*Primary Examiner* — Yun Qian
(74) *Attorney, Agent, or Firm* — Klarquist Sparkman, LLP

(57) ABSTRACT

Disclosed herein are embodiments of metal complexes and methods of making the same. The disclosed method embodiments provide a one-step approach to making metal complexes, such as complexes comprising lanthanide metals, rare earth metals, transition metals, main group metals, and/or actinide metals that can be used various applications, such as in separations technology, catalysis (e.g., catalysts for pharmaceutical synthesis and/or catalysts for biomass conversion), nuclear chemistry, LED phosphors, scintillator materials, magnetic materials, and nuclear fuels.

17 Claims, 22 Drawing Sheets

METAL COMPLEXES AND METHODS OF MAKING THE SAME

CROSS REFERENCE TO RELATED APPLICATIONS

This application is a divisional of U.S. application Ser. No. 16/509,042, filed Jul. 11, 2019, which claims the benefit of the earlier filing date of U.S. Provisional Patent Application No. 62/696,706, filed on Jul. 11, 2018, and U.S. Provisional Patent Application No. 62/696,744, filed on Jul. 11, 2018; each of these prior applications is incorporated herein by reference in its entirety.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

The present disclosure is directed to metal complexes, including anhydrous actinide complexes, lanthanide complexes, and other metals, and methods of making and using the same.

BACKGROUND

Lanthanide catalysts, organolanthanide single molecule magnets, and the broad application of 4f-element luminescent properties in LED phosphors and scintillator materials, as examples, have all generated significant attention in the past several years. Despite this, the development of organolanthanide compounds and lanthanide materials designed for use in anaerobic and anhydrous conditions has been slowed by a lack of appropriate starting materials, heavily relying on anhydrous $LnX_3$ (X=halide) and $Ln_2O_3$ as starting materials. Both of these materials have limitations to their utility. $LnX_3$ compounds are poorly soluble in most organic solvents, which severely limits reactivity and necessitates long or harsh reaction conditions. Additionally, the synthesis of $LnX_3$ compounds is challenging. Common protocols include drying $LnX_3(H_2O)_x$ derivatives, or deoxygenation of thermodynamically stable $Ln_2O_3$ compounds, both of which require high temperatures and/or long reaction times. Also, functionalization of $Ln_2O_3$ either produces water as a byproduct or requires water to initiate the reaction, thus necessitating further drying steps and limiting its utility in rigorously anhydrous settings.

Safe methods that avoid hazardous solvents (e.g., halogenated solvents) and that can directly provide various types of anhydrous, stable lanthanide complexes, such as lanthanide (II), (III) and/or (IV) complexes, are needed in the art, as well as methods that also can be used to form other metal complexes aside from lanthanide complexes.

Also, while synthetic actinide chemistry has witnessed advances over the past several decades, methods of making ubiquitous starting materials, such as actinide halides, have not been advanced. Safe methods that avoid hazardous solvents (e.g., halogenated solvents) and that can directly provide various types of actinide complexes, such as actinide(II)-(VI) complexes, are needed in the art.

SUMMARY

Disclosed herein are embodiments of a one-step method for making metal halide complexes. In some embodiments, the method comprises heating a reaction mixture comprising a metal precursor, a nitrogen-containing compound, and a Group 14 element-containing reagent to provide a metal complex satisfying a formula $MX_n(NCC)_m$, wherein M is a lanthanide metal, an actinide metal, a rare earth metal, a transition metal, or main group metal; X is an anionic ligand; NCC is a nitrogen-containing compound, n is 2 to 4; and m is 1 to 5. In an independent embodiment, the metal precursor is not an oxidized form of the metal, such as a metal halide, a metal oxide, or the like. The Group 14 element-containing reagent used in such method embodiments has a structure satisfying a formula (R)(R')(R")AX in, wherein each of R, R', and R" independently are selected from an aliphatic group, an aromatic group, a haloaliphatic group, a heteroaliphatic group, or an anionic group; A is a Group 14 element, such as Si, Ge, Sn, or Pb; and X is a functional group capable of serving as an anionic ligand. In some embodiments, the method can further comprise isolating the metal complex by washing with a solvent in which the metal complex is not substantially soluble. In yet additional embodiments, the method can further comprise exposing the metal complex to reaction conditions sufficient to eliminate the nitrogen-containing compound. In some embodiments, the reaction conditions sufficient to eliminate the nitrogen-containing compound comprises heating the metal complex at a temperature sufficient to eliminate the nitrogen-containing compound and/or reducing the pressure of the reaction mixture. In some embodiments, reducing the pressure of the reaction mixture can comprise applying vacuum pressure. Exemplary metal precursors, Group 14 element-containing reagents (such as silyl reagents), and neutral ligand precursors (such as nitrogen-containing compounds) are disclosed herein. Novel metal complexes also are disclosed herein.

The foregoing and other objects and features of the present disclosure will become more apparent from the following detailed description, which proceeds with reference to the accompanying figures.

DETAILED DESCRIPTION

I. Overview of Terms and Abbreviations

Figure 1:
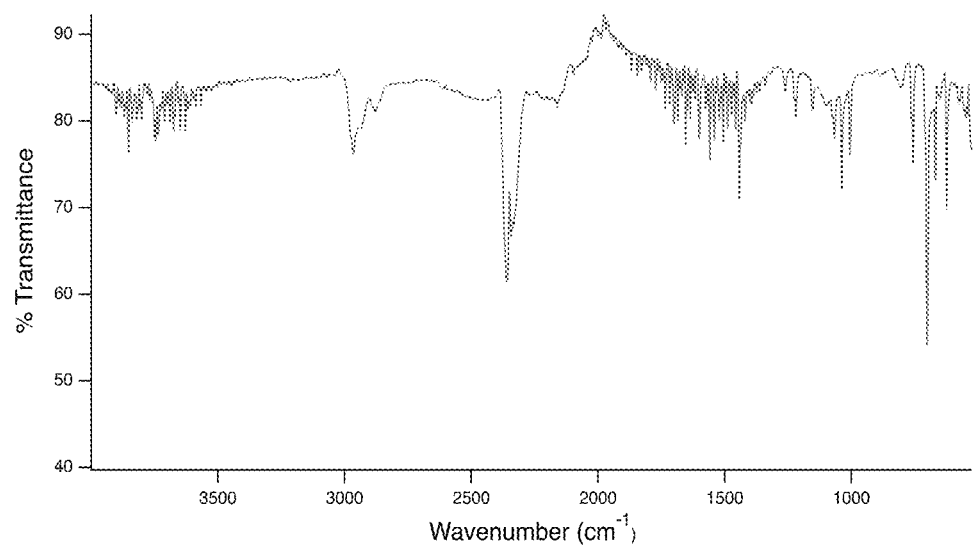
FIG. 1 is an infrared (IR) spectrum of $DyCl_3(py)_4$ (8).

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Also, any functional group disclosed herein and/or defined below can be substituted or unsubstituted, unless otherwise indicated herein. Furthermore, not all alternatives recited herein are equivalents.

A. Explanation of Terms

To facilitate review of the various embodiments of the disclosure, the following explanations of specific terms are provided.

Actinide: A chemical element, typically a metal and selected from actinium (Ac), thorium (Th), uranium (U), protactinium (Pa), berkelium (Bk), californium (Cf), einsteinium (Es), fermium (Fm), mendelevium (Md), nobelium (No), plutonium (Pu), neptunium (Np), americium (Am), curium (Cm), and lawrencium (Lr).

Aliphatic: A hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well. Aliphatic is distinct from aromatic.

Alkenyl: An unsaturated monovalent hydrocarbon having at least two carbon atoms to 50 carbon atoms ($C_{2-50}$), such as two to 25 carbon atoms ($C_{2-25}$), or two to ten carbon atoms ($C_{2-10}$), and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cycloalkenyl), cis, or trans (e.g., E or Z).

Alkoxy: —O-aliphatic, with exemplary embodiments including, but not limited to, methoxy, ethoxy, n-propoxy, isopropoxy, n-butoxy, t-butoxy, sec-butoxy, n-pentoxy.

Alkyl: A saturated monovalent hydrocarbon having at least one carbon atom to 50 carbon atoms ($C_{1-50}$), such as one to 25 carbon atoms ($C_{1-25}$), or one to ten carbon atoms ($C_{1-10}$), wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Alkynyl: An unsaturated monovalent hydrocarbon having at least two carbon atoms to 50 carbon atoms ($C_{2-50}$), such as two to 25 carbon atoms ($C_{2-25}$), or two to ten carbon atoms ($C_{2-10}$), and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Anionic Ligand: Any ligand that has an oxidation state less than zero, including −1, −2, −3, and the like. Exemplary anionic ligands include, but are not limited to aliphatic groups (e.g., —$CH_3$, —$CH_2CH_3$, —$CH_2CH_2CH_3$, and the like), alkoxy groups, aryloxy groups, amide groups (e.g., —$NR^3C(O)R^3$ or —$C(O)N(R^3)_2$, wherein each $R^3$ independently is hydrogen; an aliphatic group, such as an alkyl, alkenyl, or alkynyl group; an aromatic group, such as aryl or heteroaryl; or a heteroaliphatic group, such as alkoxy, thioether, and the like), halides (e.g., —Br, —Cl, —F, and —I, wherein these elements can comprise any isotopic form, or mixture of isotopic forms), —OH, —$NO_2$, —SH, —$NH_2$, —NO, —$N_3$, —$P(O)(OH)_2$, —$S(O)_2OH$, —OOH, —SSH, —$S(O)OH$, —$OP(O)OH_2$, —$OS(O)_2CF_3$, and the like.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

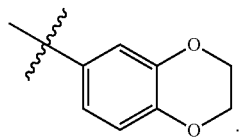

However, in certain examples, context or express disclosure may indicate that the point of attachment is through a non-aromatic portion of the condensed ring system. For example,

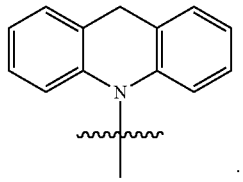 [SMILES: *N1c2ccccc2Cc2ccccc21]

An aromatic group or moiety may comprise only carbon atoms in the ring, such as in an aryl group or moiety, or it may comprise one or more ring carbon atoms and one or more ring heteroatoms comprising a lone pair of electrons (e.g. heteroatoms belonging to Groups 14-16 of the periodic table, such as S, O, N, P, or Si), such as in a heteroaryl group or moiety.

Aryl: An aromatic carbocyclic group comprising at least five carbon atoms to 15 carbon atoms ($C_5$-$C_{15}$), such as five to ten carbon atoms ($C_5$-$C_{10}$), having a single ring or multiple condensed rings, which condensed rings can or may not be aromatic provided that the point of attachment to a remaining position of the compounds disclosed herein is through an atom of the aromatic carbocyclic group. Aryl groups may be substituted with one or more groups other than hydrogen, such as aliphatic, heteroaliphatic, haloaliphatic, aromatic, other functional groups, or any combination thereof.

Aryloxy: —O-aryl, with exemplary embodiments including, but not limited to, phenoxy, benzyloxy, and the like.

Halide: —Cl, —I, —Br, or —F. In structures described herein, halides can comprise different isotopes (or mixtures thereof) of the halide. Unless indicated otherwise, each halide present in a particular structure typically is the more naturally abundant isotope of the halide; however, this is not intended to mean that other isotopes may be present as they can be present in minority amounts. Solely by way of example, in representative structures described herein comprising one or more chloride atoms, the chloride comprises a majority of $^{35}Cl$. In structures comprising one or more chloride atoms labeled "$^{37}Cl$," the chloride instead comprises a majority of the $^{37}Cl$ isotope. In generic formulas described herein, the halide is described in a generic sense (e.g., in the formula (R)(R')(R")SiX, wherein X is a halide) and thus can comprise one isotope of the halide (selected from any potential isotopes), or a mixture of isotopes.

Haloaliphatic: An aliphatic group wherein one or more hydrogen atoms, such as one to 10 hydrogen atoms, independently is replaced with a halogen atom, such as fluoro, bromo, chloro, or iodo.

Heteroaliphatic: An aliphatic group comprising at least one heteroatom to 20 heteroatoms, such as one to 15 heteroatoms, or one to 5 heteroatoms, which can be selected from, but not limited to oxygen, nitrogen, sulfur, silicon, boron, selenium, phosphorous, and oxidized forms thereof within the group.

Heteroaryl: An aryl group comprising at least one heteroatom to six heteroatoms, such as one to four heteroatoms, which can be selected from, but not limited to heteroatoms belonging to groups 13-16 of the periodic table (e.g., oxygen, nitrogen, sulfur, silicon, boron, selenium, and phosphorous) and oxidized forms thereof within the ring. Such heteroaryl groups can have a single ring or multiple condensed rings, wherein the condensed rings may or may not be aromatic and/or contain a heteroatom, provided that the point of attachment is through an atom of the aromatic heteroaryl group. Heteroaryl groups may be substituted with one or more groups other than hydrogen, such as aliphatic, heteroaliphatic, haloaliphatic, aromatic, other functional groups, or any combination thereof.

Heteroatom: An atom other than carbon or hydrogen, such as (but not limited to) atoms belonging to groups 13-16 of the periodic table, such as oxygen, nitrogen, sulfur, silicon, boron, selenium, or phosphorous. In particular disclosed embodiments, such as when valency constraints do not permit, a heteroatom does not include a halogen atom.

Heteroatom Functional Groups: A functional group that either does not comprise a carbon atom within the functional group itself or contains a majority of heteroatoms as compared to carbon atoms present in the functional group. Exemplary heteroatom functional groups include, but are not limited to, —OH, —$NO_2$, —SH, —$NH_2$, —NO, —$N_3$, —$P(O)(OH)_2$, —$S(O)_2OH$, —OOH, —SSH, —$S(O)OH$, —$OP(O)OH_2$, —$OS(O)_2CF_3$, and the like.

Lanthanide: A chemical element, typically a metal and selected from lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Metal Oxide: An oxidized form of a lanthanide metal, actinide metal, transition metal, main group metal, or rare earth metal.

Main Group Metal: A metal belonging to the main group of the periodic table, namely any metal falling within groups 1, 2, and 13 to 18 of the periodic table. In some embodiments, a complex comprising a main group metal can comprise the main group metal in any possible oxidation state and such possible oxidation states are recognizable by those of ordinary skill in the art with the benefit of the present disclosure.

Neutral Ligand: A ligand that is not a charged ligand and that typically forms a metal complex due to the presence of at least one atom comprising lone pairs.

Rare Earth Metal: A metal that also can be a lanthanide and further including scandium and yttrium. In some embodiments, a complex comprising a rare earth metal can comprise the rare earth metal in any possible oxidation state and such possible oxidation states are recognizable by those of ordinary skill in the art with the benefit of the present disclosure.

Transition Metal: A metal belonging to the central block of the periodic table, namely groups 4-11 of the periodic table. In some embodiments, a complex comprising a transition metal can comprise the transition metal in any possible oxidation state and such possible oxidation states are recognizable by those of ordinary skill in the art with the benefit of the present disclosure.

Uranyl Salt: An oxycation of uranium having an oxidation state of +4, +5, or +6 (or IV, V, or VI) and that typically has a chemical formula of $UO_2$, and $UO_{2+}$, and $UO_2^{2+}$, respectively. A uranyl salt is an exemplary metal oxide (e.g., an actinide oxide) and is chemically distinct from the uranium precursor embodiments disclosed herein and is not intended to constitute a uranium precursor according to the present disclosure.

B. Abbreviations

Py: pyridine
BTDHB: N,N'-bistrimethylsilyl-1,1-dihydro-4,4'-bipyridinylidene

II. Introduction

Currently there are very few methods available to prepare anhydrous metal complexes, and particularly anhydrous lanthanide halide complexes and/or actinide-containing compounds. Typically, dehydration methods are used to make lanthanide halide complexes. Such methods utilize $LnCl_3(H_2O)_x$ and lanthanide oxide starting materials in combination with thionyl chloride or $Me_3SiCl$ in the presence of a coordinating solvent. Another method to access anhydrous complexes is to treat anhydrous $LnCl_3$, which itself must be prepared by dehydrating $LnCl_3(H_2O)_x$, with THF, alcohols, caprolactone, phosphoroamides, bipyridine, terpyridine, or phenanthroline. Some disadvantages of these approaches include the fact that they result in incomplete reactions and/or low yields and do not provide directed access to the desired complexes. Additionally, dehydrating $LnCl_3(H_2O)_x$ to anhydrous $LnCl_3$ is difficult; therefore, a large number of lanthanide complexes must be prepared by treating hydrated chloride salts, such as $LnCl_3(H_2O)_x$ with a neutral ligand to generate water-bound complexes. These routes, however, cannot be used to access purely anhydrous complexes. While $LnCl_3(THF)_x$ complexes (wherein Ln=La, x=1.5; Ln=Ce, Pr, Sm, x=2; Ln=Yb, x=3; Ln=Y, Dy, x=3.5) have been made from $Ln^0$ metals using trimethylsilylchloride as an oxidant, these complexes are not stable or suitable for long term storage because the ligated THF moieties are susceptible to ring opening. Additionally, these complexes require using methanol as a co-solvent and reagent, which requires purification and is difficult to dry, making anhydrous complexes difficult to obtain. Furthermore, the trimethylsilylchloride must be purified in such methods, which complicates and greatly increases the cost of large-scale or industrial processes and it cannot be replaced with trimethylsilylbromide to provide lanthanide bromide complexes because making this modification would decompose the requisite THF ligands.

Also, while synthetic organoactinide chemistry has witnessed rapid advances over the past several decades, methods of making starting materials for advanced synthesis, molten salt reactor fuels, or other applications have not been advanced. For example, $UCl_4$ is conventionally made by refluxing hexachloropropene with uranium oxides $U_3O_8$, $UO_3 \cdot (H_2O)_2$ or $UO_3(NO_3)_2 \cdot 6H_2O$ and/or by using carbon tetrachloride or dichlorodisulfide, all of which rely on large quantities of chlorinated solvents that ultimately can contaminate the environment after disposal. Such solvents are often regulated (due to their toxicity), expensive, and difficult to obtain. There also are safety issues associated with these conventional methods and thus they cannot be scaled to an industrial level. Additionally, these methods solely yield $UCl_4$ and while $UCl_3$ can be obtained from the reduction of $UCl_4$ (which in some instances can be relatively dangerous), there currently is no direct, single-step route to $UCl_3$. Any further reduction step, for example with zinc or other metals, then require additional non-trivial separation steps. Other methods include first making $UH_3$ by passing hydrogen gas over uranium metal, followed by chlorination with chlorine or HCl gas. Additional purification steps follow. The preparation of $ThCl_4$ affords the dimethoxyethane (DME) adduct, $ThCl_4(DME)_2$ and requires refluxing thorium nitrate $(Th(NO_3)_4(H_2O)_5$ with HCl, followed by the addition of DME and washing with chlorinated solvent.

Method embodiments disclosed herein address the difficulties and fallbacks of the methods described above in making lanthanide and/or actinide complexes and further provides a route to other metal complexes, such as complexes comprising transition metals, rare earth metals, and even main group elements. Solely by way of example, method embodiments disclosed herein can be used to make lanthanide complexes for all lanthanide elements and can also be used to make lanthanide complexes that include halides other than just chloride atoms, including bromides and iodides (including halides comprising a single isotope, or a mixture of isotopes). The lanthanide halide complex embodiments disclosed herein can be obtained in high yields and resist degradation, making them capable of being stored for long periods of time. The method embodiments disclosed herein utilize starting materials and reagents that are cost-effective and relatively non-hazardous and thus can be scalable to multi-gram-quantity reactions. The coordinated ligands of the complexes enhance the complexes' solubility, providing similar or improved yields compared to complexes made with conventional methods.

Also disclosed herein are embodiments of a one-step method for making actinide complexes comprising at least one anionic ligand, with particular embodiments comprising a halide, an alkoxy, an aryloxy, amide, or azide ligand. Exemplary actinide complexes comprise actinium, thorium, uranium, protactinium, berkelium, californium, einsteinium, fermium, mendelevium, nobelium, plutonium, neptunium, americium, curium, or lawrencium; at least one anionic ligand, and at least one neutral ligand. In an independent embodiment, the method can be used to make protactinium and/or lawrencium complexes. The method embodiments described herein can be used to make such complexes directly in one step. In particular embodiments, the reagents used in particular method embodiments are less toxic and are commercially available and can be used on industrial/commercial scale. Also disclosed herein are novel actinide complexes, such as uranium(III) bromide complexes, that can be made using method embodiments disclosed herein.

The method embodiments disclosed herein also can be used to make transition metal complexes, rare earth metal complexes (e.g., complexes comprising lanthanide metals as well as yttrium (Y) and scandium (Sc)), and even main group metal complexes (e.g., aluminum (Al) and the like). In yet additional embodiments, the method can be used to make complexes other than halide-containing complexes, including complexes comprising other anionic ligands, such as, but not limited to, alkoxy groups, aryloxy groups, amide groups, azide groups, and the like. In particular embodiments, the synthesis and full characterization of $LnCl_3(py)_4$ (Ln=La (1), Ce (2), Pr (3), Nd (4), Sm (5), Gd (6), Tb (7), Dy (8), Ho (9), Er (10), Tm (11), Yb (12), Lu (13); py=pyridine) and $LnBr_3(py)_4$ (Ln=La (14), Ce (15), Pr (16), Nd (17), Sm (18), Gd (19), Tb (20), Dy (21), Ho (22), Er (23), Tm (24), Yb (25), Lu (26)) is disclosed herein, including the solid-state structures for compounds 2-9, 11, 13, and 18-26. In particular embodiments, the synthesis and full characterization of the lanthanide (II) complexes $EuBr_2(py)_5$, $EuI_2(py)_4$, $SmBr_2(py)_5$, $YbBr_2(py)_4$, $YbI_2(py)_4$ is disclosed herein. In particular embodiments, the synthesis and full characterization of the actinide complexes $UCl_3(py)_4$ (31), $UCl_3(4-{}^tBuC_5H_4N)_4$ (32), $UCl_4(py)_4$ (36), $UBr_3py_4$ (42), $UBr_3(THF)_4$ (43), $ThCl_4(py)_4$ (44), $ThBr_4(py)_4$ (45) is disclosed herein. Furthermore, the utility of lanthanide complexes as starting materials for organolanthanide complexes is shown through their use in making early, mid, and late lanthanide complexes, such as $[(C_5Me_5)_2CeCl_2K(thf)]_n$ (27), $Tp'_2SmCl$ (28, Tp'=hydridotris (3,5-dimethylpyrazolyl)borate), $Yb[N(SiMe_3)]_3$ (29), and $(C_5H_5)_3Sm(py)$ (30), are disclosed herein. Additionally, the following compounds were synthesized from the above mentioned actinide halide starting materials: $(C_5Me_5)_2UCl(py)$ (33), $U[(Me_3Si)_2N]_3(py)$ (34), $(C_5Me_5)_2UCl_2$ (39), $(C_5Me_4Et)_2UCl_2$ (40), $U(O-2,6-{}^tBu_2C_6H_3)_4$ (41).

III. Method Embodiments

Disclosed herein are embodiments of a method for making metal complexes and particularly complexes comprising lanthanides, transition metals, rare earth metals, main group elements, and/or actinide elements. Representative Scheme 1, below, summarizes chemical conversions used in certain method embodiments. As illustrated in Scheme 1, a metal precursor, such as a lanthanide metal precursor, a rare earth metal precursor, a transition metal precursor, an actinide metal precursor, and/or a main group metal precursor, is combined with a suitable number of equivalents of a Group 14 element-containing reagent (such as a silyl (Si) reagent, like a silyl halide, a silyl alkoxy, a silyl aryloxy, a silyl amide, or a silyl azide; or a germanium (Ge) reagent, like a germanium halide, a germanium alkoxy, a germanium aryloxy, a germanium amide, or a germanium azide; or a tin (Sn) reagent, like a tin halide, a tin alkoxy, a tin aryloxy, a tin amide, or a tin azide; or a lead (Pb) reagent, like a lead halide, a lead alkoxy, a lead aryloxy, a lead amide, or a lead azide) and a nitrogen-containing compound at a temperature and for a time period sufficient to form a metal complex.

Scheme 1

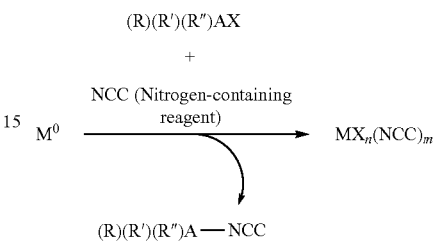

With reference to Scheme 1, M is a metal, such as a lanthanide metal, an actinide metal, a rare earth metal, a transition metal, or a main group metal. The NCC reagent is a nitrogen-containing compound. Each of R, R', and R" of the (R)(R')(R")AX component independently is selected from an aliphatic group, such as an alkyl, alkenyl, or alkynyl group; an aromatic group, such as aryl or heteroaryl; a heteroaliphatic group, such as alkoxy, thioether, and the like; a haloaliphatic group, such as an alkyl, alkenyl, or alkynyl group comprising one or more halogen atoms; or other anionic groups, such as a halide (including a single isotopic form, or a mixture of isotopic forms thereof), an alkoxy, an aryloxy, an amide, or an azide. Variable A of the (R)(R')(R")AX component is Si, Ge, Pb, or Sn; and variable X of the (R)(R')(R")AX component is an anionic ligand (such as, but not limited to, a halide [including a single isotopic form, or a mixture of isotopic forms thereof], an alkoxy, an aryloxy, an amide, or an azide). With respect to the product, $MX_n(NCC)_m$, X is the X group of the (R)(R')(R")AX component; NCC is a ligand provided by the nitrogen-containing compound; n is an integer ranging from 2 to 4, such as 2, 3, or 4; and m is an integer ranging from 1 to 5, such as 2 to 5 or 3 to 5, or 2 to 4. In particular embodiments, m is selected from 1, 2, 3, 4, or 5.

Representative methods of making a lanthanide halide complex are illustrated below in Schemes 2 and 3, wherein X is a halide, such as Br, Cl, F, or I. In some embodiments, X can be a halide that comprises a single isotope of the halide, or a mixture of isotopes. Solely by way of example, X can be $^{35}Cl$, $^{37}Cl$, or a combination thereof.

Scheme 2

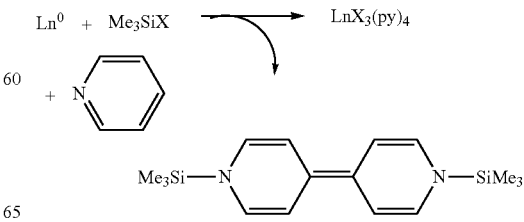

-continued
Scheme 3

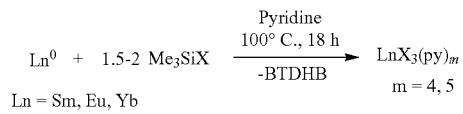

In some embodiments, the method can be used to make lanthanide(II) and/or lanthanide(III) complexes. In particular embodiments, the lanthanide-containing complexes can include lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu). In additional embodiments, the method can be used to make other rare earth metal complexes, such as complexes comprising yttrium (Y) and scandium (Sc). In yet additional embodiments, the method can be used to make transition and/or main group metal complexes comprising metals like zinc (Zn), cobalt (Co), manganese (Mn), magnesium (Mg), or aluminum (Al). In some independent embodiments, the method can be made to use iron (Fe). In yet additional embodiments, complexes comprising actinides like actinium (Ac), thorium (Th), uranium (U), protactinium (Pa), berkelium (Bk), californium (Cf), einsteinium (Es), fermium (Fm), mendelevium (Md), nobelium (No), plutonium (Pu), neptunium (Np), americium (Am), curium (Cm), or lawrencium (Lr) can be made. In any or all of these embodiments, the method is a one-step method. Also, in any or all of these embodiments, the complexes include halides (which can include a single isotopic form or a mixture of any isotopic forms) selected from chloride, bromide, fluoride, iodide, and combinations thereof. In yet additional embodiments, the method can be a one-step method used to prepare various different metal complexes that include alkoxy groups, aryloxy groups, amides, or azide groups, and combinations thereof.

In some embodiments, the method uses low temperatures, avoids exotic solvents/precursors (e.g., solvents and/or precursors that are not commercially available or that require chemical modification before use), and/or avoids toxic and/or unsafe conditions. Additionally, solvents and/or reagents used in embodiments of the disclosed method can be recycled. In some embodiments, method embodiments disclosed herein for preparing actinide complexes also can provide byproducts that can be used in metal- and salt-free reductions of organometallic chlorides and/or to make value-added products, such as silyl enol ethers.

Embodiments of the method disclosed herein comprise exposing a metal precursor (typically a non-oxidized and/or non-complexed form of the metal, such as $M^0$) to a neutral ligand precursor (such as a nitrogen-containing compound) and a Group 14 element-containing reagent (such as a silyl reagent or other Group 14 element-containing reagents disclosed herein) at a temperature ranging from 50° C. to a temperature that is not so high as to substantially boil off the neutral ligand precursor (if it is a liquid and either in an open or closed system) or to a temperature that is sufficient to melt the neutral ligand precursor (if is a solid), thereby forming a metal complex with one or more ligands obtained from the neutral ligand precursor. In some embodiments, the method can comprise exposing an actinide metal precursor (such as non-oxidized and/or non-complexed form of an actinide metal) to a neutral ligand precursor (such as a nitrogen-containing compound) and a Group 14 element-containing reagent (such as a silyl reagent or other Group 14 element-containing reagents disclosed herein) at a temperature ranging from 40° C. (or higher, such as 80° C.) to a temperature that is not so high as to substantially boil off the neutral ligand precursor (if it is a liquid and either in an open or closed system) or to a temperature that is sufficient to melt the neutral ligand precursor (if is a solid), thereby forming an actinide complex with at least one anionic ligand provided by the Group 14 element-containing reagent and further comprising one or more neutral ligands obtained from the neutral ligand precursor.

In some embodiments, pyridine, which is an exemplary neutral ligand precursor (and nitrogen-containing compound), has a boiling point of 115° C., thus in embodiments using a pyridine solvent as the neutral ligand precursor, the temperature can range from 80° C. to lower than 115° C., such as 90° C. to 114° C., or 90° C. to 110° C. As yet another example, quinoline can be used as the ligand precursor and in such embodiments the temperature can range from 80° C. to lower than 237° C., such as 90° C. to 235° C., or 90° C. to 200° C. In some embodiments, the reaction mixture can be heated at a temperature ranging from 50° C. to 150° C., such as 60° C. to 125° C., or 70° C. to 100° C., or 80° C. to 100° C. In some embodiments, the heating step of the method is carried out under an inert atmosphere, such as by using an inert gas or by performing method steps within a glovebox or other inert setting.

The metal precursor, neutral ligand precursor, and the Group 14 element-containing reagent are heated for a time sufficient to facilitate forming the metal complex. In some embodiments, these components are heated for a time period ranging from 4 hours to 18 hours, such as 8 hours to 15 hours, or 10 hours to 15 hours, or 10 hours to 12 hours. In some embodiments of making actinide complexes, an actinide metal precursor, the neutral ligand precursor and the Group 14 element-containing reagent are heated for 8 hours to 18 hours, such as 10 hours to 15 hours, or 10 hours to 12 hours. These are only representative time periods and it may be possible to use longer or shorter reaction times depending on the components used in the method.

Some embodiments of the disclosed method further comprise allowing the metal complex solution to cool to ambient temperature (or affirmatively cooling the metal complex to ambient temperature). The metal complex can be isolated from its reaction solution by precipitating with an anti-solvent and then filtering and can be further purified to remove a majority amount of any by-products and/or impurities using a combination of rinsing and drying steps. Any solvent can be used so long as the solvent does not dissolve or substantially dissolve the metal complex. Exemplary solvents include, but are not limited to hydrocarbon solvents, such as pentane, hexanes, and the like. In some embodiments, the method can further comprise eliminating (or displacing) one or more ligands present in the metal complex to provide a complex having a formula $MX_n$, wherein M, X, and n are as recited for the formula $MX_n$ $(NCC)_m$. In such embodiments, the method can further comprise heating the metal complex at a temperature suitable to promote loss of any ligands (e.g., nitrogen-containing compounds) provided by the neutral ligand precursor. In embodiments where the complex comprises pyridine ligands from the pyridine solvent, the pyridine ligands may be removed at temperatures from 25° C. to 700° C. either at ambient pressure or under reduced pressure conditions. In yet additional embodiments where the complex comprises pyridine ligands from the pyridine solvent, one or more of the pyridine ligands can be removed by heating the complex at a temperature of at least 190° C. to 500° C., such as 190° C. to 450° C., or 200° C. to 450° C., or 300° C. to 450° C., or 400° C. to 450° C. In some embodiments, one or more of the pyridine ligands are eliminated from a complex embodiment using a temperature of 400° C. to 450° C.

The metal precursor typically is a non-oxidized and/or non-complexed form of the metal (e.g., M°) and can be in the form of metal turnings, metal powder, ingots, granules, sheets, and the like. In particular embodiments using a lanthanide metal precursor, the lanthanide metal precursor typically is lanthanide powder and is not a lanthanide oxide or lanthanide halide. Other metals, however, can be used, such as, but not limited to, La, Ce, Pr, Nd, Sm, Eu, Gd, Tb, Dy, Ho, Er, Tm, Yb, Lu, Y, Sc, Zn, Co, Mn, Mg, and Al. In an independent embodiment, the metal can be Fe. In particular embodiments using an actinide metal precursor, the actinide metal precursor typically is in the form of actinide metal (typically in non-oxidized and/or non-complexed form), and often as metal turnings and/or metal sheets. In particular embodiments using a uranium precursor, the uranium precursor typically is uranium metal turnings and is not, or is other than, a uranyl salt, such as $UO_2X_2$ (wherein X is I or OTf) or $UO_2$, $UO_{2+}$, or $UO_2^{2+}$. Other actinide metals, however, can be used, such as, but not limited to, actinium, thorium, uranium, protactinium, berkelium, californium, einsteinium, fermium, mendelevium, nobelium, plutonium, neptunium, americium, or curium.

The Group 14 element-containing reagent typically is a Group 14 element-containing compound capable of providing an anionic ligand to form the metal complex. In some embodiments, the Group 14 element-containing reagent has a structure satisfying a formula (R)(R')(R'')AX, wherein each of R, R', and R'' independently are selected from an aliphatic group, such as an alkyl group (e.g., lower alkyl, including methyl, ethyl, propyl, butyl, pentyl, hexyl, heptyl, octyl, nonyl, and decyl), an alkenyl group (e.g., lower alkenyl, including ethenyl, propenyl, butenyl, pentenyl, hexenyl, heptenyl, octenyl, nonenyl, and decenyl), or an alkynyl group (e.g., lower alknynl, including ethynyl, propynyl, butynyl, pentynyl, hexynyl, heptynyl, octynyl, nonynyl, and decynyl); an aromatic group, such as aryl or heteroaryl; a heteroaliphatic group, such as alkoxy, thioether, and the like; a haloaliphatic group, such as an alkyl, alkenyl, or alkynyl group comprising one or more halogen atoms; or an anionic group, such as a halide (including a single isotopic form, or a mixture of isotopic forms thereof), an alkoxy, an aryloxy, an amide, or an azide; A is a Group 14 element, such as Si, Ge, Pb, or Sn; and X is a functional group that can serve as an anionic ligand. In particular embodiments, X is a halide (Br, Cl, I, or F), an alkoxy (—$OR^2$, wherein $R^2$ is an aliphatic group, such as an alkyl, alkenyl, or alkynyl group), an aryloxy (—$OR^2$, wherein $R^2$ an aryl group or an aliphatic-aryl group), an amide (—$N(R^3)C(O)R^3$ or —$C(O)N(R^3)_2$, wherein each $R^3$ independently is hydrogen; an aliphatic group, such as an alkyl, alkenyl, or alkynyl group; an aromatic group, such as aryl or heteroaryl; or a heteroaliphatic group, such as alkoxy, thioether, and the like); or an azide. In embodiments where X is a halide, the halide can be a single isotopic species, or a mixture of isotopic species. In particular disclosed embodiments, the halide can be a single isotope of Cl, Br, I, or F; or it can comprise a mixture of isotopes of Cl, Br, I, or F. Typically, the isotopes are those that are stable and/or abundant, as understood by people of ordinary skill in the art with the benefit of the present disclosure. In some embodiments, if X is Br, it can comprise $^{79}$Br, $^{81}$Br, or a combination thereof. In some embodiments, if Xi is I, it can comprise $^{127}$I, $^{129}$I, or a combination thereof. In some embodiments, if X is F, it can comprise $^{19}$F, $^{18}$F, or a combination thereof. In particular disclosed embodiments, X is Cl (which can comprise $^{35}$Cl, $^{37}$Cl, or both), Br (which can comprise $^{79}$Br, $^{81}$Br, or both), I (which can comprise $^{127}$I, $^{129}$I, or a combination thereof), F (which can comprise $^{19}$F, $^{18}$F, or a combination thereof), —OMe, —OPh, —OBn, —$N(R^3)C(O)R^3$, or —$N_3$. In exemplary embodiments, the Group 14 element-containing reagent is a silyl reagent having a structure satisfying a formula (R)(R')(R'')SiX, wherein each of R, R', R'', and X can be as defined above. In particular exemplary embodiments, $Me_3SiCl$ (e.g., $Me_3Si^{35}Cl$, $Me_3Si^{37}Cl$, or a combination thereof), $Me_3SiI$, $Me_3SiBr$, $Et_3SiF$, and $Me_3SiN_3$ can be used.

Solely by way of example, a silyl reagent comprising $^{37}$Cl can be made by reacting a compound having a structure satisfying a formula (R)(R')(R'')SiZ (wherein each of R, R', and R'' independently can be as provided above and Z can be F, Cl (e.g., $^{35}$Cl), Br, I, alkoxy, $NO_3$, thioether, amine, azide, or another group that can be eliminated) with an $M^{37}Cl$ salt (wherein M is a Group I metal, such as Li, Na, K, Rb, or Cs). The resulting product is then removed from the reaction mixture by filtration and/or distillation. These silyl reagents are particularly useful for use in preparing complexes for use in molten salt reactor chemistry. In particular embodiments, the silyl reagent is $Me_3Si^{37}Cl$.

In embodiments for making lanthanide metal, rare earth metal, transition metal, and/or main group metal complexes, the Group 14 element-containing reagent can be provided in an amount sufficient to provide two to eight (or more) equivalents of the corresponding "X" group (from (R)(R')(R'')AX) to the metal precursor, wherein the number of equivalents is stated with respect to the metal precursor. In particular embodiments, at least 1 equivalent of a silyl reagent can be used, such as 1.5 to 6 (or more) equivalents, or 2 to 6 equivalents. In some other embodiments, up to six equivalents of a silyl reagent can be used, with particular embodiments using six equivalents to make lanthanide(III) chloride complexes. In some other embodiments, up to three equivalents of a silyl reagent can be used, with particular embodiments using three equivalents to make lanthanide (III) bromide complexes. In yet additional embodiments, 1.5 to 2 equivalents of a silyl reagent can be used, with particular embodiments using 2 equivalents to make lanthanide(II) chloride complexes. In yet additional embodiments, up to 2 equivalents of a silyl reagent can be used, with particular embodiments using 2 equivalents to make lanthanide(II) bromide complexes. In any of these embodiments, other Group 14 element-containing reagents can be used in the method. In any or all of these embodiments, the halide can comprise a single isotope or a mixture of isotopes. In particular embodiments, the halide can be $^{35}$Cl, $^{37}$Cl, or a combination thereof.

In embodiments of making an actinide complex, the Group 14 element-containing reagent can be provided in an amount sufficient to provide 1.5 to 20 equivalents, such as two to eight (or more) equivalents, of the Group 14 element-containing reagent to the actinide metal precursor. In particular embodiments, 2.5 to 4 equivalents of a silyl reagent can be used, such as 2.5 to 3 equivalents of $Me_3SiCl$, $Me_3SiI$, $Me_3SiBr$, or $Et_3SiF$. In some other embodiments, up to eight equivalents of a silyl reagent can be used, with particular embodiments using eight equivalents of a silyl chloride to make uranium(IV) chloride complexes. In embodiments using a silyl bromide, 2.5 or more equivalents of the silyl bromide can be used. In some embodiments, three equivalents of the silyl reagent are used to provide uranium(III) halide complexes and eight equivalents of the silyl reagent are used to provide uranium(IV) halide complexes. In representative embodiments, 3 equivalents of Me$_3$SiCl are used to make UCl$_3$(py)$_4$, (31) 3 equivalents of Me$_3$SiBr are used to make UBr$_3$(py)$_4$, (42) and eight equivalents of Me$_3$SiCl are used to make UCl$_4$(py)$_4$, (36). In other representative embodiments, 6 equivalents of Me$_3$SiCl are used to make ThCl$_4$(py)$_4$ and 6 equivalents of Me$_3$SiBr are used to make ThBr$_4$(py)$_4$. In any of these embodiments, other Group 14 element-containing reagents can be used in the method. In any or all of these embodiments, the halide can comprise a single isotope or a mixture of isotopes. In particular embodiments, the halide can be $^{35}$Cl, $^{37}$Cl, or a combination thereof. In representative embodiments for making an actinide(II) complex, such as an americium or curium complex, 1.75 equivalents to 2 equivalents of the silyl reagent can be used.

In yet additional embodiments, uranium(IV) halide complexes can be reduced to uranium(III) halide complexes. In such embodiments, the uranium(IV) complex can be treated with uranium metal in a suitable solvent (e.g., pyridine). In some embodiments, the resulting reaction mixture is heated at temperatures ranging from greater than ambient temperature to 50° C., such as 30° C. to 45° C., or 30° C. to 40° C.

The neutral ligand precursor can be a solid or a liquid and in particular disclosed embodiments, the neutral ligand precursor is anhydrous. In some embodiments, the neutral ligand precursor is a nitrogen-containing compound, such as an aromatic nitrogen-containing compound; however, any suitable neutral ligand precursor can be used as long as it also is capable of forming a bond with the A atom of the Group 14 element-containing reagent. Aromatic nitrogen-containing compounds can include, but are not limited to, quinoline, pyridine, or substituted versions thereof (e.g., quinoline substituted with one or more aliphatic, heteroaliphatic, haloaliphatic, or heteroatom functional groups; or pyridine substituted with one or more aliphatic, heteroaliphatic, haloaliphatic, or heteroatom functional groups). In some other embodiments, the neutral ligand precursor is a cyclic nitrogen-containing compound, such as piperidine, piperazine, morpholine, or substituted versions thereof (e.g., piperidine substituted with one or more aliphatic, heteroaliphatic, haloaliphatic, or heteroatom functional groups; piperazine substituted with one or more aliphatic, heteroaliphatic, haloaliphatic, or heteroatom functional groups; or morpholine substituted with one or more aliphatic, heteroaliphatic, haloaliphatic, or heteroatom functional groups). In exemplary embodiments, a pyridine solvent is used and, in particular, anhydrous pyridine.

In embodiments of the method that are used to make lanthanide, rare earth, transition, and/or main group metal complexes, the neutral ligand precursor can be used in amounts ranging from 10 equivalents or more, such as 10 equivalents to 500 (or higher) equivalents, or 50 equivalents to 500 equivalents, or 80 equivalents to 200 equivalents. In particular embodiments, a nitrogen-containing compound is used as the neutral ligand precursor (e.g., pyridine) and is used in an amount ranging from 10 equivalents to 100 equivalents relative to the metal precursor, with particular embodiments using 100 equivalents of the neutral ligand precursor.

In some embodiments, the neutral ligand precursor can be used in amounts ranging from greater than zero equivalents, such as 1 equivalent to 500 equivalents, or 10 equivalents to 500 equivalents, or 50 equivalents to 500 equivalents, or 80 equivalents to 200 equivalents. In particular embodiments, a nitrogen-containing compound is used as the neutral ligand precursor (e.g., pyridine) and is used in an amount ranging from 10 equivalents to 100 equivalents relative to the metal precursor, with particular embodiments using 100 equivalents of the ligand precursor.

One representative embodiment of the disclosed method is described. In this embodiment, a lanthanide metal and Me$_3$SiCl (six equivalents relative to the lanthanide metal) are heated in anhydrous pyridine at 100° C. for 18 hours. The solution is then cooled to ambient temperature and pentane is added. LnCl$_3$(py)$_4$ is isolated (wherein Ln is La (e.g., see complex 1), Ce (e.g., see complex 2), Pr (e.g., see complex 3), Nd (e.g., see complex 4), Sm (e.g., see complex 5), Gd (e.g., see complex 6), Tb (e.g., see complex 7), Dy (e.g., see complex 8), Ho (e.g., see complex 9), Er (e.g., see complex 10), Tm (e.g., see complex 11), Yb (e.g., see complex 12), Lu (e.g., see complex 13)) by filtration and purified by rinsing with pentane followed by drying under vacuum.

Another representative embodiment of the disclosed method is described. In this embodiment, a lanthanide metal and Me$_3$SiBr (three equivalents relative to the lanthanide metal) are heated in anhydrous pyridine at 100° C. for 18 hours. The solution is then cooled to ambient temperature and pentane is added. LnBr$_3$(py)$_4$ is isolated (wherein Ln is La (e.g., see complex 14), Ce (e.g., see complex 15), Pr (e.g., see complex 16), Nd (e.g., see complex 17), Sm (e.g., see complex 18), Gd (e.g., see complex 19), Tb (e.g., see complex 20), Dy (e.g., see complex 21), Ho (e.g., see complex 22), Er (e.g., see complex 23), Tm (e.g., see complex 24), Yb (e.g., see complex 25), Lu (e.g., see complex 26)) by filtration and purified by rinsing with pentane followed by drying under vacuum.

Another representative embodiment of the disclosed method is described. In this embodiment, zinc (or manganese) and Me$_3$SiCl (two equivalents relative to the zinc or manganese) are heated in anhydrous pyridine at 100° C. for 18 hours. The solution is then cooled to ambient temperature and pentane is added. ZnCl$_2$(py)$_2$ (or MnCl$_2$(py)$_2$) is isolated by filtration and purified by rinsing with pentane followed by drying under vacuum.

Yet another representative embodiment of the disclosed method is described. In this embodiment, zinc (or manganese) and Me$_3$SiBr (two equivalents relative to the zinc or manganese) are heated in anhydrous pyridine at 100° C. for 18 hours. The solution is then cooled to ambient temperature and pentane is added. ZnBr$_2$(py)$_2$ (or MnBr$_2$(py)$_2$) is isolated by filtration and purified by rinsing with pentane followed by drying under vacuum.

A representative embodiment of the disclosed method used to make actinide complexes is described. In this embodiment, uranium turnings and Me$_3$SiCl (three equivalents relative to the uranium turnings) are heated in anhydrous pyridine at 100° C. for 18 hours. The solution is then cooled to ambient temperature and pentane is added. UCl$_3$(py)$_4$ (31) is isolated by filtration and purified by rinsing with pentane followed by drying under vacuum.

Another representative embodiment of the disclosed method is described. In this embodiment, uranium turnings and Me$_3$SiI (three equivalents relative to the uranium turnings) are heated in anhydrous pyridine at 100° C. for 18 hours. The solution is then cooled to ambient temperature and pentane is added. UI$_3$py$_4$ is isolated by filtration and purified by rinsing with pentane followed by drying under vacuum.

Another representative embodiment of the disclosed method is described. In this embodiment, uranium turnings and Me$_3$SiBr (three equivalents relative to the uranium turnings) are heated in anhydrous pyridine at 100° C. for 18 hours. The solution is then cooled to ambient temperature and pentane is added. UBr$_3$(py)$_4$ (42) is isolated by filtration and purified by rinsing with pentane followed by drying under vacuum.

Yet another representative embodiment of the disclosed method is described. In this embodiment, uranium turnings and Me$_3$SiCl (eight equivalents relative to the uranium turnings) are heated in anhydrous pyridine at 100° C. for 18 hours. The solution is then cooled to ambient temperature and pentane is added. UCl$_4$(py)$_4$ (36) is isolated by filtration and purified by rinsing with pentane followed by drying under vacuum.

In yet another representative embodiment, thorium turnings and 6 equivalents Me$_3$SiCl (or Me$_3$SiBr) are heated in pyridine at 100° C. for 18 hours. The solution is then cooled to ambient temperature and pentane is added. ThCl$_4$(py)$_4$ (44) (or ThBr$_4$(py)$_4$ (45)) is isolated by filtration and purified by rinsing with pentane followed by drying under vacuum.

IV. Compounds and Uses

Figure 36:
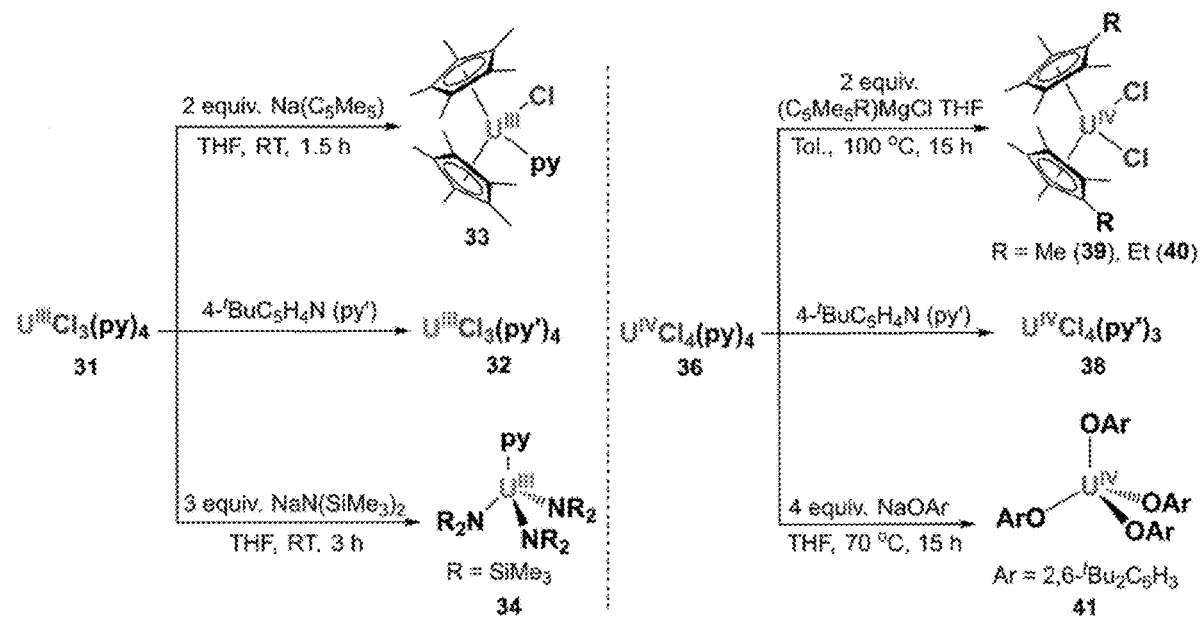
FIG. 36 is a schematic illustration showing different uses of uranium halide complexes in making a variety of organometallic compounds featuring metallocene rings and heteroatom bonds.

The metal complexes described herein can be used in a variety of applications, such as catalysts (e.g., catalysts for pharmaceutical synthesis and/or catalysts for biomass conversion), LED phosphors, scintillator materials, and magnetic materials, to name a few. In particular embodiments, divalent, trivalent, and/or tetravalent actinide complexes suitable for use as nuclear fuels, starting materials for chemical synthesis, and other applications can be made. In particular disclosed embodiments, the actinide complexes, and particularly the actinide halide complexes made using the disclosed method can be used as nuclear fuels and/or coolants in molten chloride fast reactors. In yet additional embodiments, the disclosed method can be used to provide actinide complexes that can be used as starting materials to provide other actinide-containing complexes. Exemplary conversions of certain actinide complexes of the present disclosure are illustrated in FIG. 36, wherein a uranium chloride complex undergoes organometallic functionalization with various different reagents, such as cyclopentadiene reagents, substituted aromatic amine compounds, amine compounds, and alkoxy compounds, to provide different uranium complexes. Examples of these conversions are described in detail below.

As discussed above, method embodiments disclosed herein can provide metal complexes including a wide range of metal centers with various different types of ligands attached thereto. In some embodiments, the metal complexes can comprise halide. In yet additional embodiments, the metal complexes can comprise counterions (or ligands) other than halides, such as such as alkoxy groups, aryloxy groups, azide groups, and amide groups, provided by the Group 14 element-containing reagent. In some embodiments, the metal complexes further comprise one or more ligands provided by the neutral ligand precursor used to make the metal complexes. In particular embodiments, the ligands can be nitrogen-containing compounds, such as pyridine ligands, quinoline ligands, piperidine ligands, piperazine ligands, morpholine ligands (and any substituted versions thereof), or combinations thereof.

In particular embodiments, lanthanide halide complexes, such as lanthanide(II) or lanthanide(III) complexes, comprising a halide, such as Cl, Br, I, F, and the like, can be made.

In additional embodiments, transition metal complexes, such as manganese(II) or zinc(II) complexes, comprising a halide, such as Cl, Br, I, F, and the like, can be made. In yet additional embodiments, rare earth metal complexes, such as scandium(III) or yttrium(III) complexes, comprising a halide, such as Cl, Br, I, F, and the like, can be made. In yet additional embodiments, main group metal complexes, such as aluminum(III) complexes, comprising a halide, such as Cl, Br, I, F, and the like, can be made. In any such embodiments, the halide can comprise a single isotope or a mixture of isotopes.

In yet additional embodiments, the method embodiments disclosed herein can be used to make actinide complexes comprising oxidation states of the actinide that range from (II) to (VI), particularly actinide(II), actinide(III), actinide (IV), actinide(V), and actinide(VI) complexes. In particular embodiments, uranium halide complexes, such as uranium (III) or uranium(IV) complexes, comprising an anionic ligand, such as a halide (e.g., Cl, Br, I, or F), an alkoxy group, an aryloxy group, an amide group, or an azide group, can be made. In additional embodiments, thorium complexes, such as thorium(IV) complexes, comprising an anionic ligand, such as a halide (e.g., Cl, Br, I, or F), an alkoxy group, an aryloxy group, an amide group, or an azide group, can be made. In additional embodiments, neptunium complexes, such as neptunium(III) or neptunium(IV) complexes, comprising an anionic ligand, such as a halide (e.g., Cl, Br, I, or F), an alkoxy group, an aryloxy group, an amide group, or an azide group, can be made. In yet additional embodiments, plutonium complexes, such as plutonium(III) or plutonium(IV) complexes, comprising an anionic ligand, such as a halide (e.g., Cl, Br, I, or F), an alkoxy group, an aryloxy group, an amide group, or an azide group, can be made. In yet additional embodiments, americium complexes, such as americium(II) or americium(III) complexes, comprising an anionic ligand, such as a halide (e.g., Cl, Br, I, or F), an alkoxy group, an aryloxy group, an amide group, or an azide group, can be made. In yet additional embodiments, curium complexes, such as curium(II) or curium(III) complexes, comprising an anionic ligand, such as a halide (e.g., Cl, Br, I, or F), an alkoxy group, an aryloxy group, an amide group, or an azide group, can be made. In yet additional embodiments, thorium complexes, such as thorium(III) or thorium(IV) complexes, comprising an anionic ligand, such as a halide (e.g., Cl, Br, I, or F), an alkoxy group, an aryloxy group, an amide group, or an azide group, can be made. In any such embodiments, the halide can comprise a single isotope or a mixture of isotopes. In some embodiments, the actinide complexes further comprise one or more neutral ligands provided by the neutral ligand precursor used to make the actinide complexes. In particular embodiments, the neutral ligands can be nitrogen-containing compounds, such as pyridine ligands, quinoline ligands, piperidine ligands, piperazine ligands, morpholine ligands (and any substituted versions thereof), or combinations thereof. Additional novel compounds include, but are not limited to, UCl$_4$(4-$^t$Bu-pyridine)$_3$ (e.g., see complex 38), UBr$_3$py$_4$ (e.g., see complex 42), UBr$_3$(THF)$_4$ (e.g., see complex 43), UBr$_3$, GdCl$_3$(py)$_4$ (e.g., see complex 6), DyCl$_3$(py)$_4$ (e.g., see complex 8), HoCl$_3$(py)$_4$ (e.g., see complex 9), TmCl$_3$(py)$_4$ (e.g., see complex 11), LaBr$_3$(py)$_4$ (e.g., see complex 14), PrBr$_3$(py)$_4$ (e.g., see complex 16), SmBr$_3$(py)$_4$ (e.g., see complex 18), GdBr$_3$(py)$_4$ (e.g., see complex 19), TbBr$_3$(py)$_4$ (e.g., see complex 20), DyBr$_3$(py)$_4$ (e.g., see complex 21), HoBr$_3$(py)$_4$ (e.g., see complex 22), ErBr$_3$(py)$_4$ (e.g., see complex 23), TmBr$_3$(py)$_4$ (e.g., see complex 24), YbBr$_3$(py)$_4$ (e.g., see complex 25), LuBr$_3$(py)$_4$ (e.g., see complex 26), EuBr$_2$(py)$_5$, EuI$_2$(py)$_4$, SmBr$_2$(py)$_5$, YbBr$_2$(py)$_4$, or YbI$_2$(py)$_4$.

In some embodiments, the complexes disclosed herein have utility in separations chemistry. For example, the disclosed method can be used to preferentially form metal complexes with certain metals over other metals. By way of example, reaction mixtures that result as by-products from various industrial processes (e.g., radiochemistry and the like) can include a mixture of metals that are capable of forming the metal complexes disclosed herein whereas other metals present in the mixture do not form metal complexes. As such, the metals that do not form complexes using the method can be separated from those that do and thus can be isolated and/or recycled for downstream use and/or disposal.

In some embodiments, the complexes can be used for molten salt reactor fuels. In additional embodiments, the disclosed complexes can be used in different types of chemical conversions. For example, the metal complexes can be used as starting materials to provide other metal-containing complexes. Exemplary conversions of certain metal complexes (e.g., lanthanide complexes) of the present disclosure are illustrated below in Scheme 4, wherein a lanthanide halide complex undergoes organometallic functionalization with various different reagents to form other organometallic complexes. Other exemplary conversions of other metal complexes (e.g., actinide complexes) are provided in FIG. 36. Examples of these conversions also are described in detail in the Examples section of the present disclosure.

Scheme 4

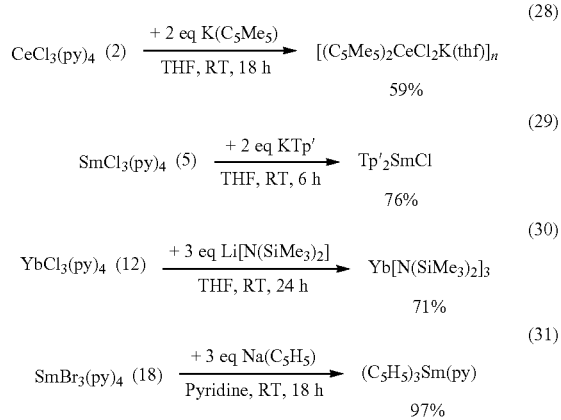

V. Overview of Several Embodiments

Disclosed herein are embodiments of a method for making metal complexes. In some embodiments, the method comprises heating a reaction mixture comprising a metal precursor, a nitrogen-containing compound, and a Group 14 element-containing reagent to provide a metal complex satisfying a formula MX$_n$(NCC)$_m$, wherein M is a lanthanide metal, an actinide metal, a rare earth metal, a transition metal, or main group metal; X is an anionic ligand; NCC is a nitrogen-containing compound; n is 2 to 6; and m is 1 to 5; wherein the Group 14 element-containing reagent has a structure satisfying a formula (R)(R')(R")AX, wherein each of R, R', and R" independently are selected from an aliphatic group, an aromatic group, a haloaliphatic group, a heteroaliphatic group, or an anionic group; A is a Group 14 element selected from Si, Ge, Sn, or Pb; and X is a functional group capable of serving as an anionic ligand; and provided that the metal precursor is not a uranyl salt or other metal oxide.

In some embodiments, heating comprises heating the reaction mixture at a temperature ranging from 40° C. to 150° C.

In any or all of the above embodiments, heating comprises heating the reaction mixture at a temperature ranging from 80° C. to 100° C.

In any or all of the above embodiments, the method further comprises isolating the metal complex by washing with a solvent in which the metal complex is not substantially soluble.

In any or all of the above embodiments, the method further comprises exposing the metal complex to reaction conditions sufficient to eliminate the nitrogen-containing compound to provide a compound having a formula MX$_n$.

In any or all of the above embodiments, the reaction conditions sufficient to eliminate the nitrogen-containing compound comprises heating the metal complex at a temperature sufficient to eliminate the nitrogen-containing compound and/or reducing the pressure of the reaction mixture.

In any or all of the above embodiments, the temperature ranges from 25° C. to 700° C. and/or the pressure can be vacuum pressure.

In any or all of the above embodiments, 1.5 equivalents to 20 equivalents of the Group 14 element-containing reagent are used.

In any or all of the above embodiments, the metal precursor is a lanthanide selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu); a rare earth element selected from Y or Sc; a transition metal selected from Zn, Co, Mn, or Mg; Al; or an actinide selected from actinium (Ac), thorium (Th), uranium (U), protactinium (Pa), berkelium (Bk), californium (Cf), einsteinium (Es), fermium (Fm), mendelevium (Md), nobelium (No), plutonium (Pu), neptunium (Np), americium (Am), lawrencium (Lr), or curium (Cm).

In any or all of the above embodiments, the nitrogen-containing compound is an aromatic nitrogen-containing compound or a cyclic nitrogen-containing compound.

In any or all of the above embodiments, the aromatic nitrogen-containing compound is quinoline, pyridine, or substituted versions thereof.

In any or all of the above embodiments, the cyclic nitrogen-containing compound is piperidine, piperazine, morpholine, or substituted versions thereof.

In any or all of the above embodiments, X is —OR$^2$, wherein R$^2$ is an aliphatic group, an aromatic group, or a combination thereof; a halide selected from —Cl, —Br, —F, —I, or any isotope thereof or any mixture of isotopes; —OH; —NO$_2$; —SH; —NH$_2$; —NO; —N$_3$; —P(O)(OH)$_2$; —S(O)$_2$OH; OOH; —SSH; —S(O)OH; —OP(O)OH$_2$; —OS(O)$_2$CF$_3$, or —NR$^3$C(O)R$^3$, wherein each R$^3$ independently is hydrogen; an aliphatic group; an aromatic group; or a heteroaliphatic group.

In any or all of the above embodiments, the Group 14 element-containing reagent is (R)(R')(R")SiCl, (R)(R')(R")SiI, or (R)(R')(R")SiBr, wherein each R, R', and R" independently is aliphatic or aromatic.

In any or all of the above embodiments, the Group 14 element-containing reagent is $Me_3Si^{35}Cl$ or $Me_3Si^{37}Cl$.

In any or all of the above embodiments, the metal complex is an actinide complex that comprises at least two anionic ligands and four neutral ligands.

In any or all of the above embodiments, the metal complex is an actinide complex that comprises three anionic ligands and four neutral ligands.

In any or all of the above embodiments, the metal complex is an actinide complex that comprises four anionic ligands and four neutral ligands.

In any or all of the above embodiments, the metal complex is an actinide complex that comprises five anionic ligands and four neutral ligands.

In any or all of the above embodiments, the metal complex is an actinide complex that comprises six anionic ligands and three neutral ligands.

In some embodiments, the method comprises heating a reaction mixture comprising an actinide metal precursor; pyridine; and $Me_3Si^{35}Cl$, $Me_3Si^{37}Cl$, or a mixture of $Me_3Si^{35}Cl$ and $Me_3Si^{37}Cl$, to provide an actinide complex satisfying a formula $M^{35}Cl_n(pyridine)_m$, $M^{37}Cl_n(pyridine)_m$, or a mixture thereof, wherein M is an actinide; n is 2 to 6; and m is 2 to 5; and provided that the actinide metal precursor is not a uranyl salt or other actinide oxide.

In any or all of the above embodiments, three equivalents of the Group 14 element-containing reagent are used.

In any or all of the above embodiments, eight equivalents of the Group 14 element-containing reagent are used.

In any or all of the above embodiments, the actinide is actinium, thorium, uranium, protactinium, berkelium, californium, einsteinium, fermium, mendelevium, nobelium, plutonium, neptunium, lawrencium, americium, or curium.

In some embodiments, the method comprises heating a reaction mixture comprising an lanthanide metal precursor; pyridine; and $Me_3Si^{35}Cl$, $Me_3Si^{37}Cl$, or a mixture of $Me_3Si^{35}Cl$ and $Me_3Si^{37}Cl$, to provide a lanthanide complex satisfying a formula $M^{35}Cl_n(pyridine)_m$, $M^{37}Cl_n(pyridine)_m$, or a mixture thereof, wherein M is an lanthanide; n is 2 to 6; and m is 2 to 5.

Also disclosed herein are embodiments of a metal halide complex. In some embodiments, the metal halide complex is selected from $GdCl_3(py)_4$, $DyCl_3(py)_4$, $HoCl_3(py)_4$, $TmCl_3(py)_4$, $LaBr_3(py)_4$, $PrBr_3(py)_4$, $SmBr_3(py)_4$, $GdBr_3(py)_4$, $TbBr_3(py)_4$, $DyBr_3(py)_4$, $HoBr_3(py)_4$, $ErBr_3(py)_4$, $TmBr_3(py)_4$, $YbBr_3(py)_4$, $LuBr_3(py)_4$, $EuBr_2(py)_5$, $EuI_2(py)_4$, $SmBr_2(py)_5$, $YbBr_2(py)_4$, $YbI_2(py)_4$, $UCl_4(4\text{-}^tBupy)_3$, $UBr_3(py)_4$, $U(Br)_3$, or $UBr_3(THF)_4$.

In any or all of the above embodiments, each Cl or Br ligand comprises a single isotope or a mixture of isotopes.

In some embodiments, the metal halide complex has a structure selected from $U^{37}Cl_3(py)_4$, $U^{37}Cl_4(py)_4$, $U^{37}Cl_3$, or $U^{37}Cl_4$.

VI. Examples

Unless otherwise noted, all reactions and manipulations were performed at ambient temperature in a recirculating Vacuum Atmospheres NEXUS model inert atmosphere (Ar or $N_2$) drybox equipped with a 40 CFM Dual Purifier NI-Train. Glassware was dried overnight at 150° C. before use. NMR spectra were obtained using a Bruker Avance 400 MHz spectrometer. Chemical shifts for $^1H$ NMR spectra are reported in parts per million (ppm) were referenced to proteo solvent impurities ($\delta$=1.72 for THF-$d_8$, 7.16 for $C_6D_6$, 5.32 for $CD_2Cl_2$, and 1.94 for $CD_3CN$). IR spectra were obtained using a Thermo Scientific Nicolet iS5 FT-IR spectrometer with a Golden Gate Diamond ATR (ZnSe lenses) with a reaction anvil. UV/Vis-NIR spectra were collected with a Perkin Elmer Lambda 1050 spectrometer using 1 mm pathlength cuvettes; two sample concentrations were measured to optimize absorbance between 0.1-1 mM in the NIR and UVNis regions. Melting points were measured with a Barnstead Thermolyne MEL-TEMPO Capillary Melting Point Apparatus using capillary tubes flame-sealed under nitrogen; values are uncorrected. Elemental analyses were performed by Atlantic Microlab, Inc. (Atlanta, GA).

Unless otherwise noted, reagents were purchased from chemical suppliers and used without further purification. Tetrahydrofuran-$d_8$, dichloromethane-$d_2$, acetonitrile-$d_3$ and $C_6D_6$ (Cambridge Isotope Laboratories) was purified by storage over 3 Å molecular sieves for 72 hours prior to use. 3 Å molecular sieves were dried under dynamic vacuum at 200° C. for 48 hours before use. All solvents were purchased (Aldrich) anhydrous and were dried over KH or Na for at least 24 hours, or 3 Å molecular sieves for 72 hours, then passed through an activated alumina plug. Solvents were all stored over 3 Å molecular sieves.

Examples 1-13

In the following examples, various lanthanide chloride complexes meeting a formula $LnCl_3(py)_4$, where Ln=La (1), Ce (2), Pr (3), Nd (4), Sm (5), Gd (6), Tb (7), Dy (8), Ho (9), Er (10), Tm (11), Yb (12), Lu (13); and py=pyridine, were made. Briefly, each complex was made by treating a suspension of the $Ln^0$ powder with six equivalents of $Me_3SiCl$ in pyridine at 100° C. for 18 hours. A dark red solution was produced from the formation of the by-product, NM-bistrimethylsilyl-1,1'-dihydro-4,4'-bipyridinylidene (BTDHB, CAS #: 13032-12-7), which was isolated and identified by $^1H$ NMR spectroscopy. After cooling the red solution to room temperature, pentane was added, precipitating a white or light grey powder, which was collected on a fritted funnel and washed with pentane until the red washings become colorless. The powder was dried under reduced pressure, yielding the $LnCl_3(py)_4$ complexes 1-13 in good to excellent yield. The method is summarized in Scheme 5, below. This methodology can also be performed on a variety of scales, from 30 mg to 3 g of metal powder. Characterization details for particular examples are provided below and, generally, the IR peaks observed for these compounds were as follows (in $cm^{-1}$): ~2960, ~1440, ~1066, ~1040, ~1005, ~756, ~700, ~670, and ~625.

Scheme 5

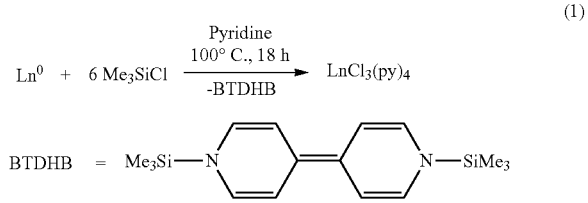

In some embodiments, $LaCl_3(py)_4$ (1) and $LaBr_3(py)_4$ (14) were obtained in lower yields (53% and 48%, respectively) when compared to the rest of the lanthanide series, e.g., $LnCl_3(py)_4$ (2-13, yields of 74-99%) and $LnBr_3(py)_4$ (15-26, yields of 69-97%). Without being limited to a particular theory of operation, it currently is believed that this result arises from the smaller commercially available mesh size of lanthanum powder than what is available for the rest of the lanthanide series. With a smaller mesh size, a larger surface area of oxidized metal and smaller quantities of $Ln^0$ are presumably present. Control reactions where pure $Ln_2O_3$ powder was used in place of $Ln^0$ powder show that the oxide is not converted to 1 or 14 under these conditions. As such, using larger mesh sizes of lanthanum powder could result in higher yields.

Example 1

Synthesis of $LaCl_3(py)_4$ (1): yield=53%. $^1$H NMR (tetrahydrofuran-$d_8$, 298 K): δ 8.58 (d, 2H, $J_{HH}$=4.7 Hz, o-CH), 7.66 (t, 1H, $J_{HH}$=7.2 Hz, p-CH), 7.26 (t, 2H, $J_{HH}$=6.6 Hz, m-CH. $\mu_{eff}$: 0.5$\mu_B$. m.p.>300° C. (Decomp). Anal. cald. for $LaCl_3(C_5H_5N)_{2.9}$: C, 36.41; H, 3.06; N, 8.49. Found: C, 36.47; H, 3.07; N, 8.25.

Example 2

Synthesis of $CeCl_3(py)_4$ (2): A 20 mL scintillation vial equipped with a stir bar was charged with 40 mesh Ce powder, pyridine, and trimethylsilylchloride. The vial was capped and stirred at 100° C. for 18 hours, gradually turning a dark red color. After cooling the solution to room temperature, 15 mL of pentane were added, and stirred for 15 min to precipitate a white solid from the red solution. The mixture was filtered on a medium porosity frit and washed with pentane until the red washings became clear. The white solid was then dried under vacuum and collected in a yield of 74%. X-Ray quality crystals were grown from the slow evaporation of pentane into a concentrated pyridine solution at −30° C. $^1$H NMR (tetrahydrofuran-$d_8$, 298 K): δ 8.56 (s, 2H, $v_{1/2}$=12 Hz, o-CH, 7.66 (s, 1H, $J_{HH}$=8.0 Hz, p-CH, 7.26 (t, 2H, $J_{HH}$=6.3 Hz, m-CM. $\mu_{eff}$: 2.1$\mu_B$. m.p.>300° C. (Decomp). Anal. cald. for $CeCl_3(C_5H_5N)_{3.5}$: C, 40.16; H, 3.37; N, 9.37. Found: C, 39.99; H, 3.46; N, 9.27.

Example 3

Synthesis of $PrCl_3(py)_4$ (3): yield=97%. $^1$H NMR (tetrahydrofuran-$d_8$, 298 K): δ 8.63 (s, 2H $v_{1/2}$=18 Hz, o-CH, 7.61 (s, 1H, $v_{1/2}$=27 Hz, p-CH, 7.23 (s, 2H, $v_{1/2}$=20 Hz, m-CH). $\mu_{eff}$: 3.6$\mu_B$. m.p.>300° C. (Decomp). Anal. cald. for $PrCl_3(C_5H_5N)_{3.5}$: C, 40.10; H, 3.37; N, 9.35. Found: C, 39.93; H, 3.60; N, 9.16.

Example 4

Synthesis of $NdCl_3(py)_4$ (4): yield=94%. $^1$H NMR (tetrahydrofuran-$d_8$, 298 K): δ 8.69 (s, 2H, $v_{1/2}$=51 Hz, o-CH), 7.64 (s, 1H, $v_{1/2}$=50 Hz, p-CH), 7.29 (s, 2H, $v_{1/2}$=41 Hz, m-CH). $\mu_{eff}$: 3.6$\mu_B$. m.p.>300° C. (Decomp). Anal. cald. for $NdCl_3(C_5H_5N)_{3.5}$: C, 39.85; H, 3.34; N, 9.29. Found: C, 40.24; H, 3.72; N, 9.17.

Example 5

Synthesis of $SmCl_3(py)_4$ (5): yield=99%. $^1$H NMR (tetrahydrofuran-$d_8$, 298 K): δ 8.62 (d, 2H, $J_{HH}$=4.8 Hz, o-CH), 7.67 (t, 1H, $J_{HH}$=7.8 Hz, p-CH), 7.26 (t, 2H, $J_{HH}$=6.1 Hz, m-CH). $\mu_{eff}$: 1.2$\mu_B$. m.p.>300° C. (Decomp). Anal. cald. for $SmCl_3(C_5H_5N)_{3.5}$: C, 39.39; H, 3.31; N, 9.19. Found: C, 39.01; H, 3.44; N, 8.84.

Example 6

Synthesis of $GdCl_3(py)_4$ (6): yield=96%. $^1$H NMR (tetrahydrofuran-$d_8$, 298 K): δ 7.51 (s, 2H, $v_{1/2}$=153 Hz, o-CH), 6.62 (s, 3H, $v_{1/2}$=179 Hz, p-CH+m-CH). $\mu_{eff}$: 8.4$\mu_B$. m.p.>300° C. (Decomp). Anal. cald. for $GdCl_3(C_5H_5N)_{3.8}$: C, 40.45; H, 3.39; N, 9.43. Found: C, 40.86; H, 3.52; N, 9.45.

Example 7

Synthesis of $TbCl_3(py)_4$ (7): yield=74%. $^1$H NMR (tetrahydrofuran-$d_8$, 298 K): δ 10.17 (s, 2H, $v_{1/2}$=250 Hz, o-CH), 7.79 (s, 1H, $v_{1/2}$=30 Hz, p-CH) 6.95 (s, 2H, $v_{1/2}$=37 Hz, m-CH). $\mu_{eff}$: 8.5$\mu_B$. m.p.>300° C. (Decomp). Anal. cald. for $TbCl_3(C_5H_5N)_{3.7}$: C, 39.65; H, 3.33; N, 9.25. Found: C, 39.56; H, 3.48; N, 9.15.

Example 8

Synthesis of $DyCl_3(py)_4$ (8): yield=99%. $^1$H NMR (tetrahydrofuran-$d_8$, 298 K): δ 9.91 (s, 2H, $v_{1/2}$=267 Hz, o-CH), 7.68 (s, 1H, $v_{1/2}$=70 Hz, p-CH), 7.10 (s, 2H, $v_{1/2}$=70 Hz, m-CH). $\mu_{eff}$: 11.2$\mu_B$. m.p.>300° C. (Decomp). Anal. cald. for $DyCl_3(C_5H_5N)_{3.7}$: C, 39.40; H, 3.31; N, 9.19. Found: C, 39.48; H, 3.28; N, 9.19.

Example 9

Synthesis of $HoCl_3(py)_4$ (9): yield=97%. $^1$H NMR (tetrahydrofuran-$d_8$, 298 K): δ 8.96 (s, 2H, $v_{1/2}$=139 Hz, o-CH), 7.46 (s, 1H, $v_{1/2}$=60 Hz, p-CH), 6.97 (s, 2H, $v_{1/2}$=55 Hz, m-CH). $\mu_{eff}$: 10.6$\mu_B$. m.p.>300° C. (Decomp). Anal. cald. for $HoCl_3(C_5H_5N)_{3.5}$: C, 38.35; H, 3.22; N, 8.94. Found: C, 38.66; H, 3.54; N, 8.85.

Example 10

Synthesis of $ErCl_3(py)_4$ (10): yield=96%. $^1$H NMR (tetrahydrofuran-$d_8$, 298 K): δ 8.46 (s, 2H, $v_{1/2}$=138 Hz, o-CH), 7.38 (s, 1H, $v_{1/2}$=73 Hz, p-CH), 6.87 (s, 2H, $v_{1/2}$=75 Hz, m-CH). $\mu_{eff}$: 8.9$\mu_B$. m.p.>300° C. (Decomp). Anal. cald. for $ErCl_3(C_5H_5N)_4$: C, 40.71; H, 3.42; N, 9.50. Found: C, 40.65; H, 3.45; N, 9.34.

Example 11

Synthesis of $TmCl_3(py)_4$ (11): yield=94%. $^1$H NMR (tetrahydrofuran-$d_8$, 298 K): δ 8.51 (s, 2H, $v_{1/2}$=65 Hz, o-CH), 7.32 (s, 1H, $v_{1/2}$=24 Hz, p-CH), 6.91 (s, 2H, $v_{1/2}$=23 Hz, m-CH). $\mu_{eff}$: 6.9$\mu_B$. m.p.>300° C. (Decomp). Anal. cald. for $TmCl_3(C_5H_5N)_4$: C, 40.60; H, 3.41; N, 9.47. Found: C, 40.24; H, 3.59; N, 9.30.

Example 12

Synthesis of $YbCl_3(py)_4$ (12): yield=98%. $^1$H NMR (tetrahydrofuran-$d_8$, 298 K): δ 9.37 (s, 2H, $v_{1/2}$=34 Hz, o-CH), 7.87 (s, 1H, $v_{1/2}$=20 Hz, p-CH), 7.53 (s, 2H, $v_{1/2}$=19 Hz, m-CH). $\mu_{eff}$: 3.2$\mu_B$. m.p.>300° C. (Decomp). Anal. cald. for $YbCl_3(C_5H_5N)_4$: C, 40.32; H, 3.38; N, 9.40. Found: C, 40.24; H, 3.37; N, 9.28.

Example 13

Synthesis of $LuCl_3(py)_4$ (13): yield=93%. $^1$H NMR (tetrahydrofuran-$d_8$, 298 K): δ 8.63 (d, 2H, $J_{HH}$=3.9 Hz, o-CH), 7.70 (t, 1H, $J_{HH}$=7.5 Hz, p-CH), 7.29 (t, 2H, $J_{HH}$=5.8 Hz, m-CH). $\mu_{eff}$: 0.2$\mu_B$. m.p.>300° C. (Decomp). Anal. cald. for $LuCl_3(C_5H_5N)_4$: C, 40.19; H, 3.37; N, 9.37. Found: C, 40.34; H, 3.50; N, 9.30.

Examples 14-26

In the following examples, the lanthanide bromide complexes meeting a formula $LnBr_3(py)_4$, wherein Ln=La (14), Ce (15), Pr (16), Nd (17), Sm (18), Gd (19), Tb (20), Dy (21), Ho (22), Er (23), Tm (24), Yb (25), Lu (26), were made. Briefly, a similar method to that described above for the chloride complexes was used, except that only three equivalents of $Me_3SiBr$ were required (see Scheme 6). The lanthanide bromide complexes 14-26 were also isolated in good to excellent yields (48-97%) as white or grey powders that have an array of pale secondary colors including yellow, green, and pink.

Scheme 6

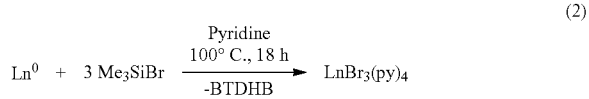

$$Ln^0 + 3\,Me_3SiBr \xrightarrow[-BTDHB]{\text{Pyridine} \atop 100^\circ C., 18\,h} LnBr_3(py)_4 \qquad (2)$$

Example 14

Synthesis of $LaBr_3(py)_4$ (14): yield=48%. $^1H$ NMR (tetrahydrofuran-$d_8$, 298 K): δ 8.54 (s, 2H, $v_{1/2}$=13 Hz, o-CH), 7.67 (t, 1H, $J_{HH}$=7.5 Hz, p-CH), 7.26 (t, 2H, $J_{HH}$=6.0 Hz, m-CH). m.p.>300° C. (Decomp). Anal. calcd. for $LaBr_3(C_5H_5N)_{3.5}$: C, 32.07; H, 2.69; N, 7.48. Found: C, 32.42; H, 2.96; N, 7.29.

Example 15

Synthesis of $CeBr_3(py)_4$ (15): yield=82%. $^1H$ NMR (tetrahydrofuran-$d_8$, 298 K): δ 8.60 (s, 2H, $v_{1/2}$=14 Hz, o-CH), 7.69 (s, 1H, $J_{HH}$=7.5 Hz, p-CH), 7.26 (t, 2H, $J_{HH}$=7.5 Hz, m-CH). $\mu_{eff}$: 2.3$\mu_B$. m.p.>300° C. (Decomp). Anal. calcd. for $CeBr_3(C_5H_5N)_{3.25}$: C, 30.64; H, 2.57; N, 7.15. Found: C, 30.37; H, 2.49; N, 7.03.

Example 16

Synthesis of $PrBr_3(py)_4$ (16): yield=92%. $^1H$ NMR (tetrahydrofuran-$d_8$, 298 K): δ 8.81 (s, 2H, $v_{1/2}$=28 Hz, o-CH), 7.84 (s, 1H, $v_{1/2}$=31 Hz, p-CH), 7.47 (t, 2H, $v_{1/2}$=28 Hz, m-CH). $\mu_{eff}$: 2.6$\mu_B$. m.p.>300° C. (Decomp). $PrBr_3(C_5H_5N)_{3.5}$: C, 31.97; H, 2.68; N, 7.46. Found: C, 32.01; H, 2.85; N, 7.32.

Example 17

Synthesis of $NdBr_3(py)_4$ (17): yield=97%. $^1H$ NMR (tetrahydrofuran-$d_8$, 298 K): δ 8.81 (s, 2H, $v_{1/2}$=21 Hz, o-CH), 7.83 (s, 1H, $v_{1/2}$=24 Hz, p-CH), 7.46 (s, 2H, $v_{1/2}$=22 Hz, m-CH). $\mu_{eff}$: 2.9$\mu_B$. m.p.>300° C. (Decomp). Anal. calcd. for $NdBr_3(C_5H_5N)_{3.75}$: C, 33.09; H, 2.78; N, 7.72. Found: C, 33.77; H, 3.18; N, 7.46.

Example 18

Synthesis of $SmBr_3(py)_4$ (18): yield=95%. A 20 mL scintillation vial equipped with a stir bar was charged with 116 mg of 40 mesh Sm powder (0.77 mmol), pyridine (5 mL), and trimethylsilylbromide (0.29 mL, 2.19 mmol). The vial was capped and stirred at 100° C. for 18 hours, gradually turning a dark red color. After cooling the solution to room temperature, 15 mL of pentane were added, and stirred for 15 minutes to precipitate a white solid from the red solution. The mixture was filtered on a medium porosity frit and washed with pentane until the red washings became clear. The white solid was then dried under vacuum and collected (515 mg, 0.73 mmol, 95%). X-Ray quality crystals were grown from the slow evaporation of pentane into a concentrated pyridine solution at −30° C. $^1H$ NMR (tetrahydrofuran-$d_8$, 298 K): δ 8.66 (d, 2H, $J_{HH}$=4.8 Hz, o-CH), 7.69 (t, 1H, $J_{HH}$=7.8 Hz, p-CH), 7.29 (t, 2H, $J_{HH}$=5.6 Hz, m-CH). $\mu_{eff}$: 1.0$\mu_B$. m.p.>300° C. (Decomp). Anal. calcd. for $SmBr_3(C_5H_5N)_4$: C, 34.00; H, 2.85; N, 7.93. Found: C, 33.84; H, 3.07; N, 7.46.

Example 19

Synthesis of $GdBr_3(py)_4$ (19): yield=89%. $^1H$ NMR (tetrahydrofuran-$d_8$, 298 K): δ 7.61 (s, 2H, $v_{1/2}$=31 Hz, o-CH), 7.03 (s, 3H, $v_{1/2}$=97 Hz, p-CH+m-CH). $\mu_{eff}$: 7.9$\mu_B$. m.p.>300° C. (Decomp). Anal. calcd. for $GdBr_3(C_5H_5N)_{3.66}$: C, 32.05; H, 2.69; N, 7.48. Found: C, 32.31; H, 2.99; N, 6.98.

Example 20

Synthesis of $TbBr_3(py)_4$ (20): yield=70%. $^1H$ NMR (tetrahydrofuran-$d_8$, 298 K): δ 9.02 (s, 2H, $v_{1/2}$=59 Hz, o-CH), 7.91 (s, 1H, $v_{1/2}$=31 Hz, p-CH), 7.45 (s, 2H, $v_{1/2}$=25 Hz, m-CH). $\mu_{eff}$: 9.2$\mu_B$. m.p.>300° C. (Decomp). Anal. calcd. for $TbBr_3(C_5H_5N)_{3.5}$: C, 31.12; H, 2.61; N, 7.26. Found: C, 31.25; H, 3.02; N, 6.88.

Example 21

Synthesis of $DyBr_3(py)_4$ (21): yield=88%. $^1H$ NMR (tetrahydrofuran-$d_8$, 298 K): δ 9.22 (s, 2H, $v_{1/2}$=221 Hz, o-CH), 8.68 (s, 1H, $v_{1/2}$=135 Hz, p-CH), 8.14 (s, 2H, $v_{1/2}$=132 Hz, m-CH). $\mu_{eff}$: 10.7$\mu_B$. m.p.>300° C. (Decomp). Anal. calcd. for $DyBr_3(C_5H_5N)_{3.5}$: C, 30.95; H, 2.60; N, 7.22. Found: C, 31.15; H, 3.14; N, 6.99.

Example 22

Synthesis of $HoBr_3(py)_4$ (22): yield=97%. $^1H$ NMR (tetrahydrofuran-$d_8$, 298 K): δ 8.70 (s, 2H, $v_{1/2}$=181 Hz, o-CH), 7.78 (s, 1H, $v_{1/2}$=102 Hz, p-CH), 7.38 (s, 2H, $v_{1/2}$=50 Hz, m-CH). $\mu_{eff}$: 7.9$\mu_B$. m.p.>300° C. (Decomp). Anal. calcd. for $HoBr_3(C_5H_5N)_{3.75}$: C, 32.11; H, 2.69; N, 7.49. Found: C, 32.20; H, 3.13; N, 6.91.

Example 23

Synthesis of $ErBr_3(py)_4$ (23): yield=69%. $^1H$ NMR (tetrahydrofuran-$d_8$, 298 K): δ 8.46 (s, 2H, $v_{1/2}$=138 Hz, o-CH), 7.78 (s, 1H, $v_{1/2}$=102 Hz, p-CH), 7.38 (s, 2H, $v_{1/2}$=50 Hz, m-CH). $\mu_{eff}$: 8.3$\mu_B$. m.p.>300° C. (Decomp). Anal. calcd. for $ErBr_3(C_5H_5N)_{3.75}$: C, 32.01; H, 2.69; N, 7.47. Found: C, 32.25; H, 3.04; N, 7.14.

Example 24

Synthesis of $TmBr_3(py)_4$ (24): yield=96%. $^1H$ NMR (tetrahydrofuran-$d_8$, 298 K): δ 9.27 (s, 2H, $v_{1/2}$=150 Hz, o-CH), 7.44 (s, 3H, $v_{1/2}$=33 Hz, p-CH+m-CH). $\mu_{eff}$: 5.5$\mu_B$. m.p.>300° C. (Decomp). Anal. calcd. for $TmBr_3(C_5H_5N)_4$: C, 40.60; H, 3.41; N, 9.47. Found: C, 40.24; H, 3.59; N, 9.30.

Example 25

Synthesis of YbBr$_3$(py)$_4$ (25): yield=81%. $^1$H NMR (tetrahydrofuran-d$_8$, 298 K): δ 8.80 (s, 2H, v$_{1/2}$=22 Hz, o-CH), 7.63 (t, 1H, J$_{HH}$=8.0 Hz, p-CH), 7.25 (t, 2H, J$_{HH}$=5.4 Hz, m-CH). μ$_{eff}$: 3.6μ$_B$. m.p.>300° C. (Decomp). Anal. cald. for YbBr$_3$(C$_5$H$_5$N)$_{3.8}$: C, 32.15; H, 2.70; N, 7.50. Found: C, 32.22; H, 3.15; N, 6.88.

Example 26

Synthesis of LuBr$_3$(py)$_4$ (26): yield=89%. $^1$H NMR (tetrahydrofuran-d$_8$, 298 K): δ 8.55 (d, 2H, J$_{HH}$=5 Hz, o-CH), 7.67 (t, 1H, J$_{HH}$=7.7 Hz, p-CH), 7.29 (t, 2H, J$_{HH}$=5.8 Hz, m-CH). μ$_{eff}$: 0.4μ$_B$. m.p.>300° C. (Decomp). Anal. cald. for LuBr$_3$(C$_5$H$_5$N)$_3$: C, 27.63; H, 2.32; N, 6.45. Found: C, 27.31; H, 2.61; N, 6.22.

Examples 27-32

In the following examples, divalent lanthanide halide complexes meeting a formula LnX$_2$(py)$_m$ (wherein Ln=Sm, Yb, and Eu; X=I or Br; and m=4 or 5) are made.

Example 27

Synthesis of SmBr$_2$(py)$_5$: A 20 mL scintillation vial was charged with a stir bar, Sm$^0$ (0.675 g, 4.49 mmol), Me$_3$SiBr (0.89 mL, 6.73 mmol) and pyridine (5 mL). The reaction mixture was stirred at 100° C. for 18 hours and was filtered through a pad of Celite on a glass-fiber pad in a pipette into a fresh vial. The solution was allowed to cool down to ambient temperature. Pentane (10 mL) was added and the mixture triturated for 20 minutes allowing precipitation of the product. The solid material was collected by vacuum filtration, washed with pentane (15 mL) and dried under reduced pressure to yield SmBr$_2$(py)$_5$ as a dark green solid (1.58 g, 2.24 mmol, 86% yield). Single crystals suitable for X-ray diffraction were obtained from a pyridine solution layered with an equal volume of pentane at −30° C. $^1$H NMR (tetrahydrofuran-d$_8$, 298 K): δ 8.54 (d, 2H, J$_{HH}$=4.4 Hz, o-CH), 7.64 (t, 1H, J$_{HH}$=8.2 Hz, p-CH), 7.24 (t, 2H, J$_{HH}$=5.2 Hz, m-CH). IR: 2966 s, 2919 s, 2879 m, 1599 m, 1486 w, 1441 m, 1219 w, 1152 w, 1067 w, 1036 w, 1003 w, 754 w, 697 m, 622 w. m.p.>300° C. (Decomp). Anal. cald. for SmBr$_2$(C$_5$H$_5$N)$_{2.5}$: C, 29.56; H, 2.48; N, 6.89. Found: C, 29.49; H, 2.75; N, 6.66.

Example 28

Synthesis of SmI$_2$(py)$_5$: A 20 mL scintillation vial was charged with a stir bar, Sm$^0$ (0.115 g, 0.765 mmol), Me$_3$SiI (0.160 mL, 1.15 mmol) and pyridine (5 mL). The reaction mixture was stirred at 100° C. for 18 hours and was filtered through a pad of Celite on a glass-fiber pad in a pipette into a fresh vial. The solution was allowed to cool down to ambient temperature. Pentane (15 mL) was added and the mixture triturated for 30 minutes allowing precipitation of the product. The solid material was collected by vacuum filtration, washed with pentane (10 mL) and dried under reduced pressure to yield SmI$_2$(py)$_5$ as a dark green solid (0.394 g, 0.493 mmol, 86% yield). Single crystals suitable for X-ray diffraction were obtained from a pyridine solution layered with an equal volume of pentane at −30° C. $^1$H NMR (tetrahydrofuran-d$_8$, 298 K): δ 8.43 (d, 2H, J$_{HH}$=3.8 Hz, o-CH), 7.55 (t, 1H, J$_{HH}$=7.6 Hz, p-CH), 7.15 (t, 2H, J$_{HH}$=6.5 Hz, m-CH). IR: 2966 s, 2936 s, 2879 m, 1593 m, 1573 w, 1486 w, 1439 s, 1218 w, 1149 w, 1067 w, 1032 w, 1000 w, 751 w, 615 w. m.p.>300° C. (Decomp). Anal. cald. for SmI$_2$(C$_5$H$_5$N)$_{4.67}$: C, 36.75; H, 1.67; N, 8.57. Found: C, 36.73; H, 3.32; N, 8.28.

Example 29

Synthesis of EuBr$_2$(py)$_5$: A 20 mL scintillation vial was charged with a stir bar, Eu$^0$ (0.109 g, 0.717 mmol), Me$_3$SiBr (0.190 mL, 1.43 mmol) and pyridine (5 mL). The reaction mixture was stirred at 100° C. for 18 hours and was filtered through a pad of Celite on a glass-fiber pad in a pipette into a fresh vial. The solution was allowed to cool down to ambient temperature. Pentane (15 mL) was added and the mixture triturated for 30 minutes allowing precipitation of the product. The solid material was collected by vacuum filtration, washed with pentane (10 mL) and dried under reduced pressure to yield EuBr$_2$(py)$_5$ as a light orange solid (0.399 g, 0.564 mmol, 79% yield). Single crystals suitable for X-ray diffraction were obtained from a pyridine solution layered with an equal volume of pentane at −30° C. $^1$H NMR (tetrahydrofuran-d$_8$, 298 K): δ 8.55 (s, 2H, v$_{1/2}$=264 Hz, o-CH), 7.61 (s, 1H, v$_{1/2}$=86 Hz, p-CH), 7.22 (s, 2H, v$_{1/2}$=97 Hz, m-CH). IR: 2966 s, 2936 s, 2879 m, 1594 w, 1488 w, 1439 m, 1216 w, 1149 w, 1070 w, 1034 w, 1001 w, 753 w, 698 w, 617 w. m.p.>300° C. (Decomp). Anal. cald. for EuBr$_2$(C$_5$H$_5$N)$_{1.9}$: C, 24.32; H, 2.04; N, 5.67. Found: C, 24.69; H, 2.02; N, 5.67.

Example 30

Synthesis of EuI$_2$(py)$_4$: A 20 mL scintillation vial was charged with a stir bar, Eu$^0$ (0.137 g, 0.902 mmol), Me$_3$SiI (0.260 mL, 1.80 mmol) and pyridine (5 mL). The reaction mixture was stirred at 100° C. for 18 hours and was filtered through a pad of Celite on a glass-fiber pad in a pipette into a fresh vial. The solution was allowed to cool down to ambient temperature. Pentane (15 mL) was added and the mixture triturated for 30 minutes allowing precipitation of the product. The solid material was collected by vacuum filtration, washed with pentane (10 mL) and dried under reduced pressure to yield EuI$_2$(py)$_4$ as a light orange solid (0.640 g, 0.890 mmol, 99% yield). Single crystals suitable for X-ray diffraction were obtained from a pyridine solution layered with an equal volume of pentane at −30° C. $^1$H NMR (tetrahydrofuran-d$_8$, 298 K): δ 8.53 (s, 2H, v$_{1/2}$=315 Hz, o-CH), 7.67 (s, 1H, v$_{1/2}$=18 Hz, p-CH), 7.21 (s, 2H, v$_{1/2}$=24 Hz, m-CH). IR: 2966 s, 2936 s, 2879 w, 1620 w, 1593 w, 1485 w, 1439 w, 1217 w, 1148 w, 1067 w, 1033 w, 1000 w, 866 w, 849 w, 750 w, 699 w, 679 w, 615 w. m.p.>300° C. (Decomp). Anal. cald. for EuI$_2$(C$_5$H$_5$N)$_{3.3}$: C, 29.90; H, 2.51; N, 6.97. Found: C, 30.06; H, 2.80; N, 6.77.

Example 31

Synthesis of YbBr$_2$(py)$_4$: A 20 mL scintillation vial was charged with a stir bar, Yb$^0$ (0.230 g, 1.33 mmol), Me$_3$SiBr (0.260 mL, 1.99 mmol) and pyridine (5 mL). The reaction mixture was stirred at 100° C. for 18 hours and was filtered through a pad of Celite on a glass-fiber pad in a pipette into a fresh vial. The solution was allowed to cool down to ambient temperature. Pentane (15 mL) was added and the mixture triturated for 30 minutes allowing precipitation of the product. The solid material was collected by vacuum filtration, washed with pentane (10 mL) and dried under reduced pressure to yield YbBr$_2$(py)$_4$ as a red solid (0.600 g, 0.924 mmol, 94% yield). Single crystals suitable for X-ray diffraction were obtained from a pyridine solution layered with an equal volume of pentane at −30° C. $^1$H NMR (tetrahydrofuran-d$_8$, 298 K): δ 8.55 (s, 2H, v$_{1/2}$=24 Hz, o-CH), 7.65 (s, 1H, v$_{1/2}$=23 Hz, p-CH), 7.25 (s, 2H, v$_{1/2}$=25 Hz, m-CH). IR: 2966 s, 2936 s, 2879 m, 1597 w, 1488 w, 1441 m, 1218 w, 1152 w, 1068 w, 1036 w, 1003 w, 752 w, 696 m, 620 w. m.p.>300° C. (Decomp). Anal. calcd. for YbBr$_2$(C$_5$H$_5$N)$_{2.3}$: C, 27.08; H, 2.27; N, 6.32. Found: C, 27.17; H, 2.54; N, 6.14.

Example 32

Synthesis of YbI$_2$(py)$_4$: A 20 mL scintillation vial was charged with a stir bar, Yb$^0$ (0.103 g, 0.595 mmol), Me$_3$SiI (0.127 mL, 0.893 mmol) and pyridine (5 mL). The reaction mixture was stirred at 100° C. for 18 hours and was filtered through a pad of Celite on a glass-fiber pad in a pipette into a fresh vial. The solution was allowed to cool down to ambient temperature. Pentane (15 mL) was added and the mixture triturated for 30 minutes allowing precipitation of the product. The solid material was collected by vacuum filtration, washed with pentane (10 mL) and dried under reduced pressure to yield YbI$_2$(py)$_4$ as a red solid (0.260 g, 0.350 mmol, 79% yield). Single crystals suitable for X-ray diffraction were obtained from a pyridine solution layered with an equal volume of pentane at −30° C. $^1$H NMR (tetrahydrofuran-d$_8$, 298 K): δ 8.60 (d, 2H, J$_{HH}$=3.4 Hz, o-CH), 7.66 (t, 1H, J$_{HH}$=7.2 Hz, p-CH), 7.26 (t, 2H, J$_{HH}$=6.2 Hz, m-CH). IR: 2965 s, 2935 s, 2879 m, 1622 w, 1593 m, 1583 w, 1483 w, 1455 w, 1437 s, 1254 w, 1216 w, 1151 w, 1082 w, 1065 w, 1034 w, 1001 w, 991 w, 965 w, 847 m, 760 m, 698 m, 678 w, 619 w. Anal. calcd. for YbI$_2$(C$_5$H$_5$N)$_4$: C, 32.32; H, 2.71; N, 7.54. Found: C, 32.66; H, 3.13; N, 7.45.

Example 33

In this example, characterization of certain lanthanide halide complexes was examined. The $^1$H NMR spectra of the lanthanide chloride and bromide series 1-26 only feature resonances corresponding to the coordinated pyridine ligands. Except for the diamagnetic La (1, 14) and Lu (13, 26) complexes, which show distinct splitting for the pyridine resonances, the $^1$H NMR resonances are paramagnetically broadened. The broadening increases across the series, reaching a maximum line width at half peak height of 267 Hz for DyCl$_3$(py)$_4$ (8). The observed line widths at half peak height then gradually decrease and become sharper from Dy to diamagnetic Lu.

The relative lability of the coordinated pyridine ligands also contributes to the broadened NMR resonances and is further evidenced by elemental analyses, where less than four pyridine ligands are calculated for the majority of the series. It also has been observed that recrystallizing the pyridine adducts from a THF solution affords LnX$_3$(thf)$_x$ complexes, which also suggests a degree of pyridine lability.

The effective magnetic moment ($\mu_{eff}$) for the lanthanide chlorides and bromides was calculated using the Evans method. The calculated $\mu_{eff}$ values roughly track with the observed broadening in the $^1$H NMR spectra, reflective of the effect of unpaired electrons. The $\mu_{eff}$ values for the bromide complexes (14-26) (min.: LaBr$_3$(py)$_4$ (14)=0.3$\mu_B$; max.: DyBr$_3$(py)$_4$ (21)=10.7$\mu_B$) are slightly smaller than the analogous lanthanide chloride values for most cases (LaCl$_3$(py)$_4$ (1)=0.5$\mu_B$; min.: LuCl$_3$(py)$_4$ (13)=0.2$\mu_B$; max.: DyCl$_3$(py)$_4$ (8)=11.2$\mu_B$), a phenomenon that has been observed between other metal-chloride and -bromide systems.

Lanthanide-ligand bonding displays very low energy IR bands (v$_{Ln-L}$<500 cm$^{-1}$), which are outside the observable window, and therefore cannot be used to distinguish between the metal centers or halides. Therefore, the IR spectra of the lanthanide chloride and bromide series (1-26) show similar profiles corresponding C—C and C—N vibrations of the coordinated pyridine moieties. These complexes display stretching frequencies that are also comparable to other reported metal pyridine coordination complexes. An IR spectrum of DyCl$_3$(py)$_4$ is provided by FIG. 1.

Figure 2:
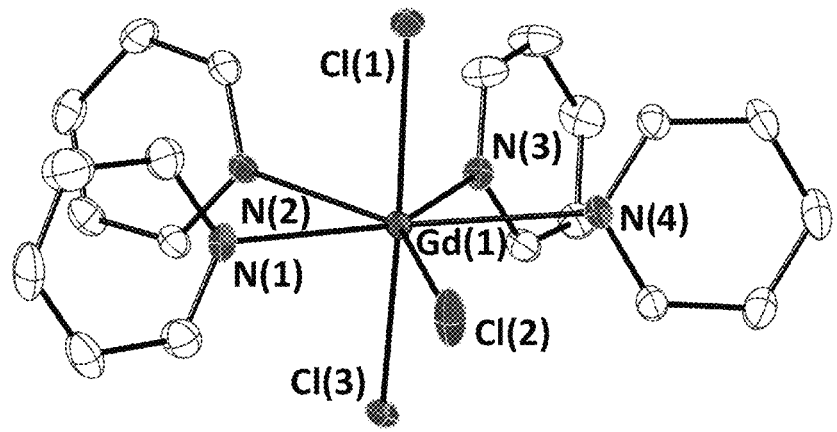
FIG. 2 is a solid-state structure for $GdCl_3(py)_4$ (6) shown at the 50% probability level; wherein hydrogen atoms are omitted for clarity.
Figure 3:
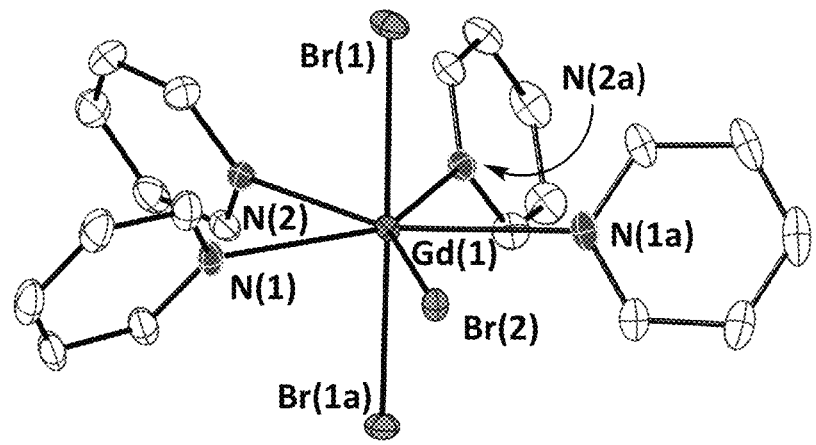
FIG. 3 is a solid-state structure for $GdBr_3(py)_4$ (19) shown at the 50% probability level; wherein hydrogen atoms are omitted for clarity.
Figure 4:
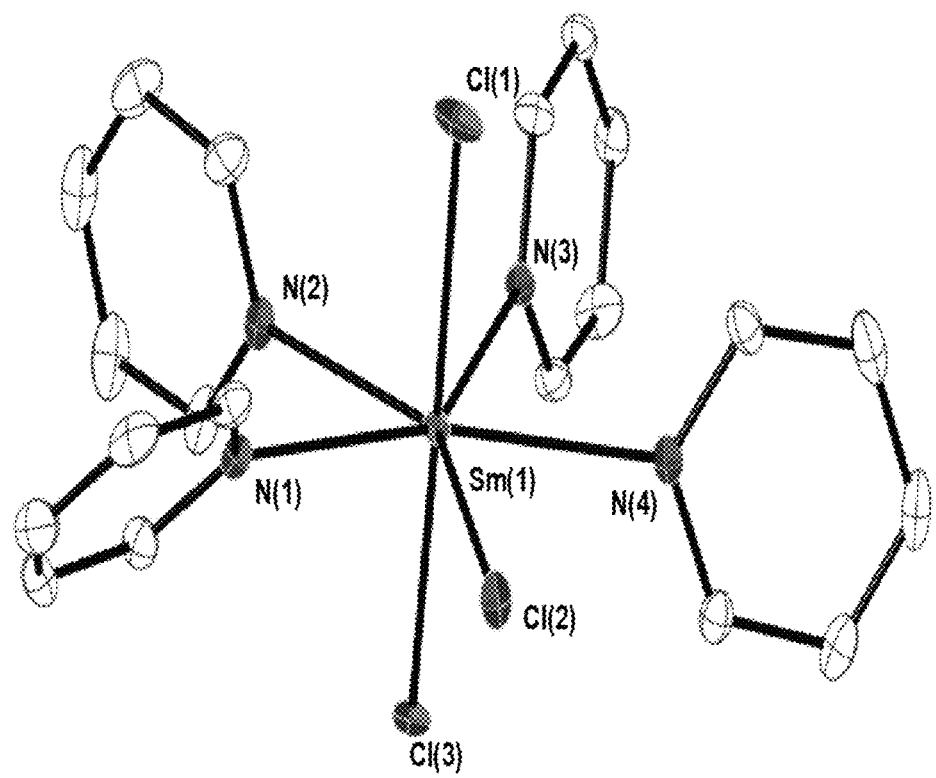
FIG. 4 is a solid-state structure for $SmCl_3(py)_4$ (5) shown at the 50% probability level; wherein hydrogen atoms are omitted for clarity.
Figure 5:
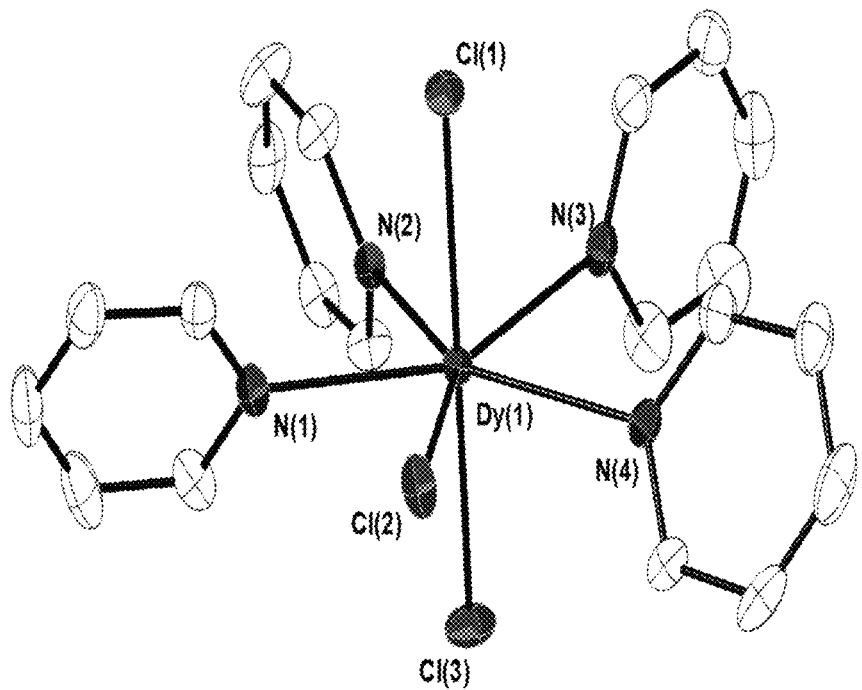
FIG. 5 is a solid-state structure for $DyCl_3(py)_4$ (8) shown at the 50% probability level; wherein hydrogen atoms are omitted for clarity.
Figure 6:
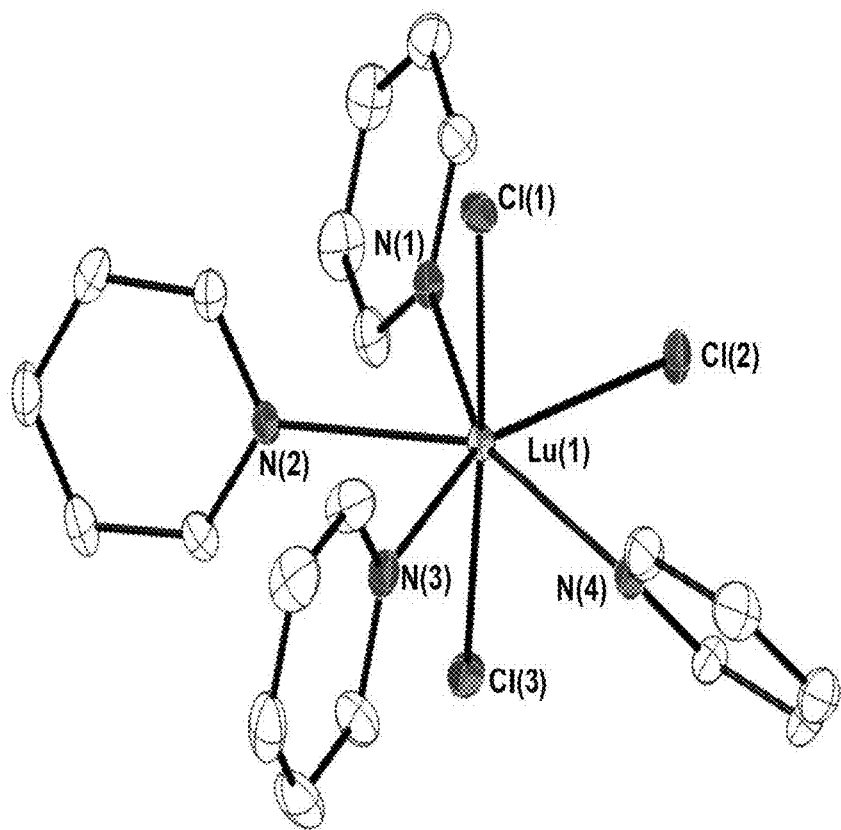
FIG. 6 is a solid-state structure for $LuCl_3(py)_4$ (13) shown at the 50% probability level; wherein hydrogen atoms are omitted for clarity.
Figure 7:
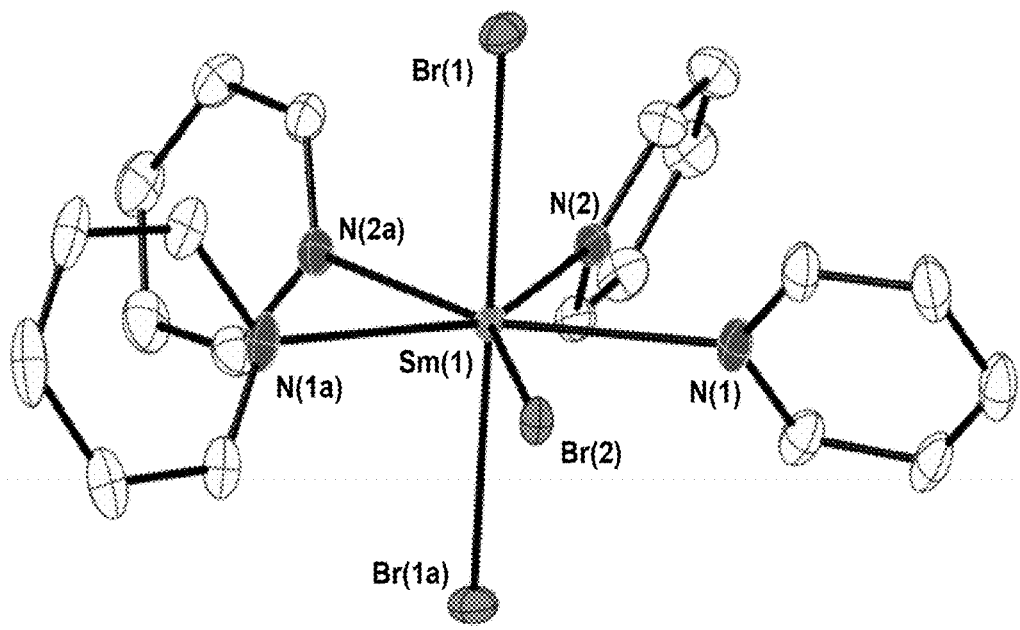
FIG. 7 is a solid-state structure for $SmBr_3(py)_4$ (18) shown at the 50% probability level; wherein hydrogen atoms are omitted for clarity.
Figure 8:
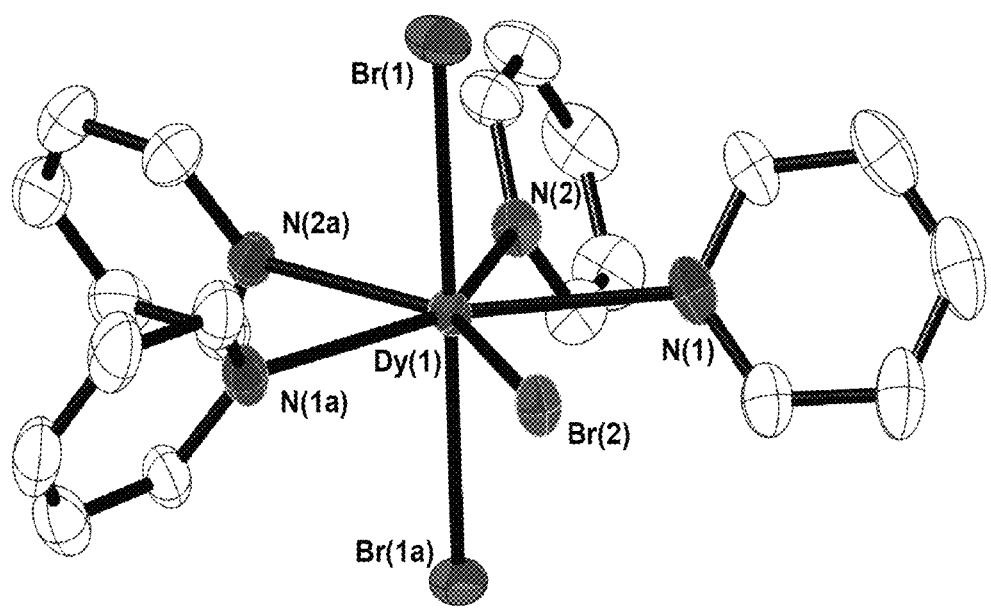
FIG. 8 is a solid-state structure for $DyBr_3(py)_4$ (21) shown at the 50% probability level; wherein hydrogen atoms are omitted for clarity.
Figure 9:
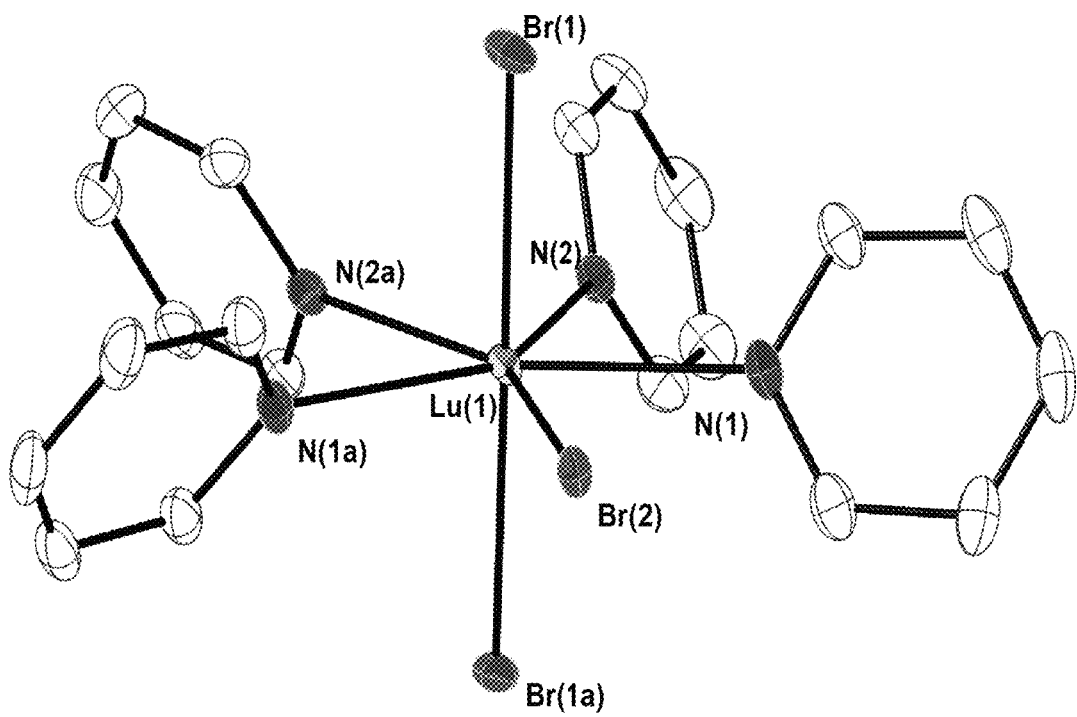
FIG. 9 is a solid-state structure for $LuBr_3(py)_4$ (26) shown at the 50% probability level; wherein hydrogen atoms are omitted for clarity.
Figure 10:
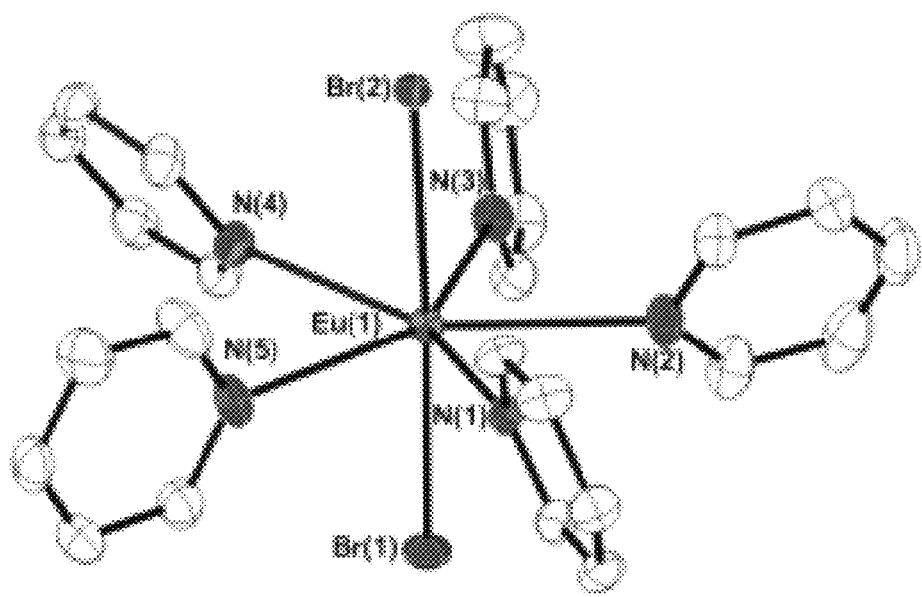
FIG. 10 is a solid-state structure for $EuBr_2(py)_5$ shown at the 50% probability level; wherein hydrogen atoms are omitted for clarity.
Figure 11:
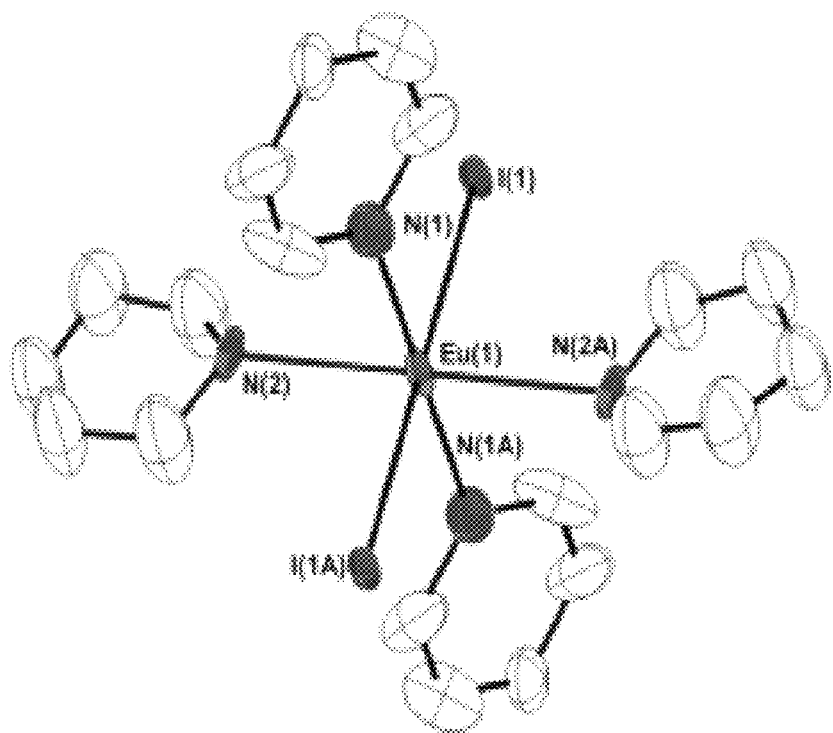
FIG. 11 is a solid-state structure for $EuI_2(py)_4$ shown at the 50% probability level; wherein hydrogen atoms are omitted for clarity.
Figure 12:
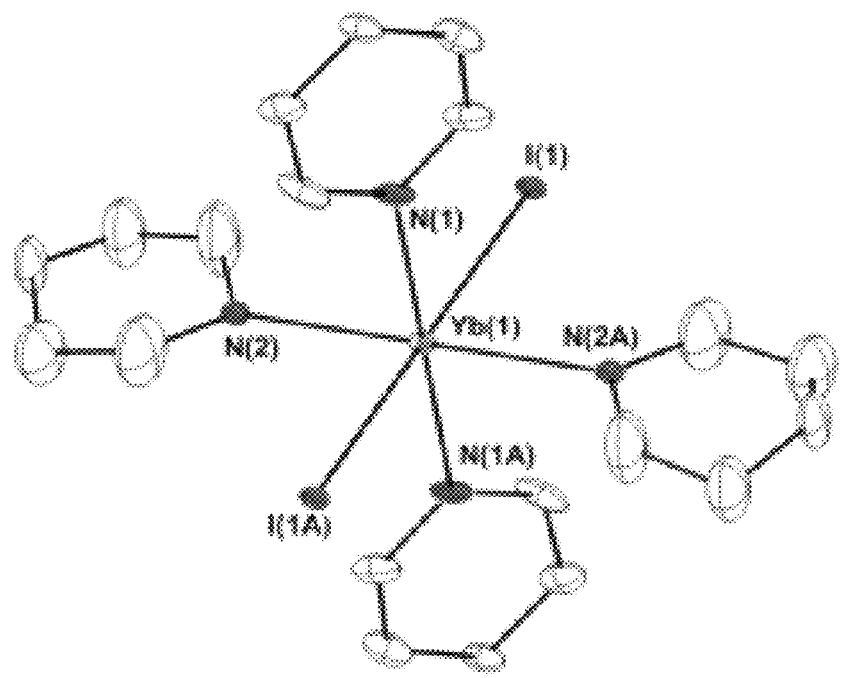
FIG. 12 is a solid-state structure for $YbI_2(py)_4$ shown at the 50% probability level; wherein hydrogen atoms are omitted for clarity.
Figure 13:
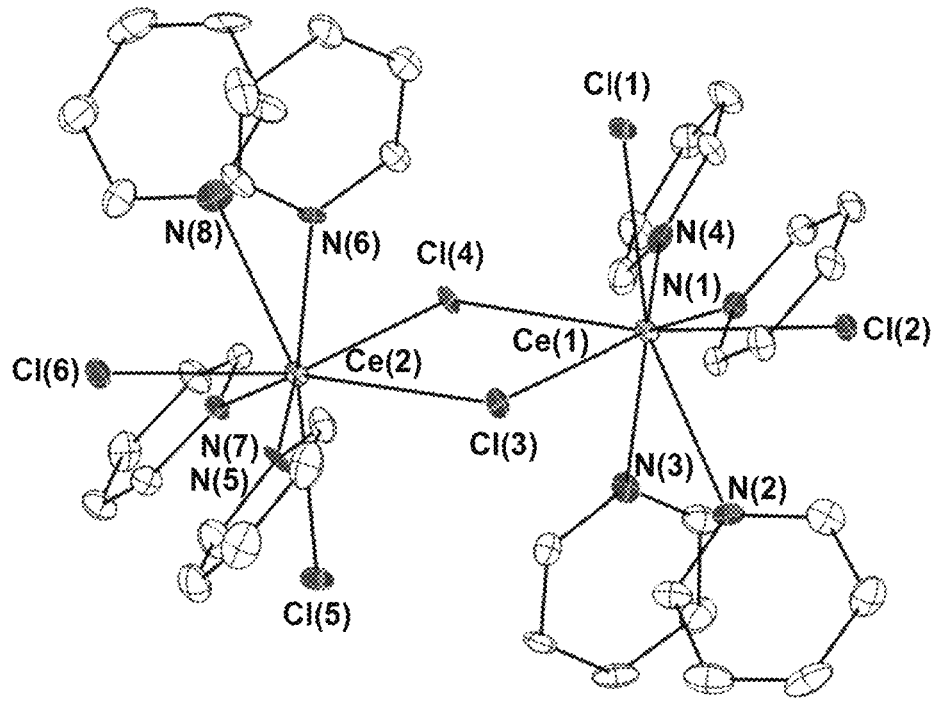
FIG. 13 is a solid-state structure of the $[CeCl_2(py)_4]_2(\mu\text{-}Cl_2)$ dimer (2a) shown at the 50% probability level; wherein the co-crystallized monomer and hydrogen atoms are omitted for clarity.
Figure 14:
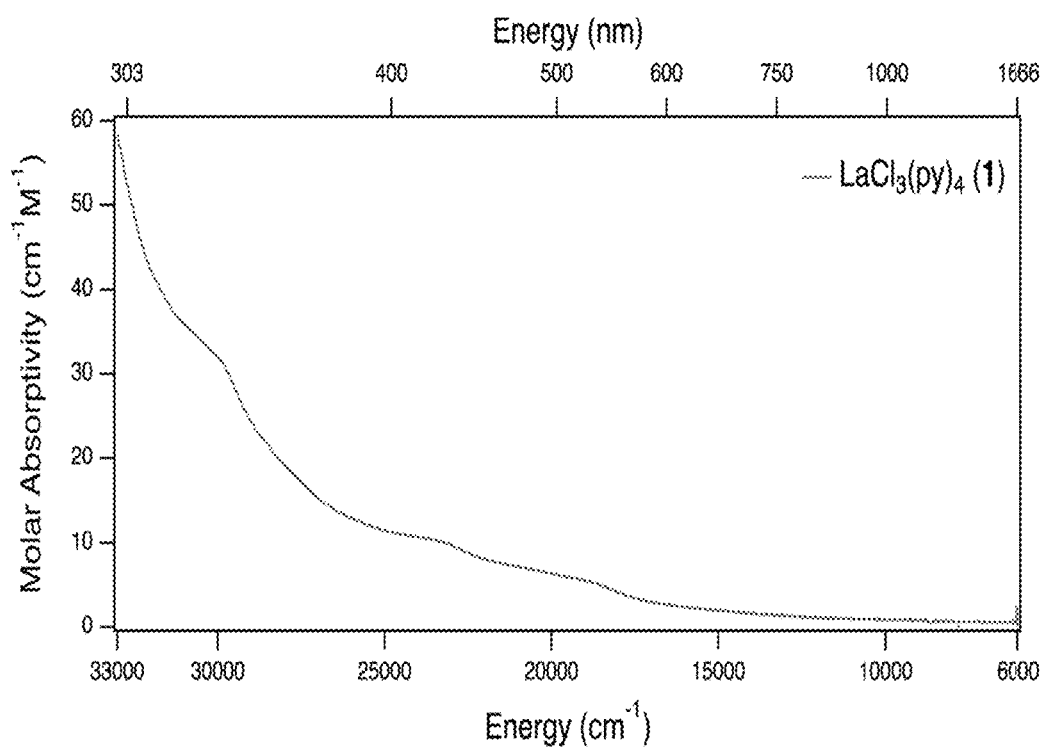
FIG. 14 is an ultraviolet-visible-Near Infrared (UV/Vis-NIR) spectrum of $LaCl_3(py)_4$ (1).
Figure 15:
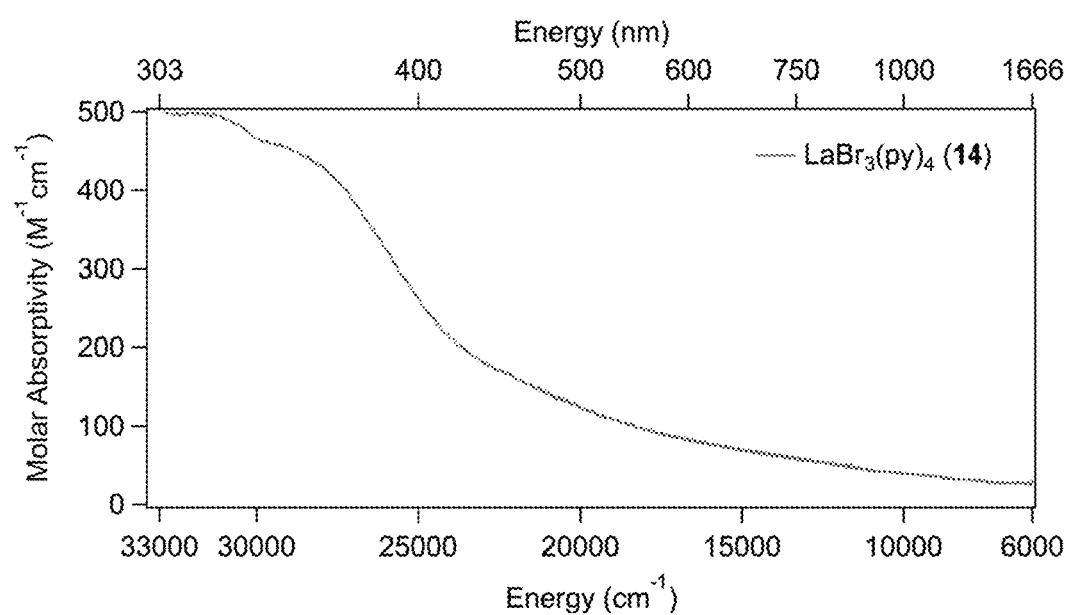
FIG. 15 is a UV/Vis-NIR spectrum of $LaBr_3(py)_4$ (14).
Figure 16:
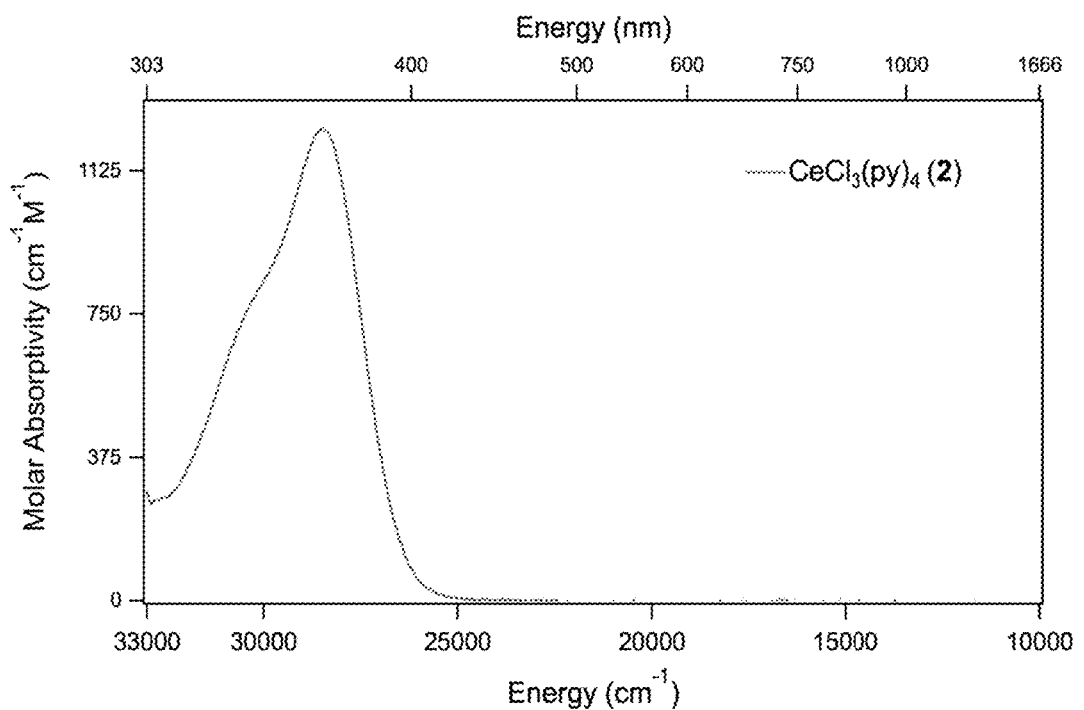
FIG. 16 is a UV/Vis-NIR spectrum of $CeCl_3(py)_4$ (2).
Figure 17:
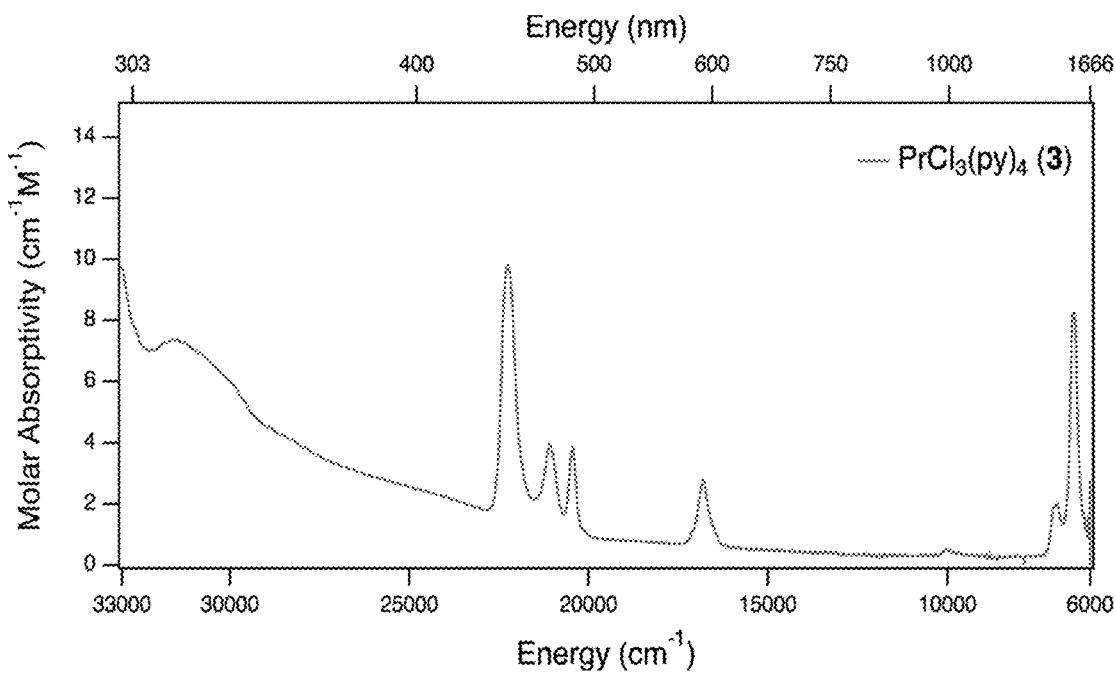
FIG. 17 is a UV/Vis-NIR spectrum of $PrCl_3(py)_4$ (3).
Figure 18:
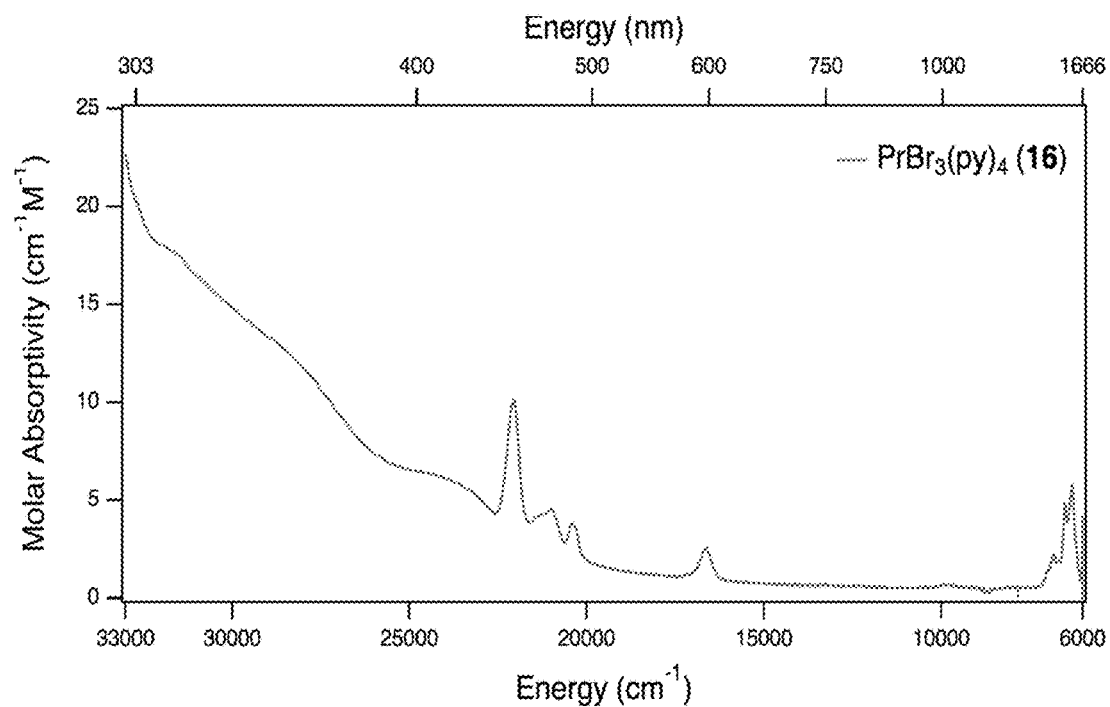
FIG. 18 is a UV/Vis-NIR spectrum of $PrBr_3(py)_4$ (16).
Figure 19:
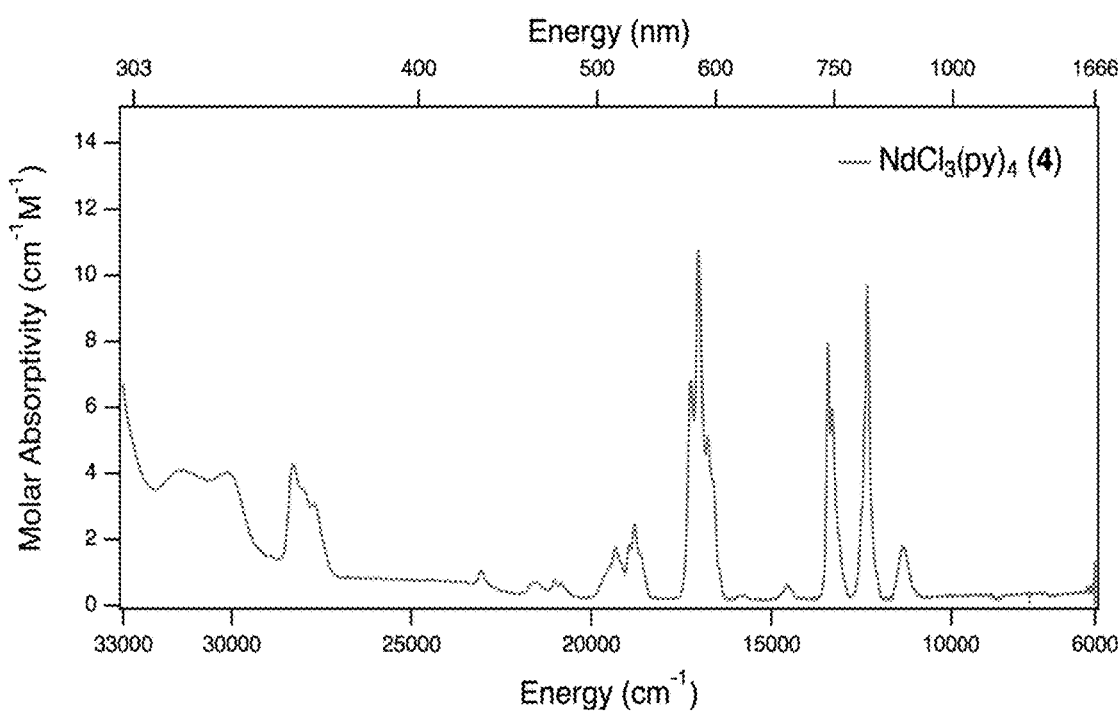
FIG. 19 is a UV/Vis-NIR spectrum of $NdCl_3(py)_4$ (4).
Figure 20:
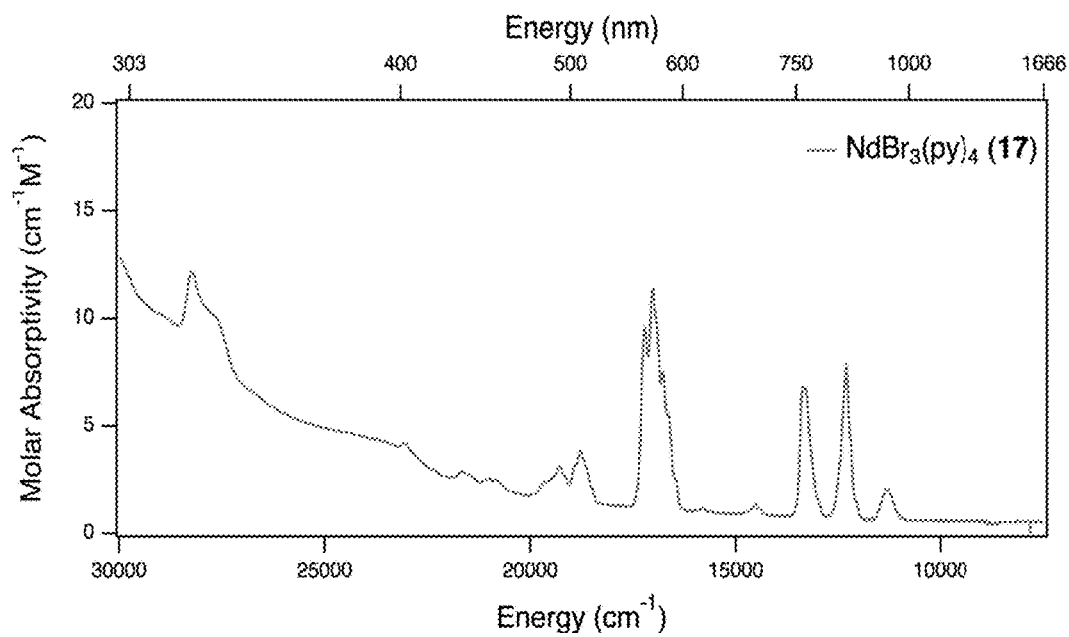
FIG. 20 is a UV/Vis-NIR spectrum of $NdBr_3(py)_4$ (17).
Figure 21:
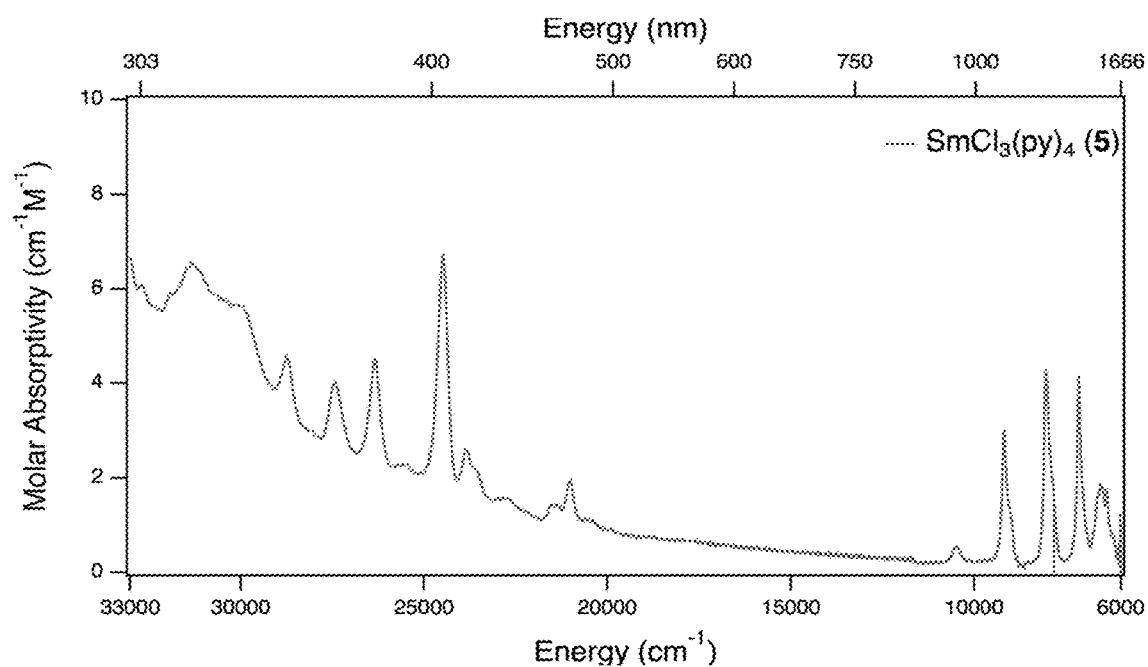
FIG. 21 is a UV/Vis-NIR spectrum of $SmCl_3(py)_4$ (5).
Figure 22:
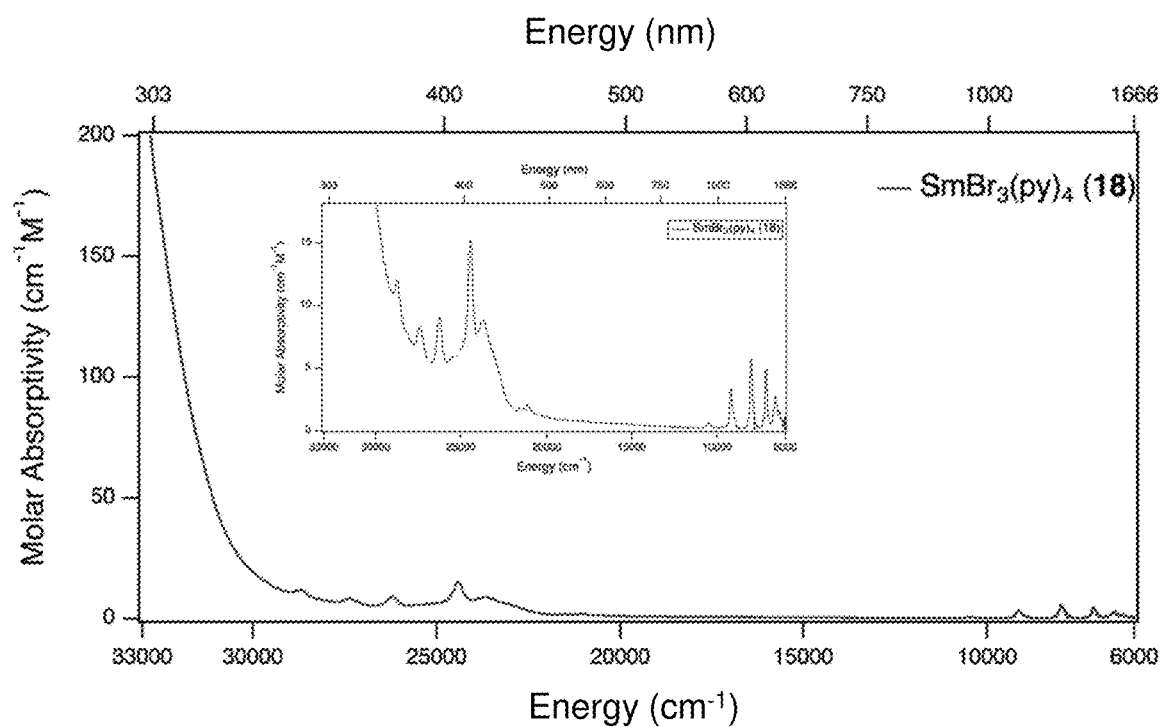
FIG. 22 is a UV/Vis-NIR spectrum of $SmBr_3(py)_4$ (18).
Figure 23:
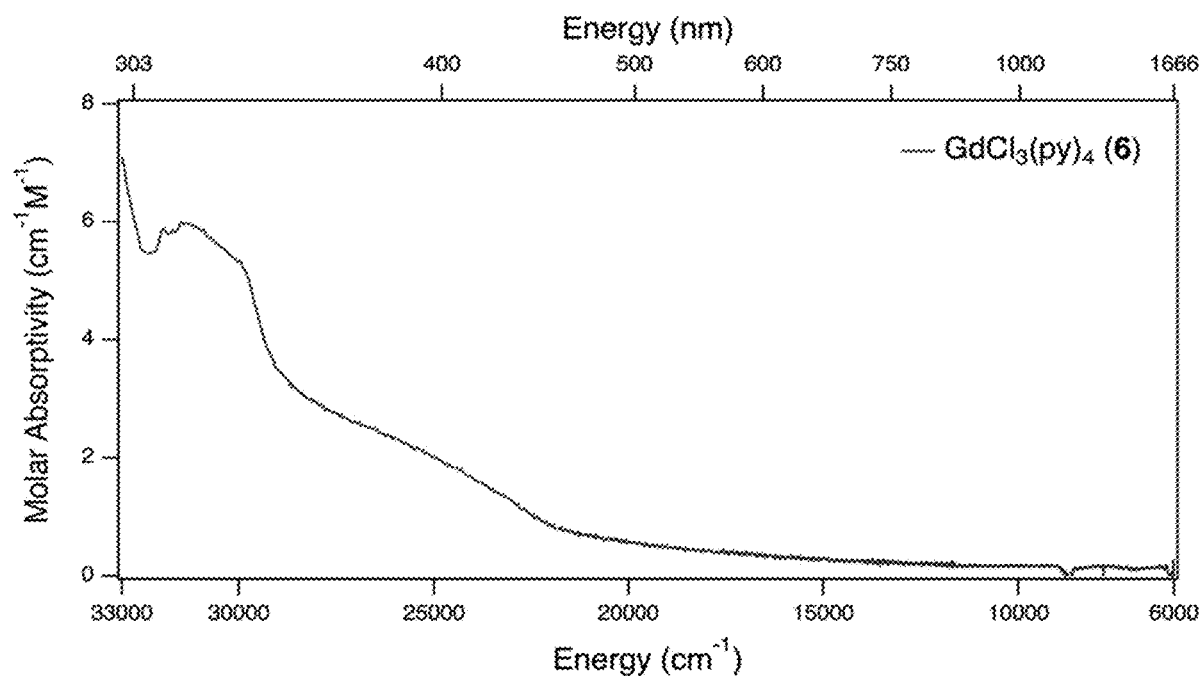
FIG. 23 is a UV/Vis-NIR spectrum of $GdCl_3(py)_4$ (6).
Figure 24:
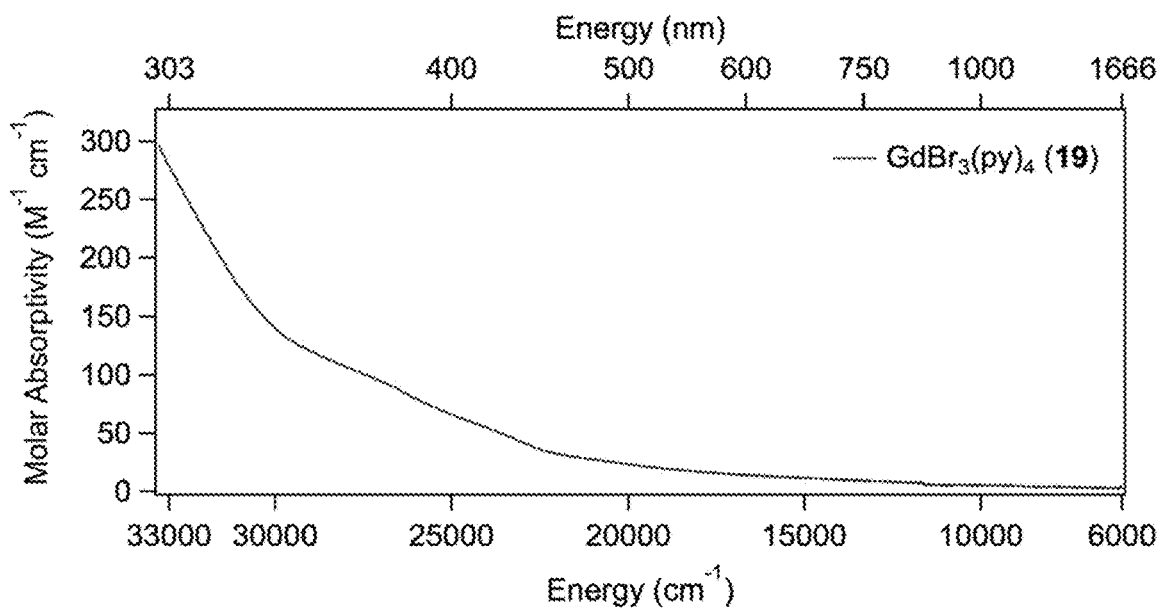
FIG. 24 is a UV/Vis-NIR spectrum of $GdBr_3(py)_4$ (19).
Figure 25:
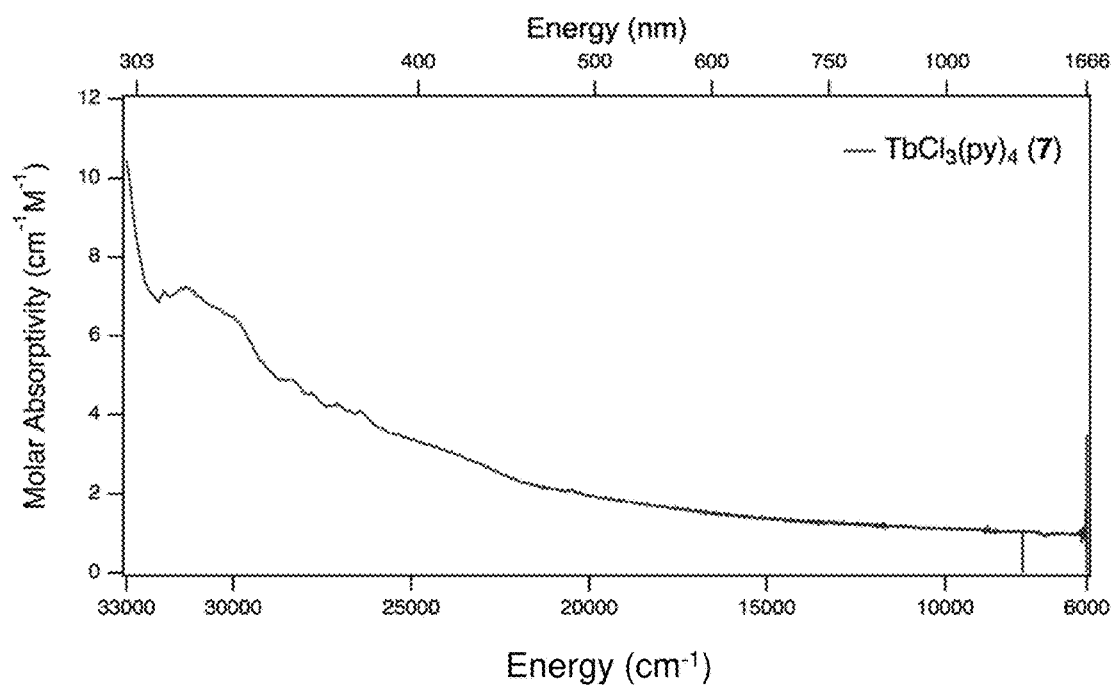
FIG. 25 is a UV/Vis-NIR spectrum of $TbCl_3(py)_4$ (7).
Figure 26:
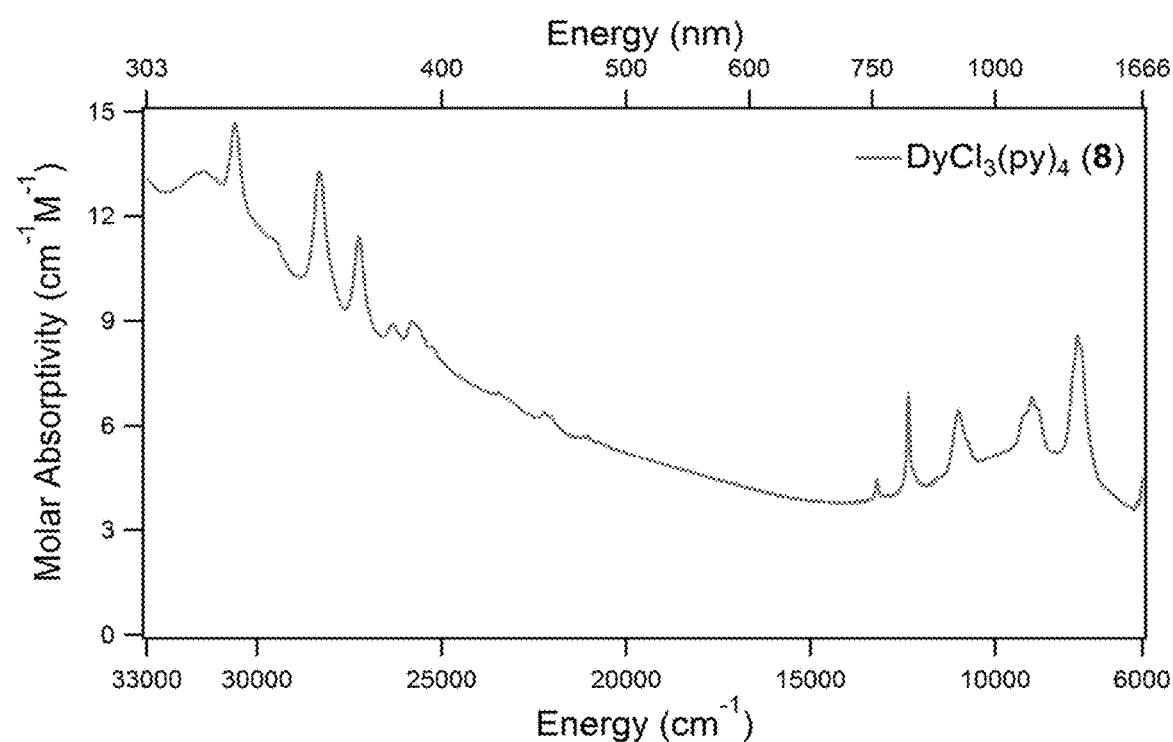
FIG. 26 is a UV/Vis-NIR spectrum of $DyCl_3(py)_4$ (8).
Figure 27:
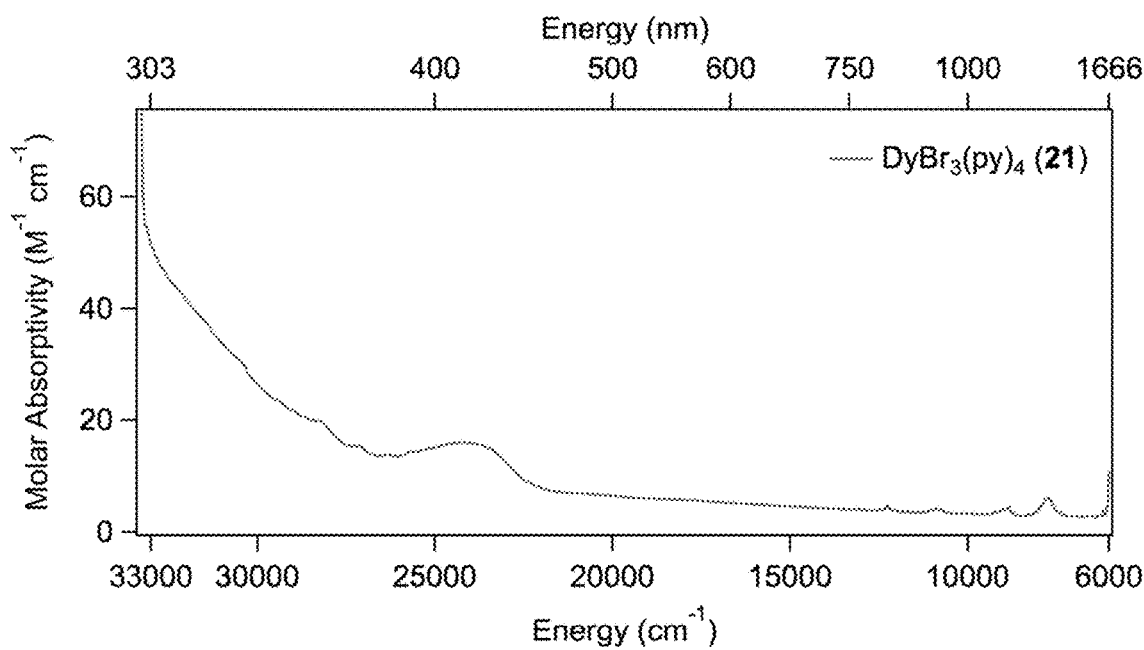
FIG. 27 is a UV/Vis-NIR spectrum of $DyBr_3(py)_4$ (21).
Figure 28:
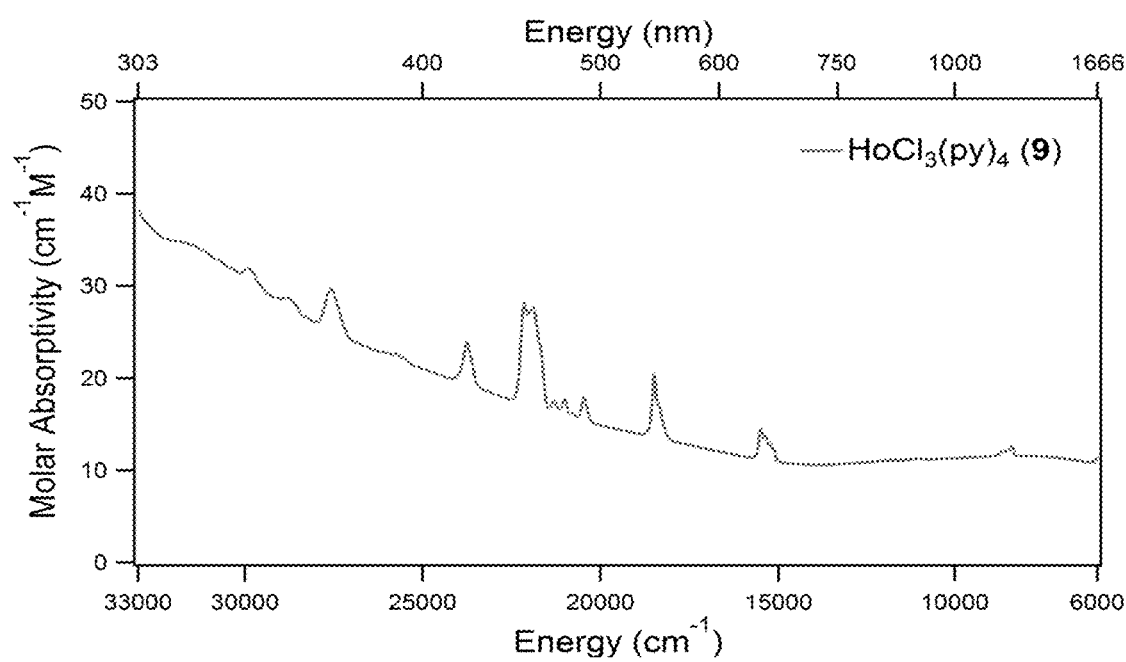
FIG. 28 is a UV/Vis-NIR spectrum of $HoCl_3(py)_4$ (9).
Figure 29:
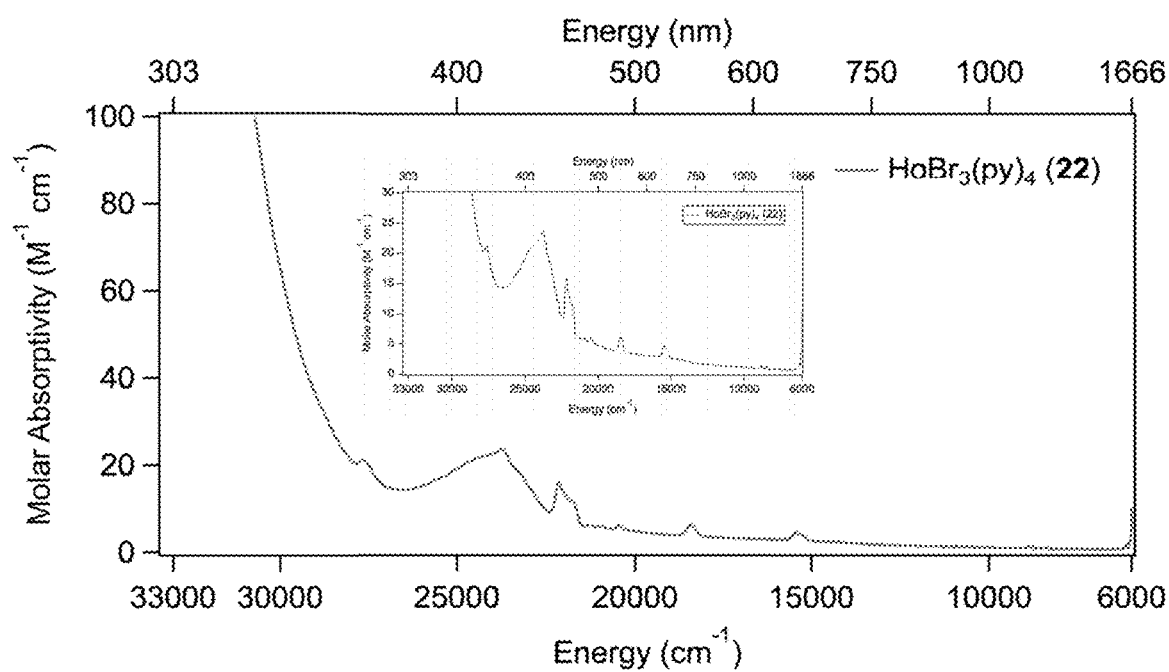
FIG. 29 is a UV/Vis-NIR spectrum of $HoBr_3(py)_4$ (22).
Figure 30:
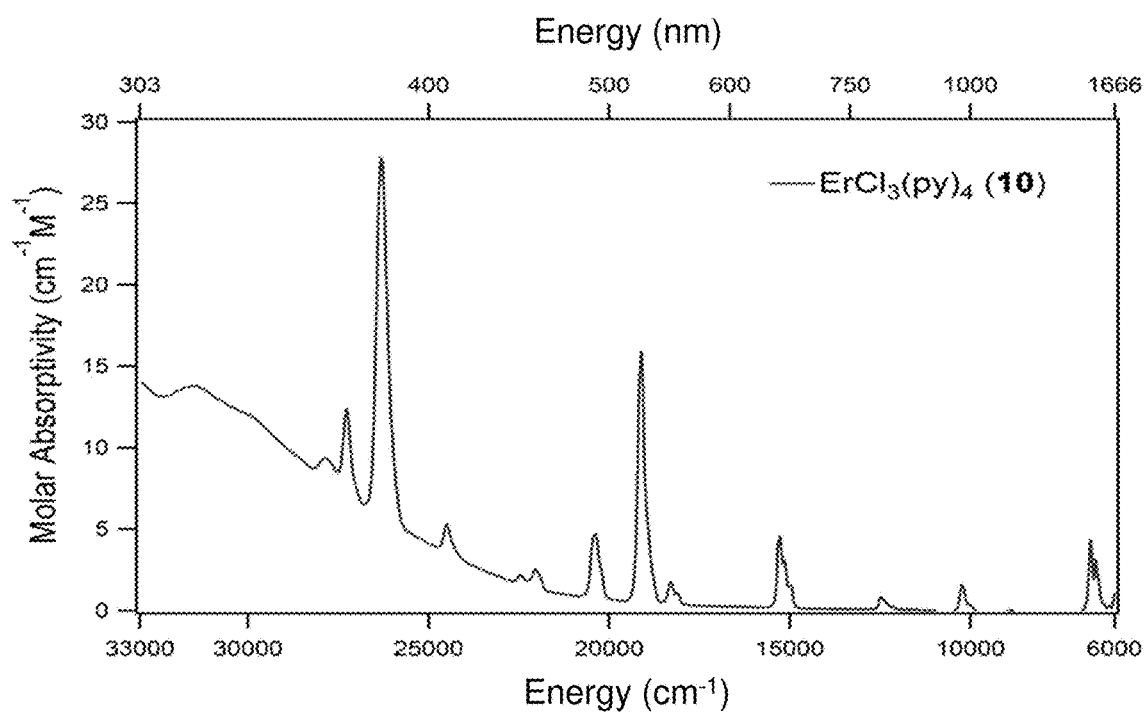
FIG. 30 is a UV/Vis-NIR spectrum of $ErCl_3(py)_4$ (10).
Figure 31:
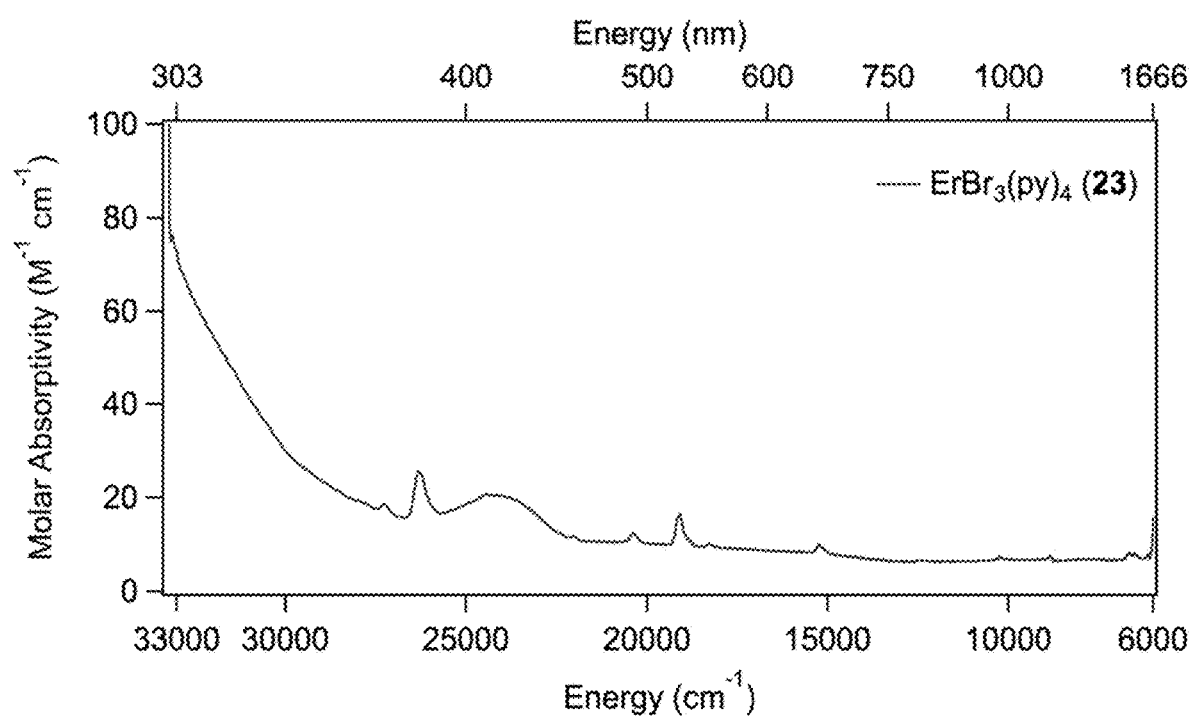
FIG. 31 is a UV/Vis-NIR spectrum of $ErBr_3(py)_4$ (23).
Figure 32:
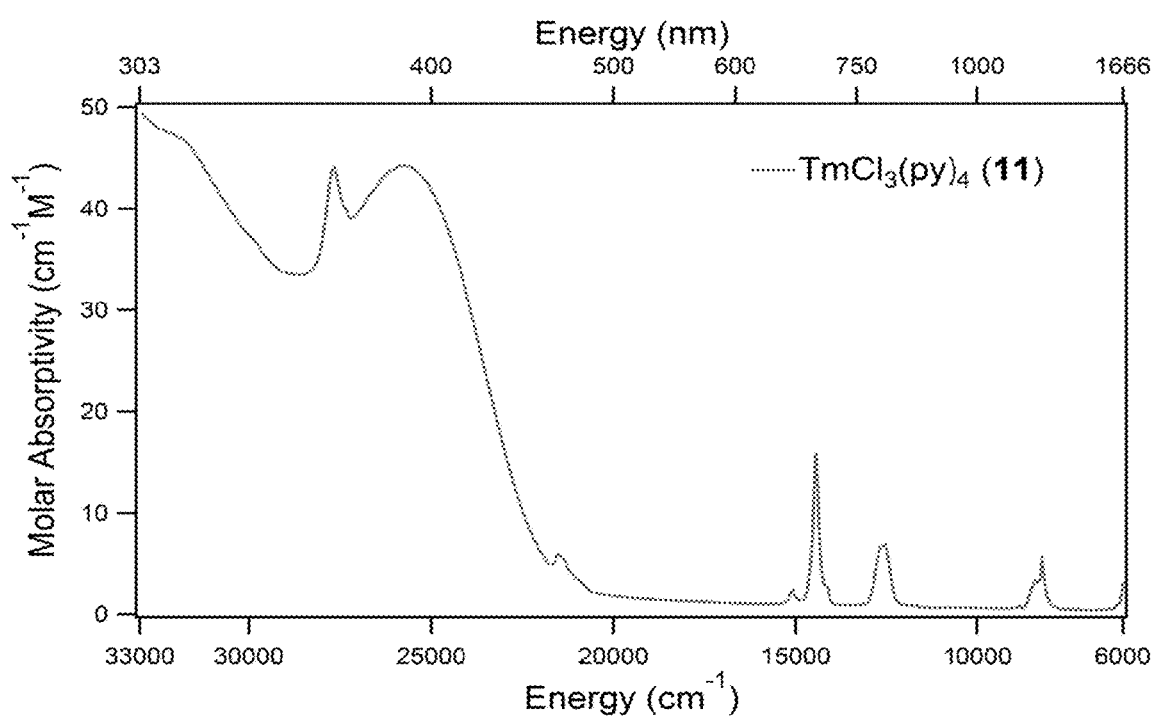
FIG. 32 is a UV/Vis-NIR spectrum of $TmCl_3(py)_4$ (11).
Figure 33:
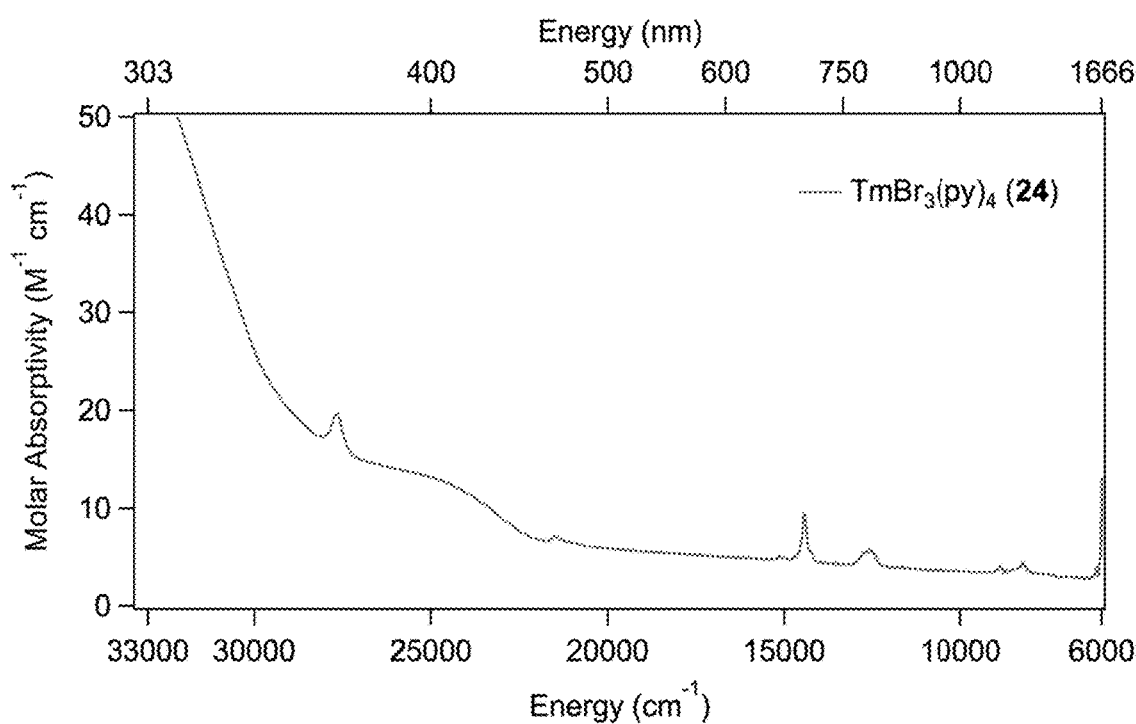
FIG. 33 is a UV/Vis-NIR spectrum of $TmBr_3(py)_4$ (24).
Figure 34:
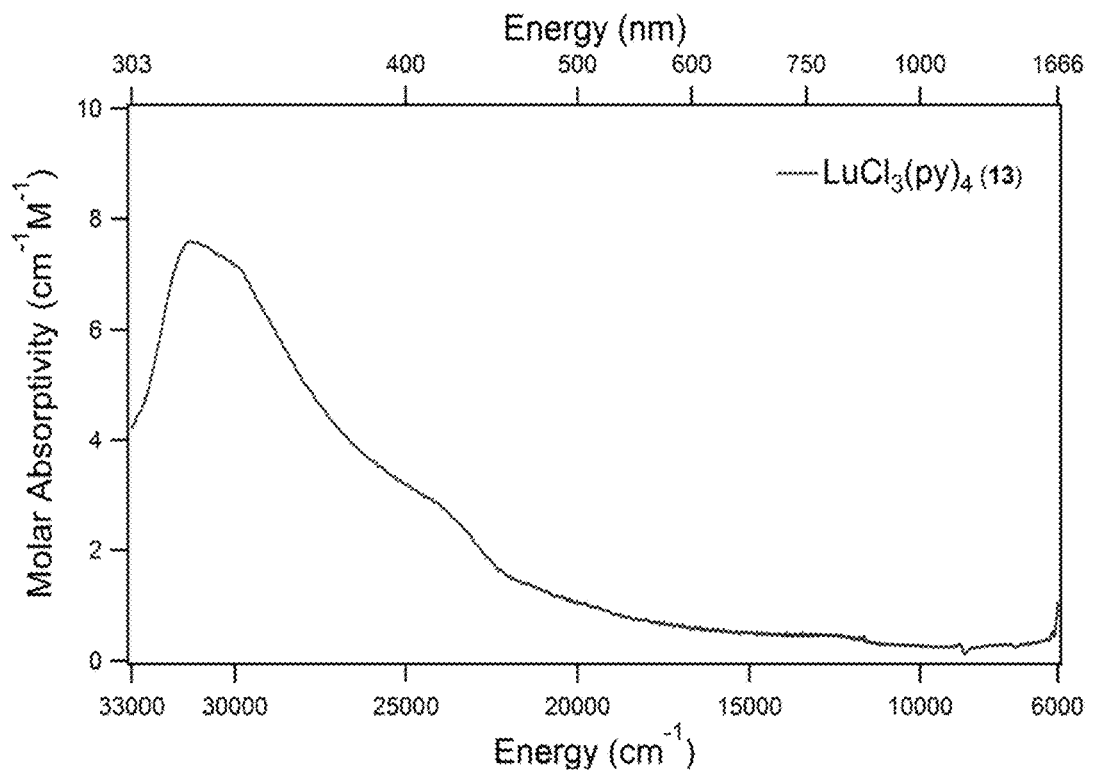
FIG. 34 is a UV/Vis-NIR spectrum of $LuCl_3(py)_4$ (13).
Figure 35:
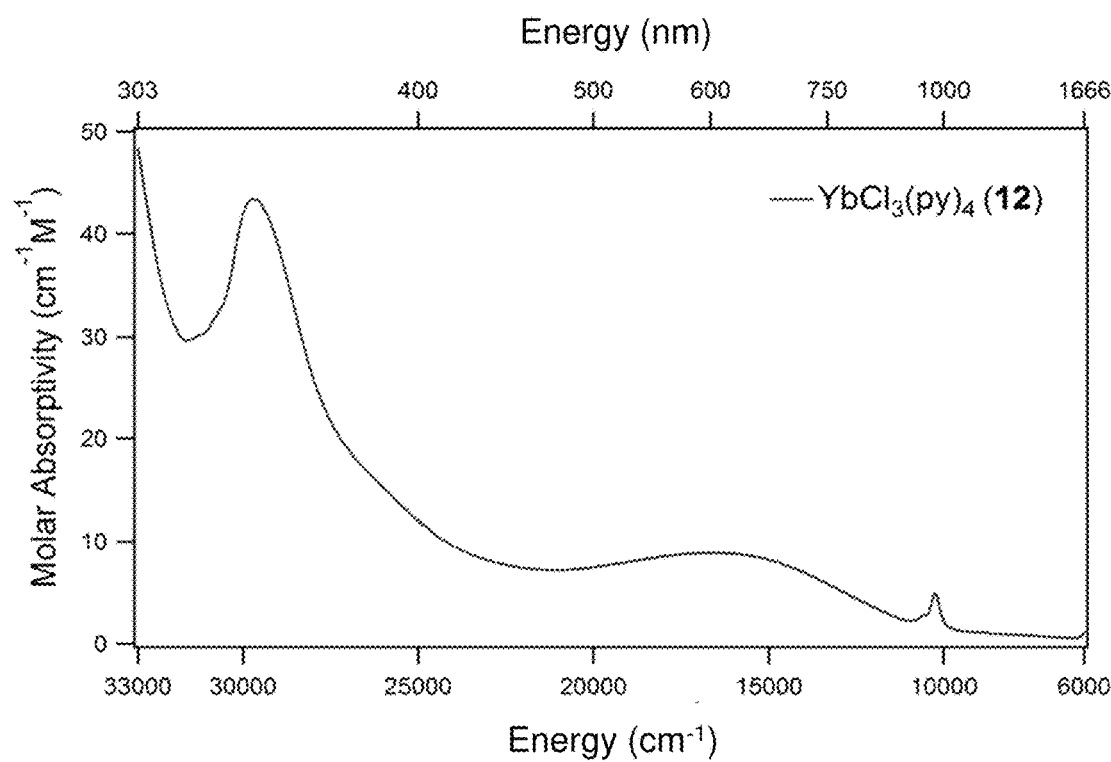
FIG. 35 is a UV/Vis-NIR spectrum of $YbCl_3(py)_4$ (12).

Diffusion of pentane into concentrated pyridine solutions at −30° C. yields single crystals of compounds 2-9, 11, 13, and 18-26. The solid-state structures for GdCl$_3$(py)$_4$ (6) and GdCl$_3$(py)$_4$ (19) are shown in FIGS. 2 and 3, respectively and are representative for the majority of the lanthanide chloride and bromide series. Additional solid-state structures are illustrated in FIGS. 4-13. The Pr (3), Gd (6), and Tb (7) chloride complexes crystallize in the P2$_1$ space group, with eight asymmetric units in the unit cell and two pyridine molecules co-crystallized per Ln complex. The Nd (4), Sm (5), Dy (8), and Tm (11) complexes crystallize in the P2$_1$/n space group with half an uncoordinated pyridine molecule in the crystal lattice. The Ho complex (9) co-crystalizes with a pentane molecule in the C2/c space group featuring a C$_2$ axis along the equatorial Ln-Br bond, making the apical Br positions, and the two pyridines on each side of the LnBr$_3$ plane, symmetrical. This structure is analogous to the solid-state structures reported here for the LnBr$_3$(py)$_4$ (18-26) complexes. The solid-state structure of CeCl$_3$(py)$_4$ (2) is unique from the series and crystallizes with two distinct conformations in the crystal lattice: a monomeric unit isostructural with the rest of the LnX$_3$(py)$_4$ series and a dimeric [CeCl$_2$(py)$_4$]$_2$(μ-Cl$_2$) unit (2a) with a distorted pentagonal bipyramid for the two metal centers (FIG. 13).

The metal-ligand bond lengths within the chloride complexes 2-9, 11, and 13 decrease consistently across the lanthanide series from Ce to Lu (Ln-Cl$_{eq}$=2.728(2)-2.597(5) Å; Ln-N$_{average}$=2.660(8)-2.491(2) Å; Table 1). Otherwise, the global features of these complexes are essentially the same (Table 1). The Ln—Cl bond lengths and angles of complexes 2-9, 11, and 13 fall within anticipated parameters. The [CeCl$_2$(py)$_4$]$_2$(μ-Cl$_2$) dimer (2a) has a maximum cis-Cl—Ce—Cl bond angle of 99.7(7)°, over 7° larger than the previously reported maximum. Conversely, the LuCl$_3$(py)$_4$ (13) complex has a minimum cis-Cl—Lu—Cl bond angle of 90.1(2°) that is slightly smaller than the known range for similar complexes. There are relatively few similar solvate complexes reported with nitrogen donor ligands around the LnCl$_3$ core.

Similar trends are observed for the LnBr$_3$(py)$_4$ complexes (18-26, Table 2). The Ln-Br bonds are longer than the analogous Ln—Cl bonds by approximately 0.15 Å in the equatorial positions and 0.20 Å in the apical positions, in accordance with the larger ionic radius of bromide versus chloride. The observed Ln-N bond lengths are slightly shorter for the tribromide complexes by approximately 0.01 Å when compared to the lanthanide trichlorides series.

UV/Vis-NIR spectra of representative complexes are provided by FIGS. 14-35.

Examples 34-37

In the following examples, the synthetic value of $LnX_3(py)_4$ complexes obtained from the method embodiments described herein is demonstrated by their use in small-scale preparations of a selection of organolanthanide compounds from the early, mid and late lanthanide series.

Example 34

Synthesis of $[(C_5Me_5)_2CeCl_2K(THF)]_n$ (27): A 20 mL scintillation vial equipped with a stir bar was charged with 340 mg (0.60 mmol) of $CeCl_3(py)_4$, 211 mg (1.21 mmol) of $K(C_5Me_5)$, and 10 mL THF. The reaction was stirred for 20 hours then filtered through a celite plug affording a canary yellow filtrate. Volatiles were removed under reduced pressure to give a yellow solid which was recrystallized by layering hexane over THF. Recrystallized solid was collected (205 mg, 0.35 mmol, 59% yield). $^1$H NMR (tetrahydrofuran-d$_8$, 298 K): δ 4.00 (s br, 10H, $C_5Me_5$).

Example 35

Synthesis of Tp'$_2$SmCl (28): A 20 mL scintillation vial equipped with a stir bar was charged with 166 mg (0.29 mmol) of $SmCl_3(py)_4$, 196 mg (0.58 mmol) of KTp' (Tp'=hydridotris (3,5-dimethylpyrazolyl)borate) and 10 mL THF. The reaction was stirred for 6 hours. Volatiles were removed under reduced pressure to give a white solid. Product was extracted with 5 mL of 60° C. toluene, and filtered through a glass filter pad. Volatiles were removed again under reduced pressure and a white solid was collected (173 mg, 0.22 mmol, 76% yield). $^1$H NMR (dichloromethane-d$_2$, 298 K): δ 5.57 (s, 6H, CH), 3.12 (s, 18H, CMe), −1.15 (s, 18H, CMe).

Example 36

Synthesis of $Yb[N(SiMe_3)_2]_3$ (29): A 20 mL scintillation vial was charged with 243 mg (0.41 mmol) of $YbCl_3(py)_4$, 205 mg (1.23 mmol) of $Li[N(SiMe_3)_2]$, and 6 mL of THF. The reaction was stirred for 20 h, then volatiles were removed under reduced pressure. The brownish solid was extracted with pentane (2×5 mL) and filtered to give a clear yellow solution. Pentane was removed under reduced pressure to give the product as a yellow solid. 190 mg (0.29 mmol, 71%). $^1$H NMR (C$_6$D$_6$, 298 K): δ 0.43 (s, 54H). m.p. 162-165° C.

Example 37

$[(C_5Me_5)_3Sm(py)]$ (30): A 20 mL scintillation vial was charged with 175 mg (0.25 mmol) of $SmBr_3(py)_4$ (18) and 5 mL of pyridine and a stirbar. Added 66 mg (0.75 mmol) of $Na(C_5H_5)$, then capped and stirred the reaction for 18 hours. Filtered the cloudy yellow reaction mixture through a Celite pad to remove the NaBr byproduct, then removed volatiles from the clear yellow filtrate under reduced pressure at 50° C. Collected 103 mg (0.24 mmol, 97%) of microcrystalline yellow solid. $^1$H NMR (acetonitrile-d$_3$, 298 K): δ 12.38 (s, 15H, $C_5H_5$), 8.51 (t, 2H, o-CH), 7.72 (d, 1H, p-CH), 7.31 (t, 2H, m-CH). In this example, the yield is drastically increased to 97%, compared to the 71% yield observed for a similar transformation using a lanthanide chloride complex. As such, this example establishes the ability to use lanthanide bromide complexes in place of lanthanide chloride congeners to improve some synthetic protocols.

TABLE 1

Selected bond lengths (Å) and angles (°) for $LnCl_3(py)_4$ (Ln = Ce (2), Pr (3), Nd (4), Sm (5), Gd (6), Tb (7), Dy (8), Ho (9), Tm (11), and Lu (13)).

|  | CeCl$_3$(py)$_4$ | PrCl$_3$(py)$_4$ | NdCl$_3$(py)$_4$ | SmCl$_3$(py)$_4$ | GdCl$_3$(py)$_4$ | TbCl$_3$(py)$_4$ | DyCl$_3$(py)$_4$ | HoCl$_3$(py)$_4$ | TmCl$_3$(py)$_4$ | LuCl$_3$(py)$_4$ |
|---|---|---|---|---|---|---|---|---|---|---|
| Avg. Ln-Cl (apical) | 2.724(2) | 2.690(2) | 2.684(6) | 2.661(1) | 2.634(1) | 2.620(3) | 2.608(7) | 2.598(8) | 2.571(7) | 2.547(5) |
| Ln-Cl (equatorial) | 2.728(1) | 2.713(2) | 2.706(5) | 2.686(1) | 2.667(1) | 2.651(3) | 2.635(7) | 2.642(8) | 2.611(7) | 2.597(5) |
| Avg. Ln-N | 2.660(8) | 2.642(8) | 2.626(1) | 2.600(2) | 2.584(3) | 2.565(1) | 2.544(2) | 2.531(2) | 2.506(2) | 2.490(2) |
| Cl-Ln-Cl (trans) | 170.6(5) | 174.1(7) | 173.0(1) | 173.4(2) | 175.2(3) | 175.4(1) | 174.4(2) | 176.2(3) | 175.0(2) | 175.2 (1) |

TABLE 2

Selected bond lengths (Å) and angles (°) for $LnBr_3(py)_4$ (Ln = Sm (18), Gd (19), Tb (20), Dy (21), Ho (22), Er (23), Tm (24), Yb (25) and Lu (26)).

|  | SmBr$_3$(py)$_4$ | GdBr$_3$(py)$_4$ | TbBr$_3$(py)$_4$ | DyBr$_3$(py)$_4$ | HoBr$_3$(py)$_4$ | ErBr$_3$(py)$_4$ | TmBr$_3$(py)$_4$ | YbBr$_3$(py)$_4$ | LuBr$_3$(py)$_4$ |
|---|---|---|---|---|---|---|---|---|---|
| Ln-Br (apical) | 2.817(8) | 2.788(7) | 2.775(8) | 2.765(5) | 2.754(6) | 2.739(7) | 2.727(4) | 2.728(5) | 2.712(4) |
| Ln-Br (equatorial) | 2.859(8) | 2.844(7) | 2.833(8) | 2.821(6) | 2.816(7) | 2.807(7) | 2.794(5) | 2.790(6) | 2.790(6) |
| Avg. Ln-N | 2.591(2) | 2.570(2) | 2.555(2) | 2.556(2) | 2.531(2) | 2.518(2) | 2.507(2) | 2.492(2) | 2.493(2) |
| Br-Ln-Br (trans) | 176.1(1) | 176.3(1) | 176.5(1) | 177.6(1) | 176.8(1) | 177.0(1) | 177.3(1) | 177.4(1) | 177.3(2) |

Example 38

In this example, a uranium(III) halide complex was formed as summarized in Scheme 7 below.

Scheme 7

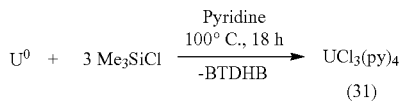

$$U^0 + 3\,Me_3SiCl \xrightarrow[\text{-BTDHB}]{\text{Pyridine} \atop 100°\,C., 18\,h} UCl_3(py)_4$$
(31)

As described in detail below, three equivalents of $Me_3SiCl$ were added to a pyridine solution of uranium turnings. The reaction mixture was heated to 100° C. for 18 hours. After 18 hours, the solution was cooled to ambient temperature forming a black-purple precipitate that was collected on a medium-porosity glass fritted funnel. Care was taken to remove any extra uranium turnings from the precipitate which was then washed with pentane until the red washings turned colorless. Drying the powder under reduced pressure yields $UCl_3(py)_4$. The $^1H$ NMR spectrum of $UCl_3(py)_4$ (31) shows three multiplets corresponding to coordinated pyridine molecules at 8.70, 7.89, and 7.23 ppm, in THF-$d_8$. This reaction is easily performed in an inert atmosphere glovebox with the use of a thermocouple temperature-controlled hotplate, and has been successfully scaled so that tens of grams of complex 31 may be obtained.

Upon removing all volatiles from the red filtrate, the organic byproduct was identified as N,N'-bistrimethylsilyl-1,1-dihydro-4,4'-bipyridinylidene (BTDHB) by $^1H$ NMR spectroscopy.

Synthesis of $UCl_3(py)_4$ (31): Method A: Large Scale. A 100 mL round bottom flask was charged with a stir bar, uranium turnings (10.0 g, 42.0 mmol), pyridine (30 mL) and $Me_3SiCl$ (13.3 mL, 105 mmol). The flask was sealed with a rubber septum and heated at 100° C. for 18 hours. The now dark purple reaction mixture was cooled to ambient temperature. Pentane (30 mL) was added, and the mixture was stirred for 10 minutes. The precipitate was collected on a medium-porosity fritted filter, and then washed with pentane (~15 mL) until the washings ran clear. All volatiles were removed from the solid product under reduced pressure to give $UCl_3(py)_4$ (31) as a purple solid (19.6 g, 29.7 mmol, 85% yield).

Method B. Small-scale reaction: A 20 mL scintillation vial was charged with a stir bar, uranium turnings (234.9 mg, 0.9870 mmol), $Me_3SiCl$ (0.37 mL, 2.933 mmol, 3 equiv.) and pyridine (7 mL). The reaction mixture was heated to 100° C. for 18 hours with vigorous stirring. The now dark purple reaction mixture was cooled to ambient temperature. Pentane (~10 mL) was added to the cool solution, resulting in the formation of a dark purple precipitate, which was collected on a medium-porosity frit. The collected precipitate was washed with pentane (~5 mL) until the washings ran clear. All volatiles were removed from the solid product under reduced pressure to give $UCl_3(py)_4$ (31) as a purple solid (0.4944 g, 0.7482 mmol, 76% yield). $^1H$ NMR (THF-$d8$, 298 K, 400 MHz): δ 8.70 (m, 8H, o-CH), 7.89 (m, 4H, p-CH), 7.23 (m, 8H, m-CH). IR (ATR-IR, Neat, 296 K, cm−1): 3070, 2966, 2920, 2879, 1598, 1487, 1440, 1219, 1150, 1069, 1036, 1002, 753, 695, 620. m.p. 198-202° C. Anal. Cald. for $UCl_3(C_5H_5N)_{2.5}$: C, 27.69; H, 2.32; N, 6.46. Found: C, 28.15; H, 2.64; N, 6.56.

Example 39

In this Example, a uranium(III) complex was used as a starting material to provide an organometallic compound.

Synthesis of $UCl_3(4\text{-}^tBuC_5H_4N)_4$ (32): A 20 mL scintillation vial was charged with a stir bar, $UCl_3(py)_4$ (31) (0.500 g, 0.720 mmol), THF (5 mL) and 4-$^tBuC_5H_4N$ (0.316 mL, 2.15 mmol). The reaction mixture was stirred at ambient temperature for 1 hour. The solvent was removed under reduced pressure and the resulting solid was collected on a coarse-porosity fritted filter, washed with pentane (10 mL), and dried under reduced pressure to give $UCl_3(4\text{-}^tBuC_5H_4N)_4$ (32) (also written as "$UCl_3(4\text{-}^tBu\text{-pyridine})_4$" or "$UCl_3(4\text{-}^tBupy)_4$").

Example 40

In this Example, a uranium(III) complex was used as a starting material to provide an organometallic compound comprising metallocene rings.

Synthesis of $(C_5Me_5)_2UCl(py)$ (33). A 100 mL round bottom flask was charged with a stir bar, $UCl_3(py)_4$ (31) (5.00 g, 7.57 mmol), $Na(C_5Me_5)$ (2.39 g, 15.1 mmol) and THF (20 mL). The reaction mixture was stirred at ambient temperature for 1.5 hours. All volatiles were removed under reduced pressure. The resulting residue was dissolved in toluene (100 mL) and filtered through a Celite-padded coarse-porosity fritted filter. All volatiles were removed under reduced pressure to give $(C_5Me_5)_2UCl(py)$ (33) as a green solid (4.69 g, 7.53 mmol, 99% yield). $^1H$ NMR data collected in benzene-$d_6$ were consistent with that previously reported for complex 33. $^1H$ NMR (benzene-$d_6$, 298 K, 400 MHz): δ-4.93 (s, 30H, $C_5Me_5$).

Example 41

In this Example, a uranium(III) complex was used as a starting material to provide an organometallic compound.

Synthesis of $U[N(SiMe_3)_2]_3(py)$ (34). A 20 mL scintillation vial was charged with a stir bar, $UCl_3(py)_4$ (31) (0.100 g, 0.151 mmol), $NaN(SiMe_3)_2$ (0.095 g, 0.454 mmol) and THF (5 mL). The reaction mixture was stirred at ambient temperature for 3 hours. All volatiles were removed under reduced pressure. The resulting residue was dissolved in pentane (10 mL) and filtered through a Celite-padded coarse-porosity fritted filter. All volatiles were removed under reduced pressure to give $U[(Me_3Si)_2N]_3(py)$ (34) as a brown solid (0.120 g, 0.150 mmol, 99% yield). $^1H$ NMR data collected in benzene-$d_6$ were consistent with that previously reported for complex 34. $^1H$ NMR (benzene-$d_6$, 298 K, 400 MHz): δ-7.55 (s, 54H).

Example 42

In this example, an embodiment of a uranium(IV) complex was prepared.

Synthesis of $UCl_4(py)_4$ (36): Method A: Large scale. A 100 mL round bottom flask was charged with a stir bar, uranium turnings (10.0 g, 42.0 mmol), $Me_3SiCl$ (21.3 mL, 168 mmol) and pyridine (60 mL). The reaction mixture was heated to 100° C. for 18 hours. The now red reaction mixture was cooled to ambient temperature and the green precipitate was collected on a medium-porosity fritted filter and washed with pentane (~15 mL) until the washings ran clear. All volatiles were removed from the solid product under reduced pressure to give $UCl_4(py)_4$ (36) as a light green solid (27.7 g, 39.8 mmol, 95%).

Method B. Small scale. A 20 mL scintillation vial was charged with a stir bar, uranium turnings (0.616 g, 2.59 mmol), $Me_3SiCl$ (2.6 mL, 20.6 mmol) and pyridine (5 mL). The reaction mixture was heated to 100° C. for 18 hours with vigorous stirring. The now red reaction mixture was cooled to ambient temperature and the resulting green precipitate was collected on a medium-porosity fritted filter and washed with pentane (~2 mL) until the washings ran clear. All volatiles were removed from the solid product under reduced pressure to give complex 36 as a light green solid (1.77 g, 2.54 mmol, 98%). $^1$H NMR (THF-d$_8$, 298 K, 400 MHz): δ 7.80 (m, 8H, o-CH), 7.50 (m, 4H, p-CH), 6.99 (m, 8H, m-CH). IR (ATR-IR, Neat, 296 K, cm-1): 2966, 2920, 2879, 1596, 1484, 1436, 1219, 1145, 1068, 1037, 1000, 759, 698, 619. m.p.: 198-202° C. Anal. Cald. for UCl$_4$(NC$_5$H$_5$)$_3$: C, 29.19; H, 2.45; N, 6.81. Found: C, 29.46; H, 2.53; N, 6.62.

Example 43

In this example, adding excess (8 equivalents) Me$_3$SiCl to uranium turnings in pyridine afforded UCl$_4$(py)$_4$ (36) under similar reaction conditions (see Scheme 8, below). Tetravalent 36 was selectively isolated as a pale green powder in 96% yield.

Scheme 8

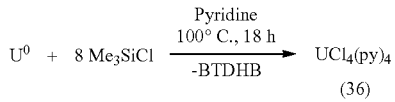

The coordinated pyridine molecules in UCl$_4$(py)$_4$ (36) are observed in $^1$H NMR spectra as three multiplets at 7.80, 7.50, and 6.99 ppm; these are shifted upfield in comparison to free pyridine and the resonances observed for the coordinated pyridine molecules in UCl$_3$(py)$_4$ (31).

Figure 37:
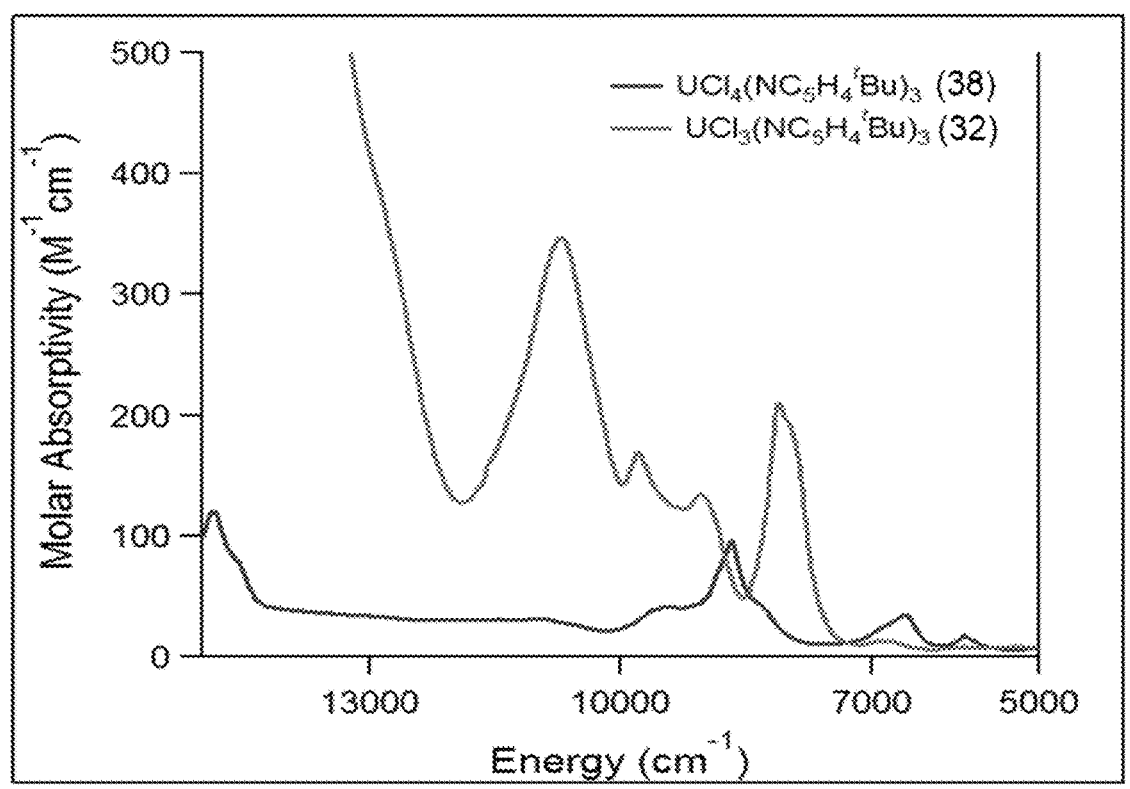
FIG. 37 is a combined Near-IR (NIR) spectrum showing NIR spectra of $UCl_4(4\text{-}^tBu\text{-pyridine})_3$ (38) and $UCl_3(4\text{-}^tBu\text{-pyridine})_4$ (32) collected in pyridine.
Figure 38:
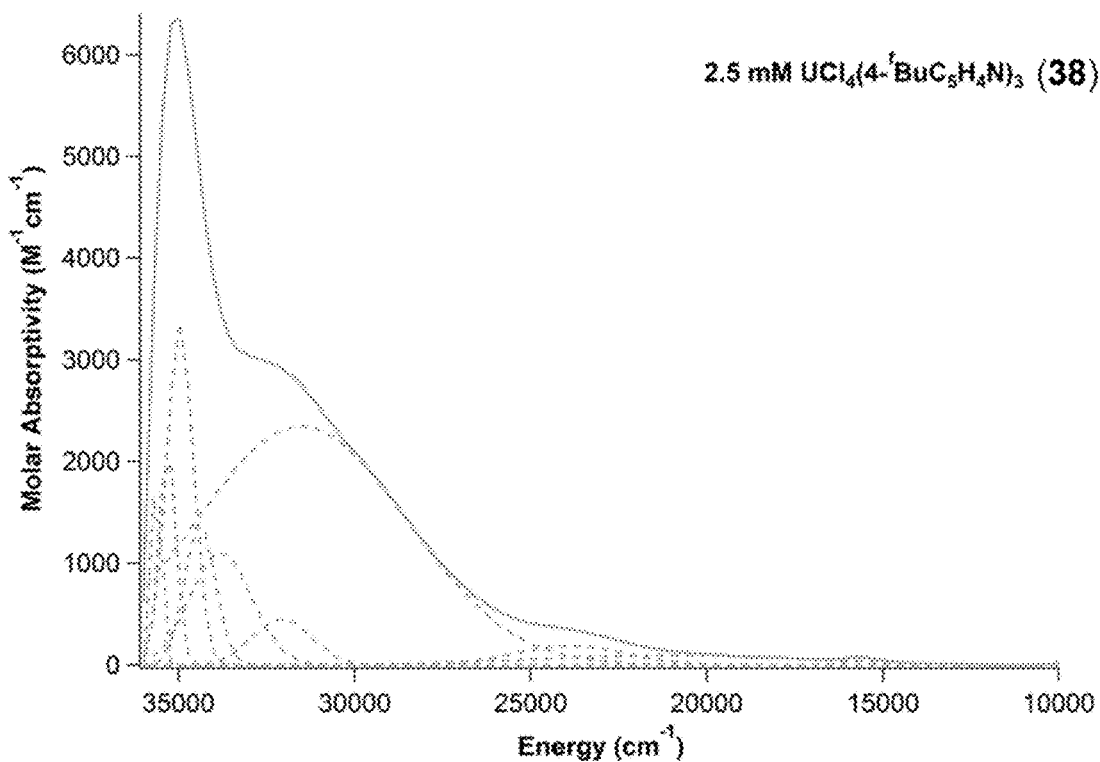
FIG. 38 is a UV-Vis spectrum of $UCl_4(4\text{-}^tBu\text{-pyridine})_3$ (38).
Figure 39:
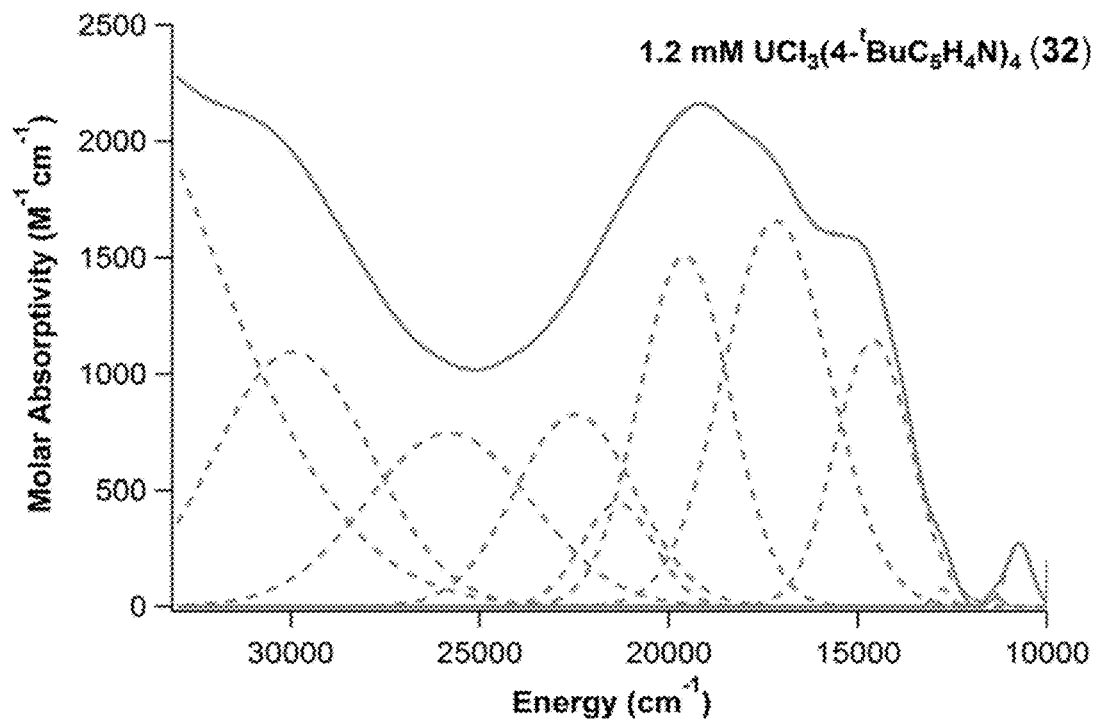
FIG. 39 is an UV-Vis spectrum of $UCl_3(4\text{-}^tBu\text{-pyridine})_4$ (32).

The valency of 31 and 36 was further confirmed spectroscopically by their electronic absorption data, which has been previously shown to exhibit distinct signatures in the Near-IR region of actinide complexes due to f-f transitions. Since, in some embodiments, tetravalent UCl$_4$(py)$_4$ (36) displayed poor solubility in common organic solvents, the pyridine ligands of 31 and 36 were exchanged with 4-$^t$BuC$_5$H$_4$N (or "4-$^t$Bu-pyridine"), affording UCl$_3$(4-$^t$BuC$_5$H$_4$N)$_4$ (32) and UCl$_4$(4-$^t$BuC$_5$H$_4$N)$_3$ (38, see FIG. 36) (also written as "UCl$_4$(4-$^t$Bu-pyridine)$_3$ or "UCl$_4$(4-$^t$Bupy)$_3$)". The electronic absorption spectra of 32 and 38 were subsequently obtained and compared as illustrated in FIG. 37. The extinction coefficients for the uranium(III) compound, 32, were approximately 5 times that observed for the uranium(IV) compound 38, which is an observed difference between uranium(III) and uranium(IV) complexes. Overall, the NIR spectra for 38 (FIG. 38) and 32 (FIG. 39) support a trivalent and tetravalent species, respectively.

Example 44

In this example, a uranium(IV) complex was used as a starting material to provide an organometallic compound.

Synthesis of UCl$_4$(4-$^t$BuC$_5$H$_4$N)$_3$ (38): A 20 mL scintillation vial was charged with a stir bar, UCl$_4$(py)$_4$ (36) (0.500 g, 0.720 mmol), THF (5 mL) and 4-$^t$BuC$_5$H$_4$N (0.316 mL, 2.15 mmol). The reaction mixture was stirred at ambient temperature for 1 hour. The solvent was removed under reduced pressure and the resulting solid collected on a coarse-porosity fritted filter, washed with pentane (10 mL), and dried under reduced pressure to give UCl$_4$(4-$^t$BuC$_5$H$_4$N)$_3$ (38) as a grey-green solid (0.476 g, 0.611 mmol, 85%). X-ray quality crystals of 38 were grown from a saturated THF solution at −30° C. $^1$H NMR (THF-d$_8$, 298 K, 400 MHz): δ 6.52 (s, 12H, 4-$^t$BuC$_5$H$_4$N), 0.98 (s, 27H, 4-$^t$BuC$_5$H$_4$N). IR (ATR-IR, Neat, 296 K, cm$^{-1}$): 2966, 2920, 2878, 2359, 1613, 1502, 1462, 1421, 1372, 1218, 1232, 1069, 1014, 845, 829, 725, 569, 541. m.p. 227-229° C. Anal. Cald. for UCl$_4$(NC$_5$H$_4$ $^t$Bu)$_3$: C, 41.29; H, 5.00; N, 5.35. Found: C, 41.51; H, 5.10; N, 5.29.

Example 45

In this example, a uranium(IV) complex was used as a starting material to provide an organometallic compound comprising metallocene rings.

Synthesis of (C$_5$Me$_5$)$_2$UCl$_2$ (39). A 100 mL round bottom flask was charged with a stir bar, UCl$_4$(py)$_4$ (36) (1.77 g, 2.54 mmol), (C$_5$Me$_5$)MgCl·THF (1.37 g, 5.11 mmol) and toluene (50 mL). The flask was sealed with a rubber septum and heated at 100° C. for 18 hours. The hot reaction mixture was filtered through a Celite-padded coarse-porosity fritted filter and the solids were washed with hot toluene (~30 mL) until washings ran clear. Volatiles were removed from the filtrate under reduced pressure to give (C$_5$Me$_5$)$_2$UCl$_2$ (39) as a red solid (1.22 g, 2.11 mmol, 83% yield). $^1$H NMR data collected in benzene-d$_6$ were consistent with that previously reported. $^1$H NMR (benzene-d$_6$, 298 K, 400 MHz): δ 13.51 (s, 30H, C$_5$Me$_5$).

Example 46

In this example, a uranium(IV) complex was used as a starting material to provide an organometallic compound comprising metallocene rings.

Synthesis of (C$_5$Me$_4$Et)$_2$UCl$_2$ (40). A 20 mL scintillation vial was charged with a stir bar, UCl$_4$(py)$_4$ (36) (0.100 g, 0.144 mmol), (C$_5$Me$_4$Et)MgCl·THF (0.081 g, 0.287 mmol) and toluene (5 mL). The vial was heated at 100° C. for 18 hours. The hot reaction mixture was filtered through a Celite-padded coarse-porosity fritted filter and the solids were washed with hot toluene (~10 mL) until washings ran clear. Volatiles were removed from the filtrate under reduced pressure to give (C$_5$Me$_4$Et)$_2$UCl$_2$ (40) as a red solid (0.064 g, 0.105 mmol, 73% yield). $^1$H NMR data collected in benzene-d$_6$ was consistent with that previously reported. $^1$H NMR (benzene-d$_6$, 298 K, 400 MHz): δ 23.48 (s, 6H, CH$_2$CH$_3$), 13.71 (s, 24H, CH$_3$), −2.91 (s, 4H, CH$_2$CH$_3$).

Example 47

In this example, a uranium(IV) complex was used as a starting material to provide an organometallic compound.

Synthesis of U(O-2,6-$^t$Bu$_2$C$_6$H$_3$)$_4$(41). A 20 mL scintillation vial was charged with a stir bar, UCl$_4$(py)$_4$ (36) (0.100 g, 0.144 mmol), NaO-2,6-$^t$Bu$_2$C$_6$H$_3$ (0.131 g, 0.574 mmol) and THF (5 mL). The reaction mixture was stirred at 70° C. for 18 hours. All volatiles were removed under reduced pressure. The resulting residue was dissolved in toluene (5 mL) and filtered through a Celite-padded coarse-porosity fritted filter. All volatiles were removed under reduced pressure to give U(O-2,6-$^t$Bu$_2$C$_6$H$_3$)$_4$(41) as a brown solid (0.099 g, 0.093 mmol, 65% yield). $^1$H NMR data collected in benzene-d$_6$ was consistent with that previously reported for complex 41. $^1$H NMR (benzene-d$_6$, 298 K, 400 MHz): δ 10.56 (s, 8H, m-CH), 8.34 (t, 4H, p-CH), −1.00 (s, 72H, C(CH$_3$)$_3$).

Example 48

Synthesis of UBr$_3$(py)$_4$ (42): A 20 mL scintillation vial was charged with a stir bar, uranium turnings (190.7 mg, 0.8016 mmol), Me$_3$SiBr (0.32 mL, 2.425 mmol, 3 equiv.) and pyridine (5 mL). The reaction mixture was heated to 100° C. for 18 hours with vigorous stirring. The now dark purple/red reaction mixture was cooled to ambient temperature. Pentane (~10 mL) was added to the cool solution, resulting in the formation of a dark purple precipitate, which was collected on a medium-porosity frit. The collected precipitate was washed with pentane (~5 mL) until the washings ran clear. All volatiles were removed from the solid product under reduced pressure to give UBr$_3$(py)$_4$ (42) as a purple solid (0.6104 g, 0.7686 mmol, 96% yield). $^1$H NMR (THF-d$_8$, 298 K, 400 MHz): δ 8.91 (m, 8H, o-CH), 8.12 (m, 4H, p-CH), 7.44 (m, 8H, m-CH).

Example 49

As further experimental evidence of the valency of the uranium chlorides and to evaluate the preparative value of the pyridyl adducts, literature organoactinide compounds with various ligand platforms were prepared. The trivalent metallocene complex (C$_5$Me$_5$)$_2$UCl(py) (33) and homoleptic complex, U[N(SiMe$_3$)$_2$]$_3$(py) (34), were synthesized from UCl$_3$(py)$_4$ (31) using literature protocols and were isolated in similar yields, demonstrating the coordinated pyridine does not interfere in organometallic functionalization (FIG. 36, left panel).

Common tetravalent organoactinide complexes, (C$_5$Me$_4$R)$_2$UCl$_2$ (R=Me, (39, 93%); R=Et, (40, 73%)) and U(O-2,6-$^t$Bu$_2$C$_6$H$_3$)$_4$(41, 65%) were prepared using starting complex UCl$_4$(py)$_4$ 36 (FIG. 36, right panel), and were obtained in similar yields to that reported in the literature. These results emphasize the synthetic utility of 31 and 36 in organometallic chemistry. Methods of making these compounds are described above.

These examples demonstrate that trivalent and tetravalent uranium chloride pyridyl adducts UCl$_3$(py)$_4$ (31) and UCl$_4$(py)$_4$ (36) can be prepared selectively with uranium turnings and judicious quantities of Me$_3$SiCl in pyridine at 100° C. The organic by-product, N,N'-(bis)trimethylsilyl-1,1'-dihydro-4,4'-bipyridinylidene (CAS #: 13032-12-7), is easily removed by washing the solid product with pentane after filtration. This preparation is simple and more convenient than many previous procedures which require difficult to obtain chlorinated solvents. Additionally, this protocol allows for the direct synthesis of the trivalent uranium(III) chloride, which has only been previously prepared indirectly from UCl$_4$. It has further been demonstrated that the coordinated pyridine molecules in 31 and 36 do not adversely interfere in the synthesis of common metallocene and homoleptic organouranium complexes. This new methodology will address the safety and availability concerns that have long plagued the preparation of these ubiquitous uranium chlorides, while also providing for an alternative gateway to synthetic organouranium(III) chemistry.

Example 50

Figure 40:
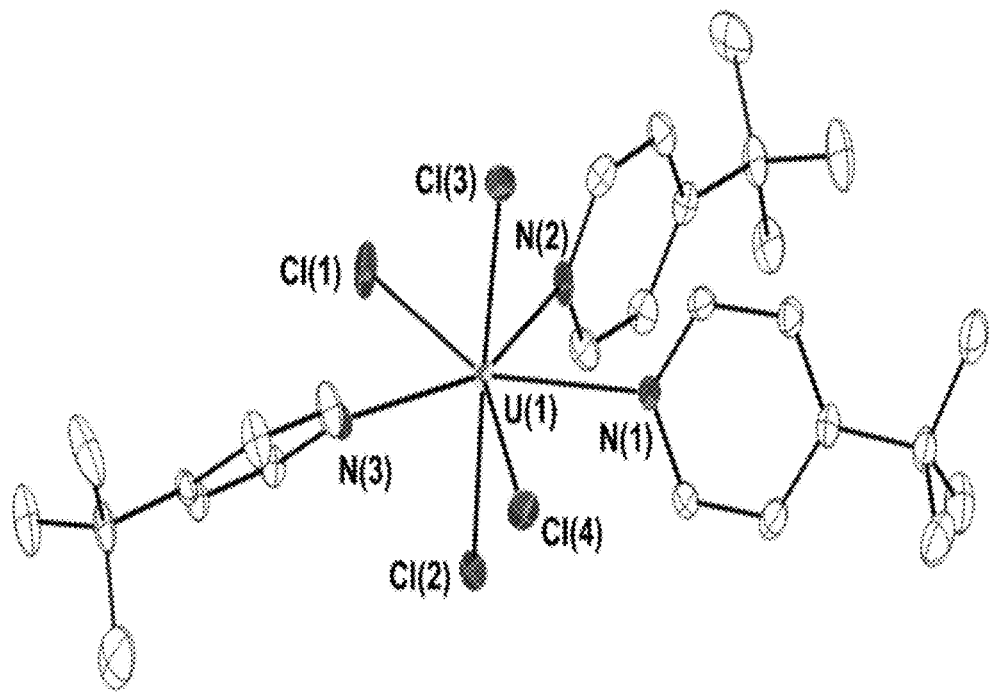
FIG. 40 is an X-ray crystal structure of $UCl_4(4\text{-}^tBu\text{-pyridine})_3$ (38).

X-ray Crystallography: Single crystals of UCl$_4$(4-$^t$BuC$_5$H$_4$N)$_3$ (38) were obtained from a cold (−30° C.) concentrated THF solution. Data were collected on a Bruker D8 Quest diffractometer, with a CMOS detector in shutterless mode. The crystal was cooled to 100 K with an Oxford Cryostream liquid nitrogen cryostat. The X-ray source was conditioned employing a curved graphite monochromator; MoKα (α=0.71073 Å). The structures were solved using direct methods and Fourier techniques. Hydrogen atom positions were idealized, and all non-hydrogen atoms were refined anisotropically. Cell indexing, data collection, integration, structure solution, and refinement were performed using Bruker and Shelxtl software. See FIG. 40 and Table 1 for results.

TABLE 1

| | UCl$_4$(4-$^t$BuC$_5$H$_4$N)$_3$ (38) |
|---|---|
| Empirical Formula | C$_{27}$H$_{39}$Cl$_4$N$_3$U |
| Formula weight | 785.44 |
| Crystal system | Monoclinic |
| a [Å] | 13.8032(10) |
| b [Å] | 12.8615(9) |
| c [Å] | 17.7472(13) |
| β [°] | 91.653(2) |
| V [Å$^3$] | 3149.3(4) |
| Space group | P2$_1$/n |
| Z | 4 |
| ρ [g/cm$^3$] | 1.657 |
| μ (MoKα) | 5.513 |
| T [K] | 100(1) |
| 2θ$_{max}$ [°] | 51.62 |
| min/max trans. | 0.4543/0.5575 |
| Total reflns | 41373 |
| Unique reflns | 6027 |
| Parameters | 325 |
| R$_1$(wR$_2$) (all data) | 0.0266 (0.0978) |

Figure 41:
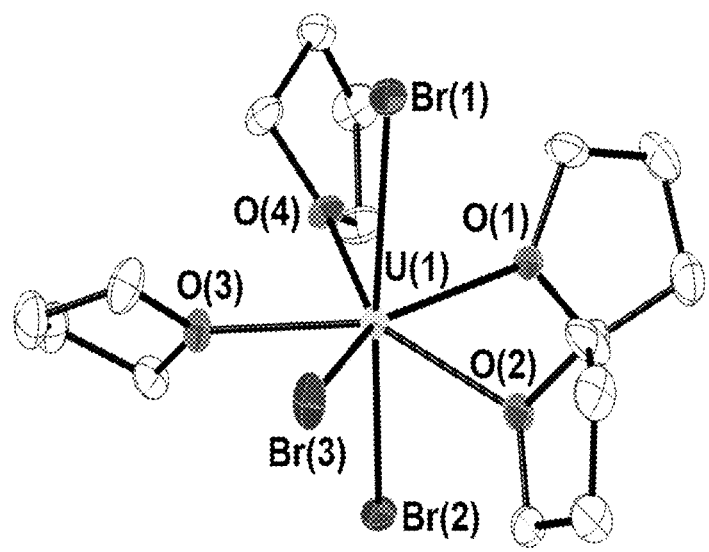
FIG. 41 is an X-ray crystal structure of $UBr_3(THF)_4$ (43).

FIG. 41 and Table 2 provide data for the X-ray crystallography analysis of UBr$_3$(THF)$_4$ (43).

TABLE 2

| | UBr$_3$(THF)$_4$ (43) |
|---|---|
| Empirical Formula | C$_{16}$H$_{32}$Br$_3$O$_4$U |
| Formula Weight | 766.18 |
| Crystal system | triclinic |
| a [Å] | 8.1187(12) |
| b [Å] | 9.4313(14) |
| c [Å] | 15.522(2) |
| α [°] | 78.288(2) |
| β [°] | 87.159(3) |
| γ [°] | 74.606(3) |
| V [Å$^3$] | 1122.0(3) |
| Space group | P −1 |
| Z | 2 |
| ρ [g/cm$^3$] | 2.268 |
| μ (MoK α) | 12.591 |
| T [K] | 100(1) |
| 2θ$_{max}$ [°] | 70.464 |
| mix/max trans. | 0.317/0.747 |
| Parameters | 217 |
| R$_1$(wR$_2$) | 0.0385(0.0877) |

Example 51

General Synthesis of ThX$_4$(py)$_4$ (see Scheme 9): A vessel equipped with a stir bar was charged with anywhere from 0.100 g-1.5 g of Th metal turnings, 50 molar equiv. of pyridine, and 6 equiv. of trimethylsilylhalide. The vessel was capped and stirred at 100° C. for 18 hours, gradually turning a dark red color and showing some visible precipitate. After cooling the solution to room temperature, 3 times the pyridine volume of pentane were added, and stirred for 15 min to precipitate an off-white solid from the red solution. The mixture was filtered on a coarse porosity frit and washed with pentane until the red washings became clear. The solid was then dried under vacuum and collected.

Scheme 9

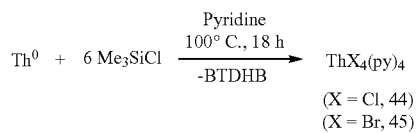

(X = Cl, 44)
(X = Br, 45)

Figure 42:
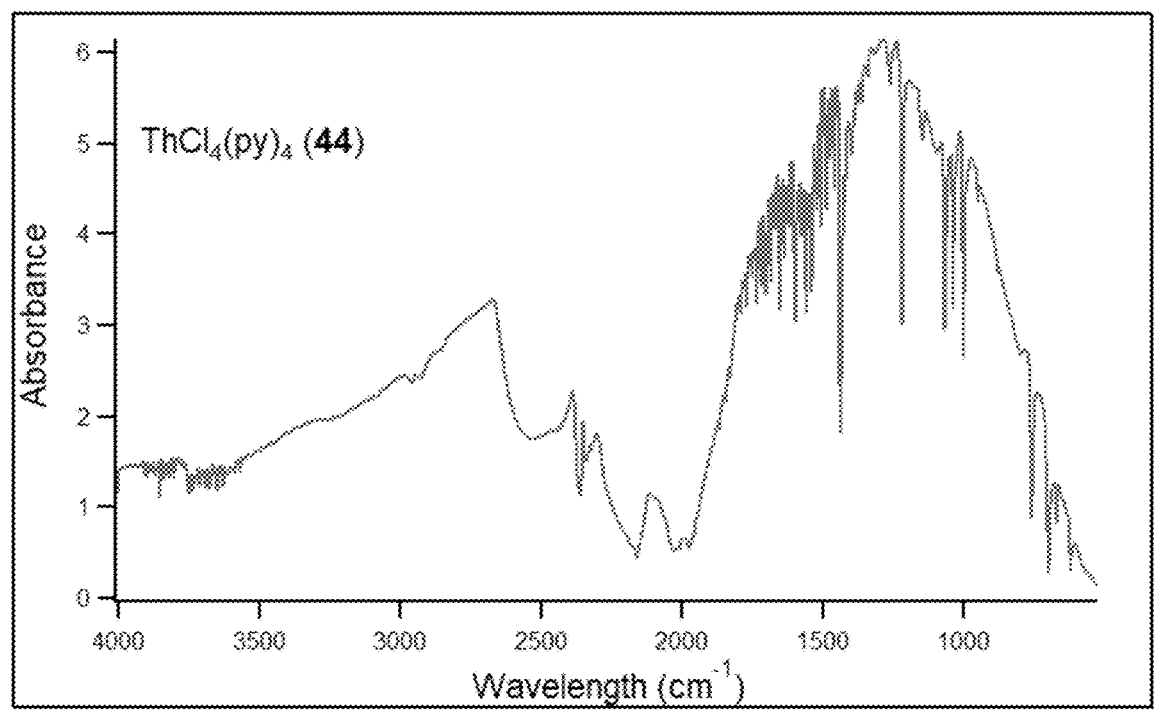
FIG. 42 is an IR spectrum of $ThCl_4(py)_4$ (44).
Figure 44:
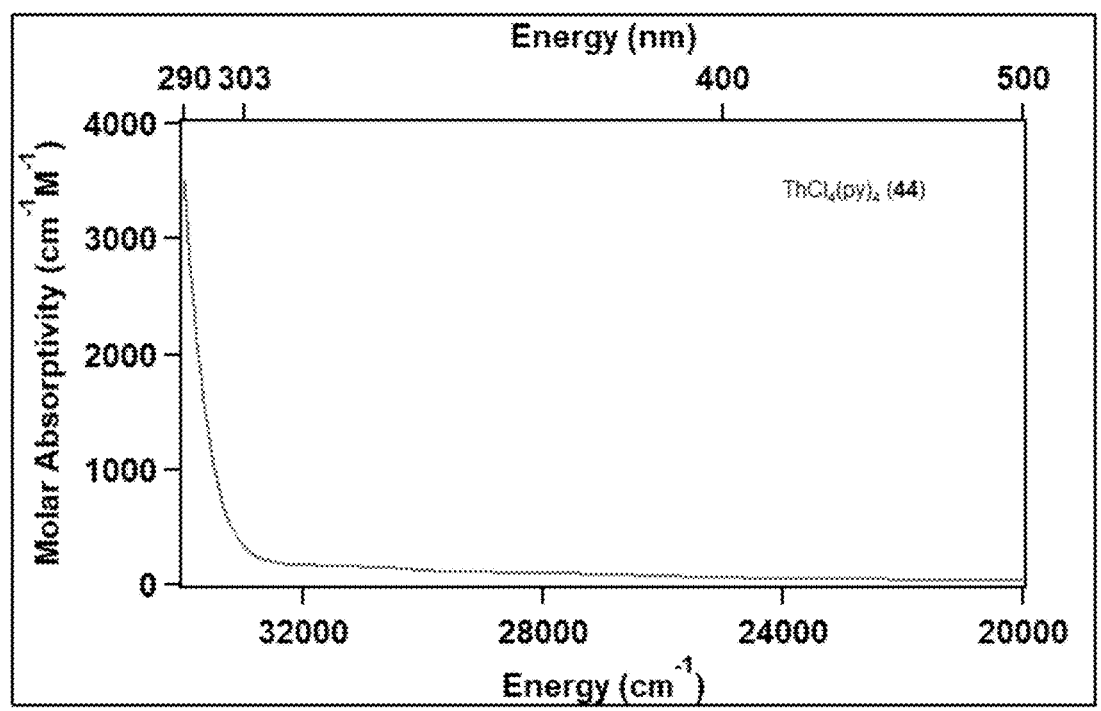
FIG. 44 is a UV/Vis-NIR spectrum of $ThCl_4(py)_4$ (44).

Characterization Data for ThCl$_4$(py)$_4$ (44). Yield=84%. Light yellow solid. $^1$H NMR (tetrahydrofuran-d$_8$, 298 K): δ 8.67 (d, 2H, J$_{HH}$=4.7 Hz, o-CH), 7.68 (t, 1H, J$_{HH}$=7.6 Hz, p-CH), 7.27 (t, 2H, J$_{HH}$=6.3 Hz, m-CH). $^{13}$C NMR (tetrahydrofuran-d$_8$, 298 K): δ 149.79 (s, o-CH), 135.25 (s, p-CH), 122.94 (s, m-CH). Anal. cacld. for ThCl$_4$(C$_5$H$_5$N)$_{3.2}$ (mol. wt. 626.96 g/mol): C, 30.65; H, 2.57; N, 7.15. Found: C, 30.65; H, 2.78; N, 6.54. IR and UV/Vis-NIR spectra are provided by FIGS. 42 and 44, respectively.

Figure 43:
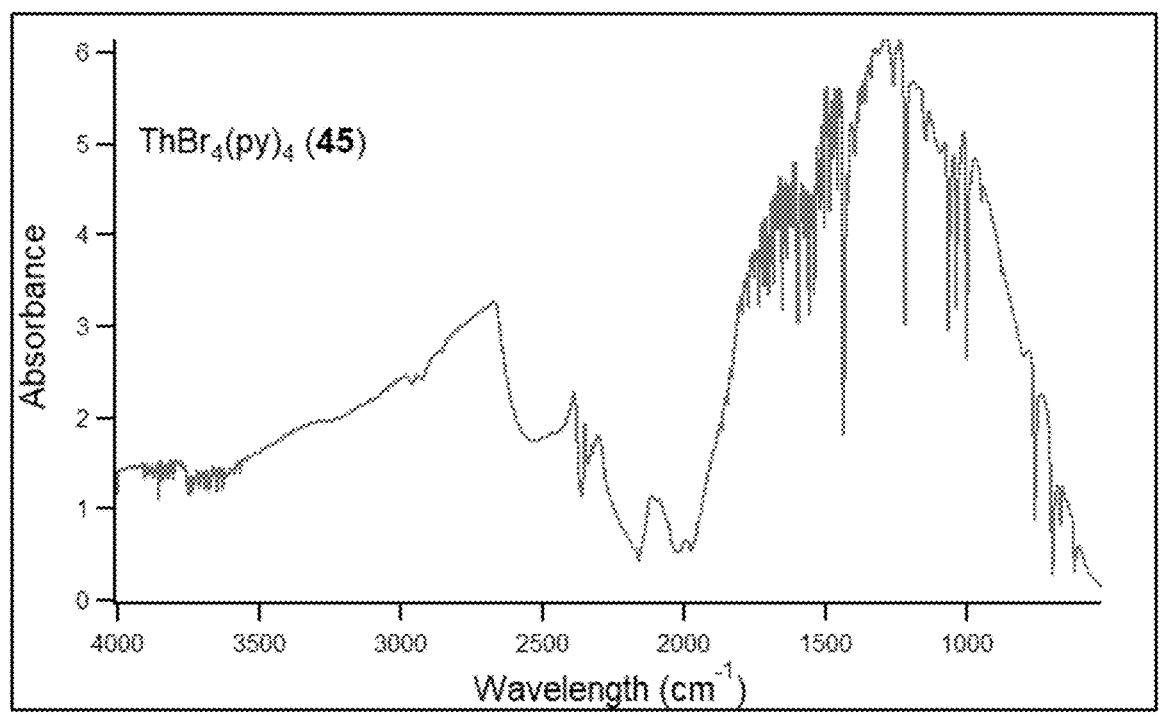
FIG. 43 is an IR spectrum of $ThBr_4(py)_4$ (45).
Figure 45:
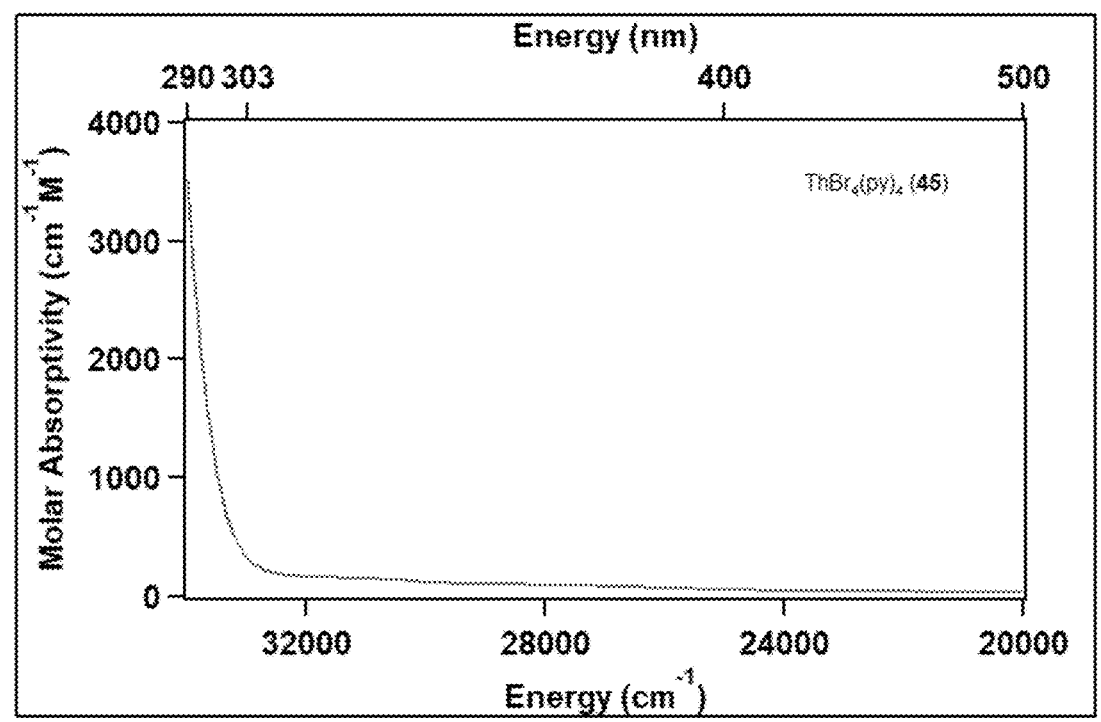
FIG. 45 is a UV/Vis-NIR spectrum of $ThBr_4(py)_4$ (45).

Characterization Data for ThBr$_4$(py)$_4$ (45). Yield=70%. Light green off-white solid. $^1$H NMR (tetrahydrofuran-d$_8$, 298 K): δ 8.83 (d, 2H, J$_{HH}$=4.9 Hz, o-CH), 7.70 (t, 1H, J$_{HH}$=7.8 Hz, p-CH), 7.28 (t, 2H, J$_{HH}$=6.2 Hz, m-CH). $^{13}$C NMR (tetrahydrofuran-d$_8$, 298 K): δ 150.92 (s, o-CH), 136.26 (s, p-CH), 123.56 (s, m-CH). Anal. cacld. for ThBr$_4$(C$_5$H$_5$N)$_{3.2}$ (mol. wt. 804.78 g/mol): C, 23.88; H, 2.00; N, 5.57. Found: C, 24.08; H, 2.28; N, 5.01. IR and UV/Vis-NIR spectra are provided by FIGS. 43 and 45, respectively.

Example 52

Reduction of UCl$_4$(py)$_4$ (36) to UCl$_3$(py)$_4$(31) (see Scheme 10): A 20 mL scintillation vial was charged with UCl$_4$(py)$_4$ (0.121 g, 0.17 mmol), a stir bar, and pyridine (5 mL) Cleaned uranium metal turnings (0.045 g, 0.19 mmol) were added to the suspension and were stirred at 40° C. for 18 hours. During this time, the uranium metal turnings were incorporated into the reaction and the solution turned from an olive green to dark purple. At this time, the reaction was cooled to ambient temperature and pentane (10 mL) was added to precipitate the product. After stirring the suspension in the pyridine/pentane solvent, the product was collected by vacuum filtration on a medium-porosity fritted-funnel and was washed with pentane (2×5 mL). The resultant purple solid was dried under reduced pressure to give a free flowing purple powder identified as pure UCl$_3$(py)$_4$ (31) (0.101 g, 0.15 mmol, 88%).

Scheme 10

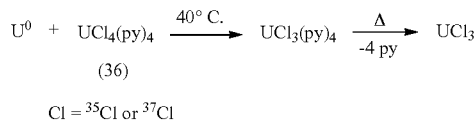

Cl = $^{35}$Cl or $^{37}$Cl

Example 53

In this example, uranium metal was combined with either 3 or 4 equivalents of Me$_3$Si-$^{37}$Cl in pyridine at 100° C. for 18 hours to afford the corresponding $^{37}$Cl-enriched trivalent (U$^{37}$Cl$_3$(py)$_4$) and tetravalent (U$^{37}$Cl$_4$(py)$_4$) uranium compounds, in 85% and 98% isolated yields, respectively. See Scheme 11. Also, the pyridine ligands can be removed at temperatures ranging from 25° C. to 700° C. either at ambient pressure or under reduced pressure conditions to give the unsolvated U$^{37}$Cl$_3$ and U$^{37}$Cl$_4$ compounds.

Scheme 11

Cl* = $^{37}$Cl

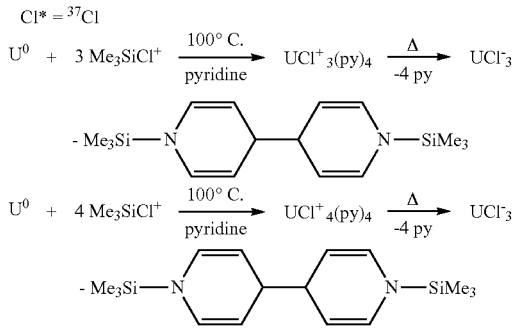

Example 54

In this example, a Me$_3$Si$^{37}$Cl reagent is prepared. In particular, Me$_3$Si$^{35}$Cl is reacted with M$^{37}$Cl (wherein in M is Li, Na, K, Rb, or Cs) and the Me$_3$Si$^{37}$Cl reagent is removed from the reaction mixture by filtration and/or distillation.

In view of the many possible embodiments to which the principles of the disclosure may be applied, it should be recognized that the illustrated embodiments are only examples and should not be taken as limiting the scope of the invention. Rather, the scope of the invention is defined by the following claims. We therefore claim as our invention all that comes within the scope and spirit of these claims.

We claim:

1. A method, comprising heating a reaction mixture to provide a metal complex, wherein:
   (i) the reaction mixture comprises
      a metal precursor selected from La⁰, Ce⁰, Nd⁰, Dy⁰, Sm⁰, Th⁰, Y⁰, Er⁰, Eu⁰, Gd⁰, Ho⁰, L⁰, Mn⁰, Pr⁰, Sc⁰, Tb⁰, Tm⁰, V⁰, Zn⁰, or Yb⁰;
      pyridine; and
      a silicon-containing reagent having a structure according to a formula (R)(R')(R")SiX, wherein each of R, R', and R" independently are selected from straight-chain C$_{1-10}$ alkyl and X is —Cl, —Br, or —I; and
   (ii) the metal complex has a structure according to a formula MX$_n$(pyridine)$_m$, wherein
      M is selected from La, Ce, Nd, Dy, Sm, Th, Y, Er, Eu, Gd, Ho, Lu, Mn, Pr, Sc, Tb, Tm, V, Zn, or Yb;
      X is —Cl, —Br, or —I;
      n is an integer ranging from 2 to 6; and
      m is an integer ranging from 1 to 5.

2. The method of claim 1, wherein heating comprises heating the reaction mixture at a temperature ranging from 40° C. to 150° C.

3. The method of claim 1, wherein heating comprises heating the reaction mixture at a temperature ranging from 80° C. to 100° C.

4. The method of claim 1, further comprising isolating the metal complex by filtering and washing the metal complex with a solvent in which the metal complex is not soluble.

5. The method of claim 4, wherein the solvent is pentane or hexanes.

6. The method of claim 1, further comprising eliminating pyridine from the metal complex to provide a compound having a formula $MX_n$, wherein M is selected from La, Ce, Nd, Dy, Sm, Th, Y, Er, Eu, Gd, Ho, Lu, Mn, Pr, Sc, Tb, Tm, V, Zn, or Yb; X is —Cl, —Br, or —I; and n is an integer ranging from 2 to 6.

7. The method of claim 6, wherein eliminating comprises heating the metal complex and/or applying vacuum pressure.

8. The method of claim 7, wherein heating comprises using a temperature ranging from 25° C. to 700° C.

9. The method of claim 1, wherein 1.5 equivalents to 20 equivalents of the silicon-containing reagent, relative to the metal precursor, are used.

10. The method of claim 1, wherein each of R, R', and R" independently are selected from methyl or ethyl.

11. The method of claim 1, wherein the metal complex is selected from $LaCl_3(pyridine)_4$, $CeCl_3(pyridine)_4$, $NdCl_3(pyridine)_4$, $DyCl_3(pyridine)_4$, $SmCl_3(pyridine)_4$, $ThCl_4(pyridine)_4$, $YCl_3(pyridine)_4$, $ErCl_3(pyridine)_4$, $GdCl_3(pyridine)_4$, $HoCl_3(pyridine)_4$, $LuCl_3(pyridine)_4$, $MnCl_2(pyridine)_2$, $PrCl_3(pyridine)_4$, $ScCl_3(pyridine)$, $TbCl_3(pyridine)_4$, $TmCl_3(pyridine)_4$, $VCl_2(pyridine)_4$, $ZnCl_2(pyridine)_2$, $YbCl_3(pyridine)_4$, $LaBr_3(pyridine)_4$, $NdBr_3(pyridine)_4$, $DyBr_3(pyridine)_4$, $SmBr_3(pyridine)_4$, $SmBr_2(pyridine)_5$, $ErBr_3(pyridine)_4$, $EuBr_2(pyridine)_5$, $GdBr_3(pyridine)_4$, $HoBr_3(pyridine)_4$, $LuBr_3(pyridine)_4$, $PrBr_3(pyridine)_4$, $TbBr_3(pyridine)_4$, $ThBr_4(pyridine)_4$, $TmBr_3(pyridine)_4$, $ZnBr_2(pyridine)_2$, $YbBr_3(pyridine)_4$, $YbBr_2(pyridine)_4$, $SmI_2(pyridine)_5$, $EuI_2(pyridine)_4$, or $YbI_2(pyridine)_4$.

12. A method, comprising heating a reaction mixture to provide a metal complex, wherein:
  (i) the reaction mixture comprises
    a metal precursor selected from $La^0$, $Ce^0$, $Nd^0$, $Dy^0$, $Sm^0$, $Th^0$, $Y^0$, $Er^0$, $Eu^0$, $Gd^0$, $Ho^0$, $Lu^0$, $Mn^0$, $Pr^0$, $Sc^0$, $Tb^0$, $Tm^0$, $V^0$, $Zn^0$, or $Yb^0$;
    pyridine; and
    a silicon-containing reagent selected from $Me_3SiCl$, $Me_3SiBr$, or $Me_3SiI$; and
  (ii) the metal complex has a structure according to a formula $MX_n(pyridine)_m$, wherein
    M is selected from La, Ce, Nd, Dy, Sm, Th, Y, Er, Eu, Gd, Ho, Lu, Mn, Pr, Sc, Tb, Tm, V, Zn, or Yb;
    X is —Cl, —Br, or —I;
    n is an integer ranging from 2 to 6; and
    m is an integer ranging from 1 to 5.

13. The method of claim 12, wherein heating comprises heating the reaction mixture at a temperature ranging from 40° C. to 150° C.

14. The method of claim 12, wherein heating comprises heating the reaction mixture at a temperature ranging from 80° C. to 100° C.

15. The method of claim 12, further comprising isolating the metal complex by filtering and washing the metal complex with a solvent in which the metal complex is not soluble.

16. The method of claim 12, further comprising eliminating pyridine from the metal complex to provide a compound having a formula $MX_n$, wherein M is selected from La, Ce, Nd, Dy, Sm, Th, Y, Er, Eu, Gd, Ho, Lu, Mn, Pr, Sc, Tb, Tm, V, Zn, or Yb; X is —Cl, —Br, or —I; and n is an integer ranging from 2 to 6.

17. The method of claim 16, wherein eliminating comprises heating the metal complex using a temperature ranging from 25° C. to 700° C.; and/or applying vacuum pressure.

* * * * *